June 28, 1955   R. E. FEARON ET AL   2,712,081
METHOD FOR NEUTRON WELL LOGGING
Filed July 30, 1949   18 Sheets-Sheet 3

A FUNCTION OF INTENSITY

INVENTORS
Robert E. Fearon
Jean M. Thayer
BY
James Y. Cleveland
ATTORNEY

INVENTORS
Robert E. Fearon
Jean M. Thayer
BY James Y. Cleveland
ATTORNEY

June 28, 1955   R. E. FEARON ET AL   2,712,081
METHOD FOR NEUTRON WELL LOGGING
Filed July 30, 1949   18 Sheets-Sheet 9
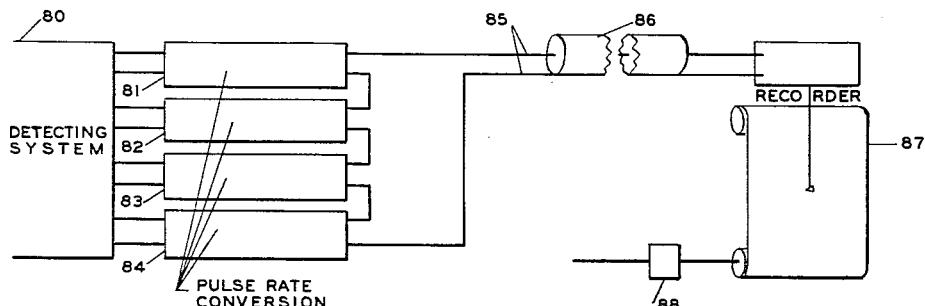
Fig. 13
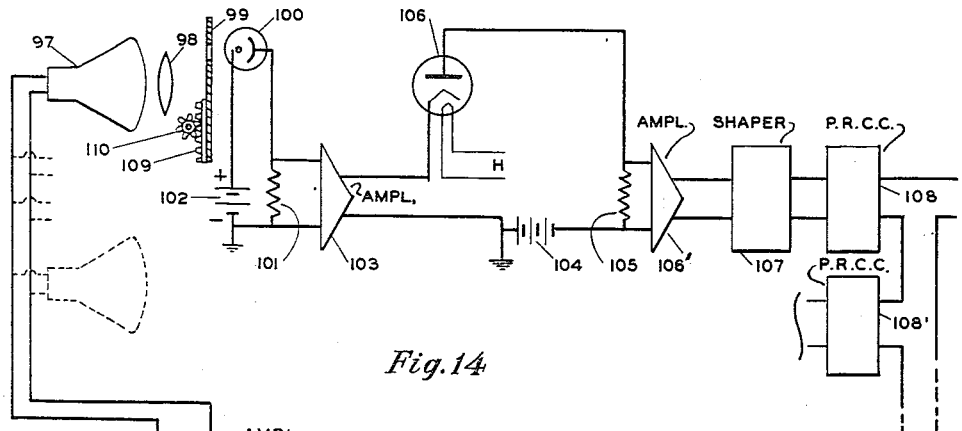
Fig. 14
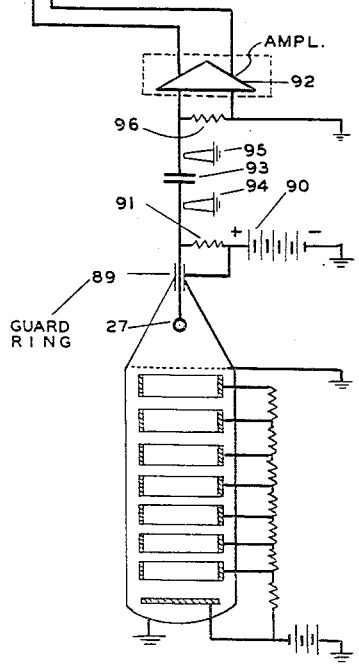
INVENTORS
Robert E. Fearon
Jean M. Thayer
BY James Y. Cleveland
ATTORNEY June 28, 1955  R. E. FEARON ET AL  2,712,081
METHOD FOR NEUTRON WELL LOGGING
Filed July 30, 1949  18 Sheets-Sheet 10

INVENTORS
Robert E. Fearon
Jean M. Thayer
BY
James Y. Cleveland
ATTORNEY

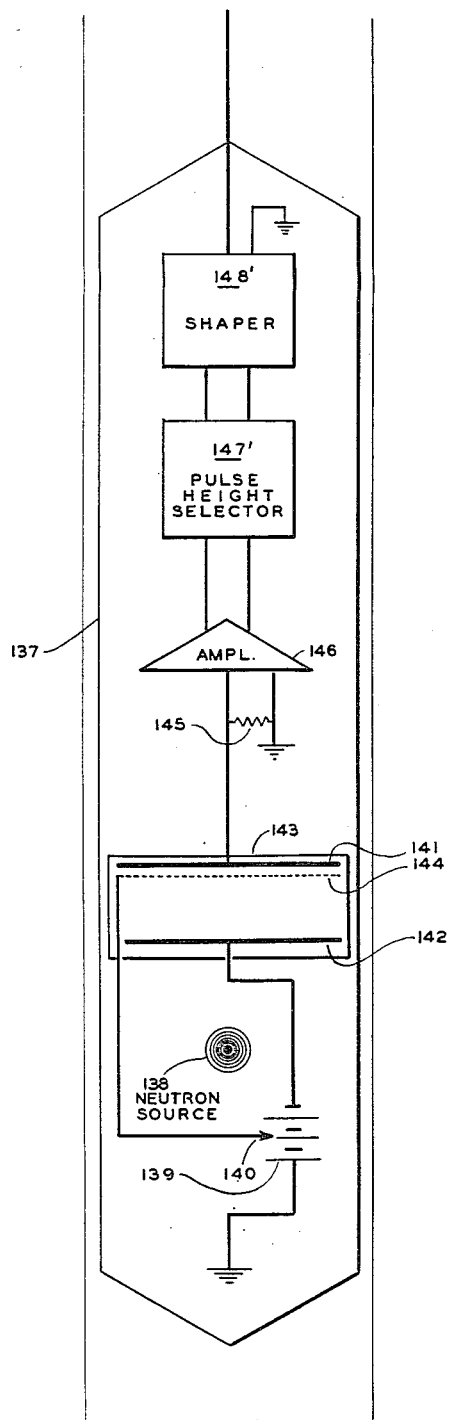
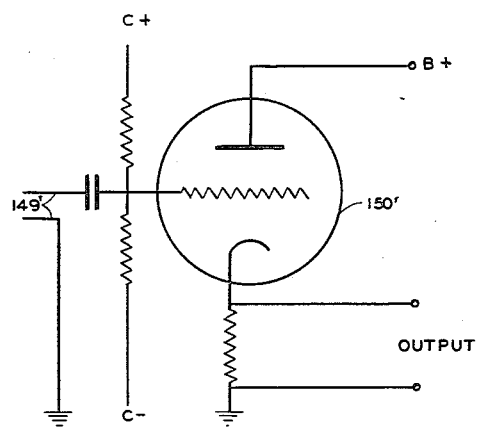
Fig. 18
Fig. 17

INVENTORS
Robert E. Fearon
Jean M. Thayer
BY
James Y. Cleveland
ATTORNEY

June 28, 1955    R. E. FEARON ET AL    2,712,081
METHOD FOR NEUTRON WELL LOGGING
Filed July 30, 1949    18 Sheets-Sheet 13

INVENTORS
Robert E. Fearon
Jean M. Thayer
BY James Y. Cleveland
ATTORNEY

INVENTORS
Robert E. Fearon
Jean M. Thayer

BY James Y. Cleveland
ATTORNEY

June 28, 1955

R. E. FEARON ET AL 2,712,081

METHOD FOR NEUTRON WELL LOGGING

Filed July 30, 1949

INVENTORS
Robert E. Fearon
Jean M. Thayer

BY James Y. Cleveland.

ATTORNEY

United States Patent Office 2,712,081
Patented June 28, 1955

2,712,081

METHOD FOR NEUTRON WELL LOGGING

Robert E. Fearon and Jean M. Thayer, Tulsa, Okla., assignors to Well Surveys, Incorporated, Tulsa, Okla., a corporation of Delaware Application July 30, 1949, Serial No. 107,806

8 Claims. (Cl. 250—83.6)

This invention relates generally to a method and apparatus for identifying substances existing in difficultly accessible locations, for example, adjacent to a deep narrow drill hole, and more particularly to a method and apparatus for identifying and distinguishing these substances from each other by nuclear reactions in the substances.

This invention is directed to the solution of a problem which has been long recognized by geologists and geophysicists, and by others, confronted with the problem of locating valuable substances, such as petroleum, in the sub-surface formations of the earth. The problem of discovering with certainty the existence of a particularly valuable substance in the sub-surface formations of the earth has only been partially solved by the prior art workers. All prior efforts to solve the problem have met with failure for the reason that no parameter could be found which was solely characteristic of the valuable substances that it was desired to locate. As an example, in the art of well logging a partial solution to the problem goes as far as determining with certainty that either salt water or petroleum exists in a particular formation but a complete solution is not possible, since prior to this invention, no parameter was known whereby the two substances could be distinguished, in situ, from each other.

Numerous other methods advanced by the workers in the prior art for locating valuable substances in the sub-surface formations of the earth include: electrical methods which involve the measurement of self-potential, conductivity, and resistivity; thermal methods; seismic methods which treat of the accoustical properties of the sub-surface formations; natural radioactivity of the formations; and those methods in which the formations are irradiated with radioactive radiations and an effect such as the gamma radiation produced by the neutron interactions in the formations measured. All of these methods as well as others which have not been enumerated above, have not afforded a complete solution to the above problem in that none of them measures a parameter that is solely characteristic of the valuable substances that one is desirous of locating.

For the purpose of particularly describing and setting forth the respects in which this invention differs from and represents advancement upon the prior art, there is set forth a description of the efforts of previous workers insofar as they have been directed to the problem which has been stated in the previous paragraph.

The location of petroleum has been attempted by various well logging methods which are sensitive to some physical characteristic imparted to the rocks by the presence of petroleum in them. For example, resistivity methods in combination with other methods somewhat ambiguously enable detection of petroleum. The inconvenience and uncertainty of the use of resistivity methods arise from the fact that resistivity is a general property of rocks, and is possessed by some rocks not containing petroleum to an even greater extent than the degree to which the property is manifested by certain other rocks full of petroleum. For example, Indiana limestone will be found to have a much higher resistivity than oil saturated sandstone of the Frio formation in the Gulf Coast oil fields. Furthermore, sandstone which contains natural gas, has a high resistivity, as does also coal. Moreover, limestone may show a decrease of resistivity where an oil bearing horizon appears. It could similarly be shown how each and every one of the other non-nuclear logging methods have specific shortcomings which analogously prevent them from being or amounting to a specific recognition of petroleum.

In the art of nuclear well logging, to which this invention belongs, particular attention is called to the method described by John C. Bender in his United States patent, No. 2,133,776, in which he recites a method of observing secondary radiations caused by exposing the formations adjacent to a bore hole to primary radiation, such as X-rays and radiations of radium and uranium. The property of matter which one would observe in carrying out the disclosure of Bender can be said to be related to electrons in the matter. This property is shared by all substances to a greater or lesser degree, and is not, therefore, capable of making a specific distinction of petroleum.

There are also two methods which have been previously discovered and disclosed in United States patents, Nos. 2,308,361 and 2,349,712, by Robert E. Fearon, in which is described bombarding the strata of the earth adjacent to a bore hole with neutrons and observing any secondary rays that may be produced from the formations as influenced by the bombardment. This capacity of material to react with neutrons and give secondary rays of several sorts is a common and highly distributed property possessed by the substances of the earth. These methods, moreover, enable measurements to be made which are specifically influenced by the presence of hydrogen. The way in which the influence of hydrogen comes into play in these previous inventions, is through its ability to partially prevent neutrons from a source separated from a detector of secondary radiation from arriving in the vicinity of the detector. Without arriving in the vicinity of the detector, they are, of course, unable to react upon general characteristics of the matter there present, or produce secondary rays of any nature.

The specific indication of hydrogen through this phenomenon, which occurs in the practice of the above mentioned patents, is the nearest approach to a direct observation of petroleum. The recognition of hydrogen, desirable though it is, falls short of the solution of the problem of identifying petroleum, because of the presence of hydrogen in nearly all porous strata. The hydrogen combined with oxygen, as water, is generally present in porous strata. The shales also are very rich in hydrogen though non-porous and not usually a source of petroleum. To secure a specific recognition of petroleum will require some kind of observation or system of observations which would relate themselves more specifically to its occurrence.

Folkert Brons has set forth in his United States patent, No. 2,220,509, a method generally similar to the above two methods in which the observations are ascribed to that form of secondary radiation which comprises slow neutrons. He provides that his observations be based upon the detection of those neutrons which has been diffused, or slowed down, by interactions with elements in the strata of low atomic weight. He effects his measurements by producing, in the detector of radiation, disintegration products resulting from the reaction of his slow neutrons with the atomic nuclei which are there present, and detecting these disintegration products as an indication of the presence of slowed-down neutrons. As specified by Brons, his method of observing a particular class of secondary radiation, caused by neutron bombardment, is particularly sensitive to the presence in the strata of atoms among which the neutrons may diffuse, and which are of low atomic weight. Since the most outstanding example of low atomic weight atoms in the earth is the element hydrogen, the property to be observed by Brons will, like the previous inventions of Robert E. Fearon, give particular emphasis to hydrogen. The general weaknesses of these methods are thus apparent, as they are applied to the problem of identification of petroleum.

Russell has disclosed, in his United States patent, No. 2,469,462, a method of making observations which rely upon certain other properties of strata enabling him to perform measurements which ignore the concentration of hydrogen present therein. These other properties, thus observed, will obviously correspond with different geological factors and will correlate differently than is the case for methods which are preeminently hydrogen-sensitive.

As Russell states, his log "indicates the presence of and evaluates other variables affecting the usual neutron log, such as an increase or decrease in hardness or intensity of the gamma rays of neutron capture which almost necessarily occurs with a change in concentration of the elements chiefly responsible for capture."

It may be set forth that Russell's method, if practiced in accordance with his specification, will be particularly sensitive to the extent of neutron capture for neutrons of high energy. This is true since he makes his observation, among other things, at a distance at which the rate of production of degraded neutrons of low energy has not risen to the value expected for large thicknesses of matter. Thus, in his case, there are in the vicinity of the detector of radiation, a relatively larger population of energetic neutrons, and the effects of these neutrons on the detector are therefore more likely and are relatively emphasized. Now it is the nature of his invention, from the standpoint of nuclear physics, that the reactions of carbon with neutrons are quite improbable. It is not, therefore, to be expected that Russell could, by his method, recognize petroleum except ambiguously through his provision of means sensitive to the presence of hydrogen, which he has also set forth in this patent.

Therefore, this patent of Russell's, like the others enumerated above, falls in the general class of nuclear methods not giving specific recognition of petroleum, and, because of this shortcoming, does not represent a complete solution to the problem which has been recited.

In his United States Patent 2,469,463, Russell has specified means of measuring and comparing several additional factors in neutron well logging, which are not primarily or chiefly related to hydrogen content. It might be said that in this invention, Russell has set forth a means of measuring the factor "C," which has been defined, and to which significance has been attributed in column 1, page 37 of volume 4, No. 6, Nucleonics, June 1949. As can be seen from consideration of this published discussion of this factor, it will not be easy to measure, because of its relatively small variations from one rock type to another. Furthermore, specifically, there is nothing especially indicative of petroleum which will influence this factor. Unfortunately, contrary to Russell's statements, the ability of hydrogen to capture neutrons is quite appreciable, when compared with other elements commonly present in the earth. Also, hydrogen stands apart among the elements of the earth in that it emits uncommonly little gamma-ray energy per neutron whch it captures. For these reasons, the practice of Russell's Patent 2,469,463, will still result in a measurement which is preeminently affected by hydrogen, and which is therefore unable to specifically identify petroleum, and does not represent the solution to the problem to which this invention is directed.

Russell's patent, No. 2,469,461, is a method of studying density by scattering of gamma rays from subsurface strata. There is no indication that there is any specific correlation between density and the occurrence of fluid in the pore spaces of rocks. Too many factors unrelated to the occurrence of fluid have a larger effect on density. Kind of rock minerals predominantly present, amount of cementation, amount of pore space, all have a great effect, and prevent Russell's gamma ray scattering procedure from being used as a method of specifically identifying petroleum. This invention of Russell therefore also falls short of being a solution to the problem to which the present invention is directed.

The instant invention provides a complete solution to the above problem. This solution consists of a system of observations by which the operator is enabled to recognize and quantitatively measure nuclear species of the subsurface formations adjacent a bore hole. Although the desired substances quite often are not elements or single nuclear species the chemical laws of combining proportions enable accurate appraisal of such things as the occurrence of petroleum. Recognition of nuclear species is accomplished by subjecting the substance adjacent to the bore hole to bombardment with penetrating radiations of a nature to cause specific and determinative quantized changes in the potential energy of the said nuclear species. These quantized energy changes which are specific to the particular kinds of atoms to be determined are used as a means of recognizing the desired atoms, which recognition is accomplished by means of selective neutron detection, selective for specific energy ranges of neutrons, and/or specific limits of direction of incidence and sense of direction of incidence.

Among the means which are required for the solution of the above problem, there is provided exceedingly powerful and energetically efficient monoenergetic neutron sources, relying upon the nuclear reactions caused by electrical or electromagnetically accelerated particles. These are provided in a form which is adapted to be lowered into a bore hole, and employed therein to bombard the rocks adjacent to the bore hole. Also required for the practice of this invention are powerful capsuled neutron-emitting sources, depending for their operation upon energetic particles emitted by radioactive substances. There is set forth the manner of choosing and designing such neutron-emitting sources, showing how a person skilled in the art can avail himself of intensities hundreds of times greater than those which are now available.

Required in the practice of this method are various means of observing neutrons which permit the determination of the energy, the direction of incidence of neutrons, and the sense of direction.

Among these means, there are provided devices which determine both energy and direction of incident neutrons within certain limits. There is also provided a device for detecting phenomena described in nuclear physics as n-p reactions. This device enables exact determination of energy of neutrons, and a somewhat ambiguous determination of direction. Incidental to the practice of this invention also is a device for resolving nuclear data which gives only a general indication of energy, and interpreting this general indication of the energy of neutrons in a more exact way. There is also provided, as a means of practicing this invention, a choice of the manner of employment of a number of neutron filters adapted to select specific energy groups of neutrons. It is shown how these filters may be employed for the purpose of identifying specific elements in the strata.

Therefore the primary object of this invention is the provision of a method and apparatus for identifying valuable substances by separately measuring the influence of specific properties of the nuclei of the valuable substances upon a flux of fast neutrons.

Another important object of this invention is the provision of a method and apparatus whereby petroleum can be positively identified in the subsurface strata adjacent a bore hole.

This invention also contemplates a method and means for locating valuable substances situated in difficultly accessible locations by identifying and measuring the influence of at least one of its elementary components on a flux of fast neutrons.

Still another object of this invention is to achieve the above objects by irradiating formations with fast neutrons and measuring the intensity of neutrons falling within specific energy bands and which have rebounded from the formations.

Another object of this invention is to provide a method and means for producing a log of a drill hole by recording versus depth the average rate of occurrence of processes occasioned by fast neutrons of selected energies which enter the detecting device.

A further object of this invention resides in the provision of a method and means for detecting neutrons, selecting pulses produced thereby whose energies lie in a predetermined range, and recording their time-rate of occurrence versus depth.

Another object is to provide a novel monoenergetic neutron source which is compact and permanently enclosed.

Still another object is to provide a novel radiation source of the above type that will produce 17 m. e. v. (million electron volt) gamma rays.

Another object is to provide means for delivering to a recorder electrical signals which denote the intensity of neutrons of a definite energy class.

This invention also contemplates means for determining specific energy losses in samples of substances exposed to neutrons of a determined energy for the purpose of adjusting energy selective neutron detector systems used in well logging.

Another object is to provide a method and means to accomplish deep investigation in a direction perpendicular to a bore hole and concurrently provide very detailed resolution of thin strata.

Still another object is to provide detectors which are directionally sensitive and which are adjusted with respect to the source for favorable angle of fast neutron scattering from formation substance that are capable of determining variations of the properties of strata with distance horizontally.

This invention also contemplates a novel detector whereby dip determinations can be made in a drill hole.

Another object of this invention is to provide a detecting system whereby horizontal anisotropy can be detected.

Still another object is to provide means for detecting horizontal anisotropy in a measurement based upon a particular energy of neutrons.

A further object is to provide a detecting system whereby vertical direction sensitivity and sense of direction of neutrons of a particular energy can be detected.

Another object is to measure the energy of pulses having a particular energy.

Other objects and advantages of the present invention will become apparent from the following detailed description when considered with the drawings, in which.

Figure 31:
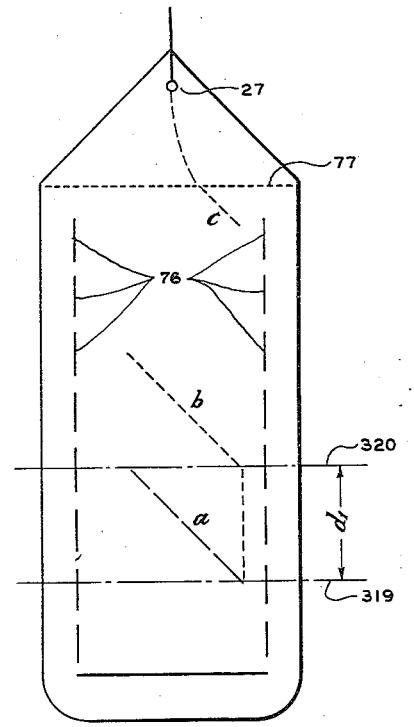
Figure 32:
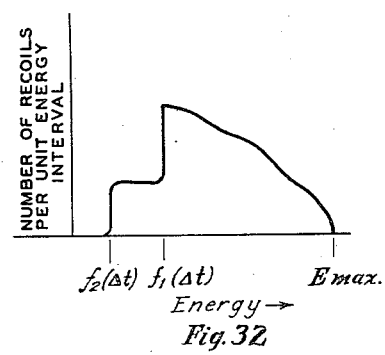
Figure 10:
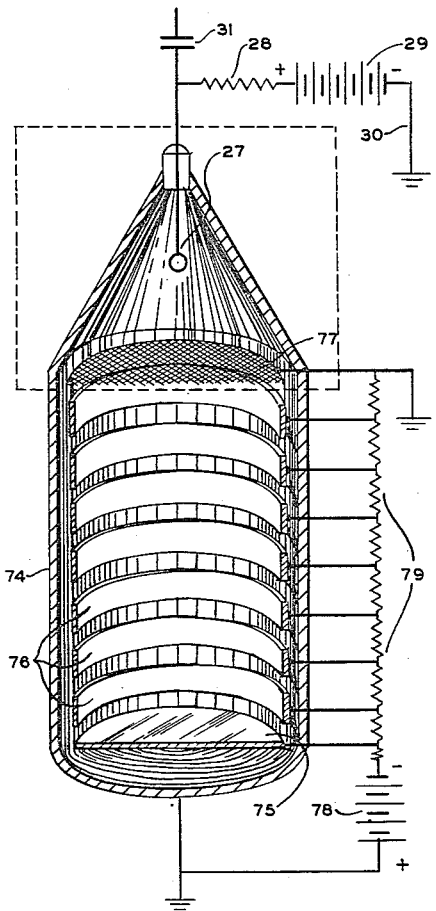
Figure 10 shows in perspective a vertical section of a novel detector.
Figure 15:
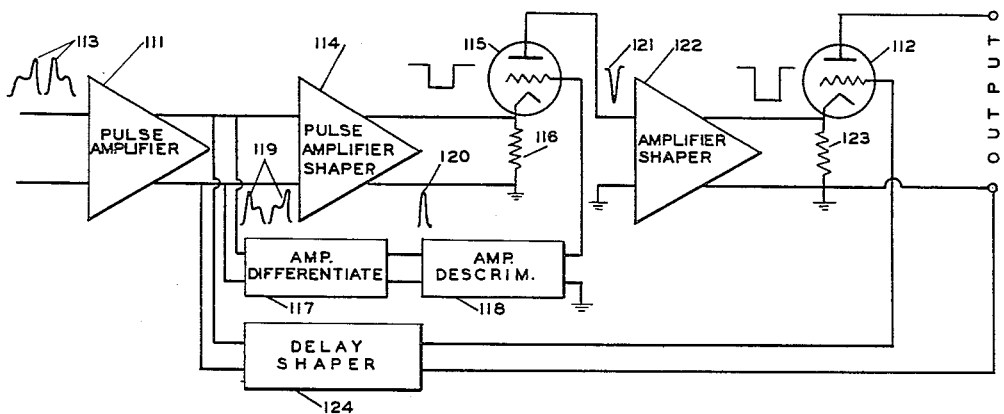
Figure 16:
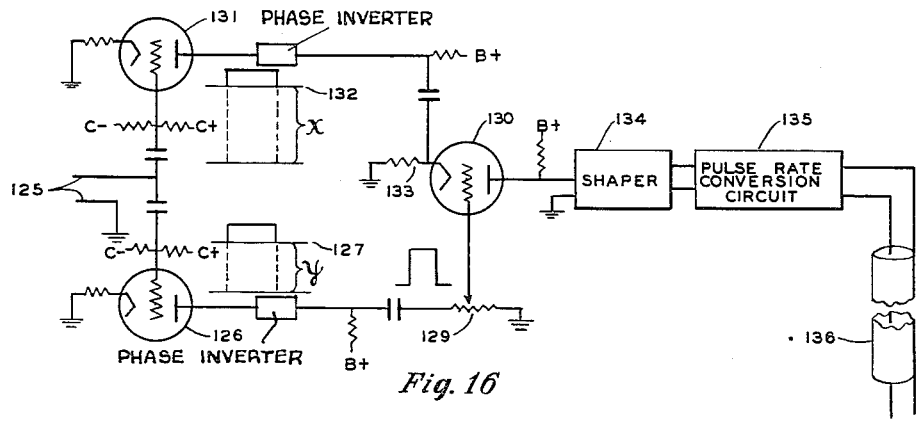
Figure 19:
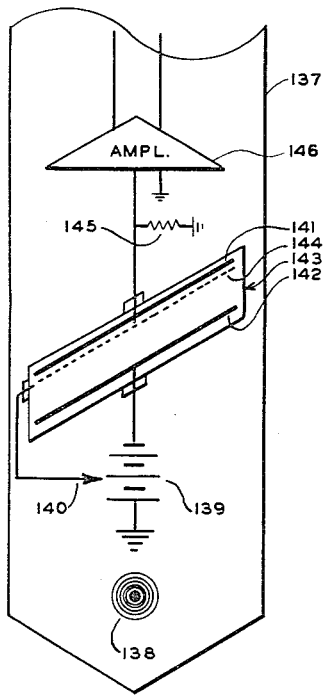
Figure 22:
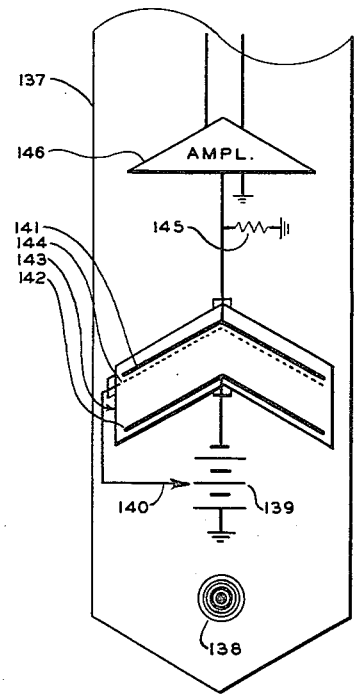
Figure 20:
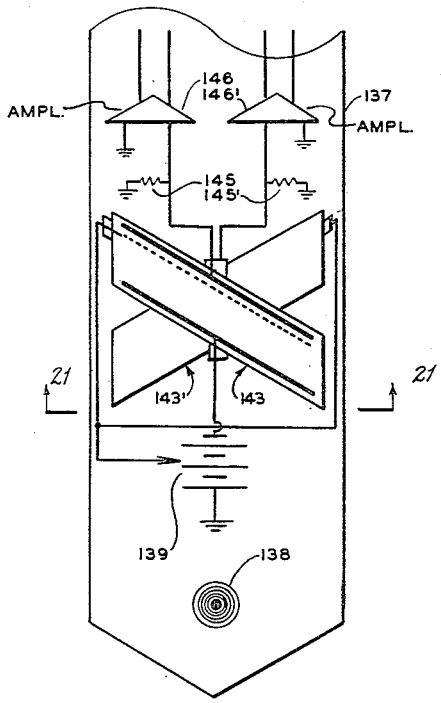
Figure 21:
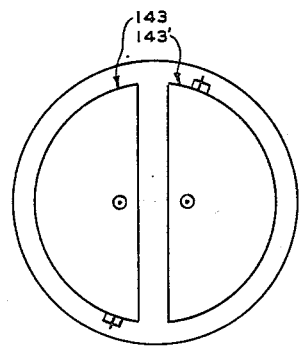
Figure 23:
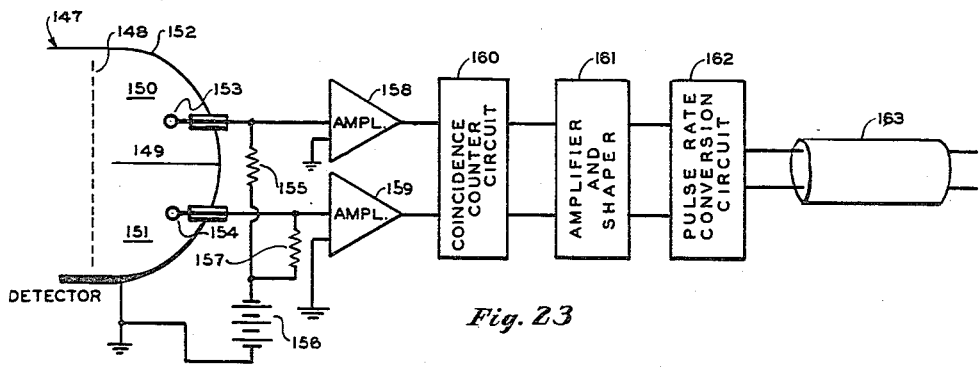
Figure 24:
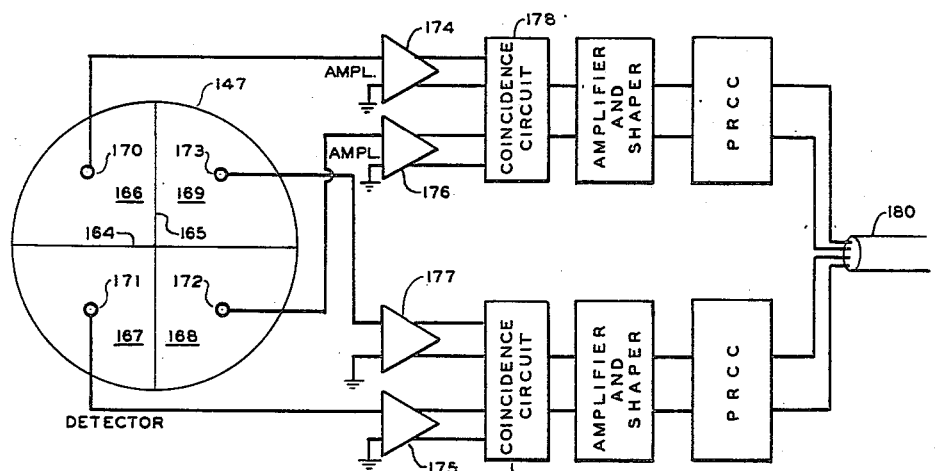
Figure 28:
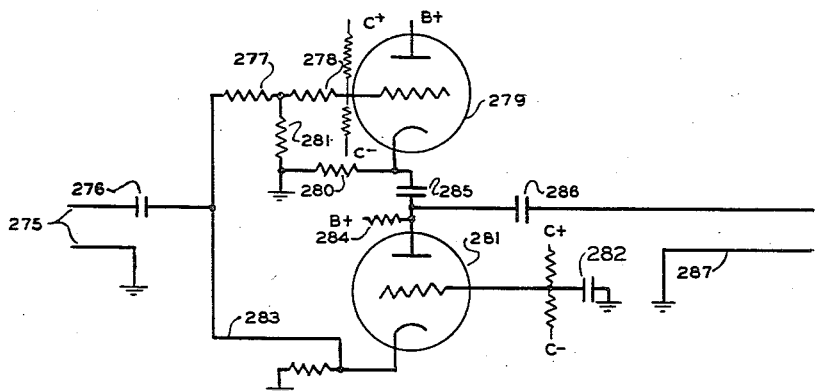
Figure 25:
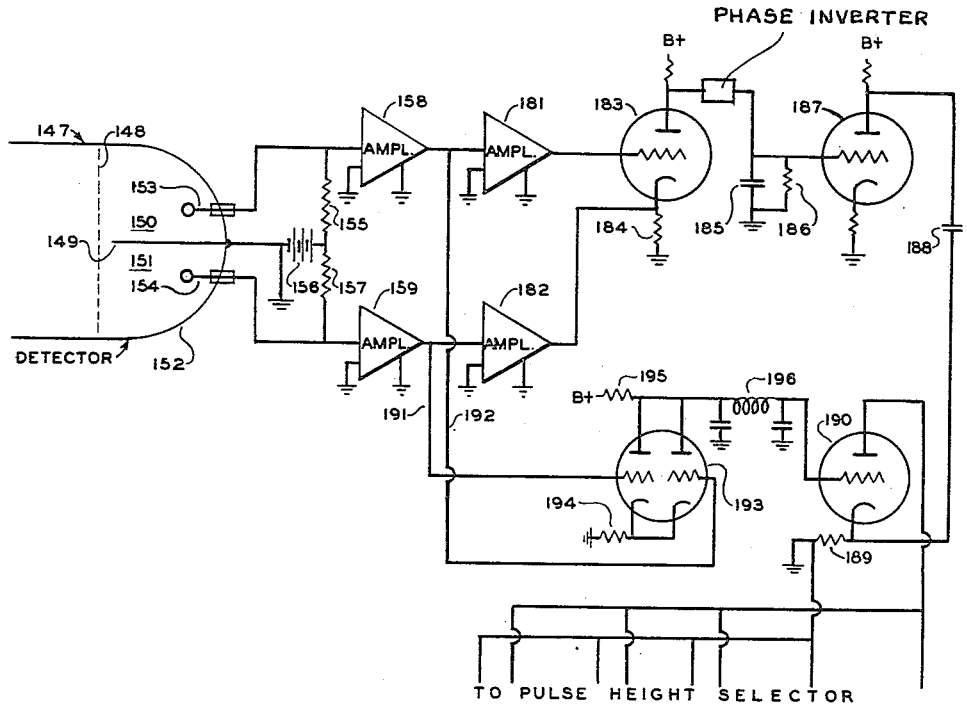
Figure 33:
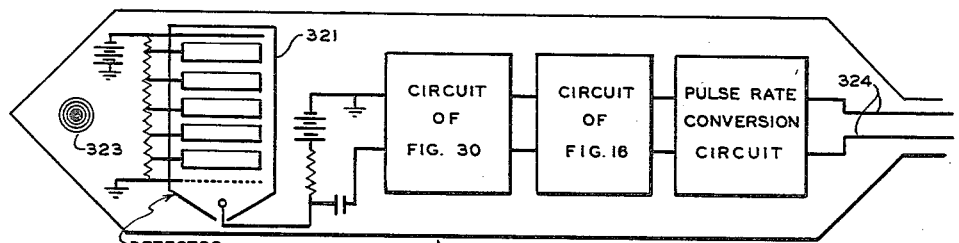
Figure 26:
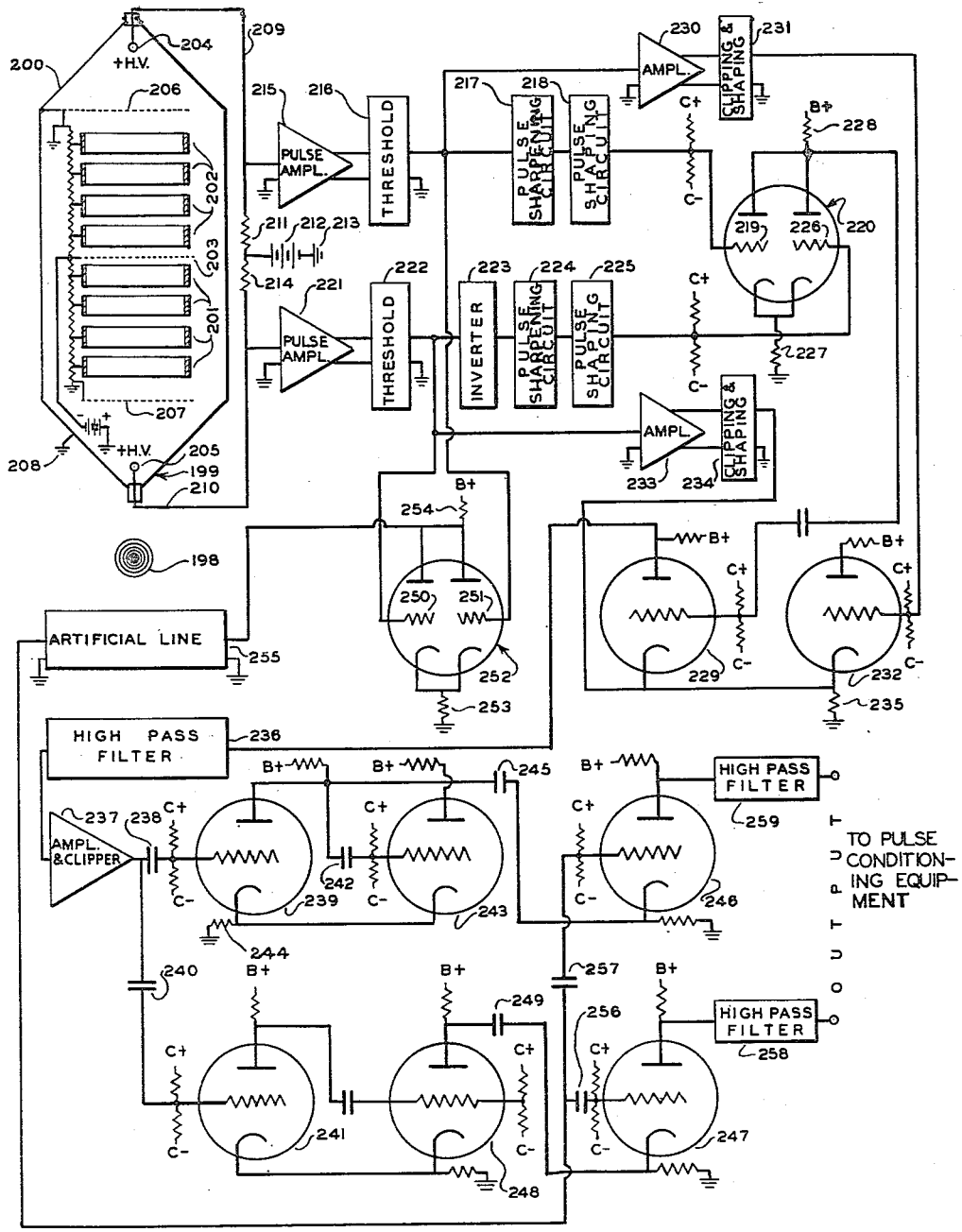
Figure 30:
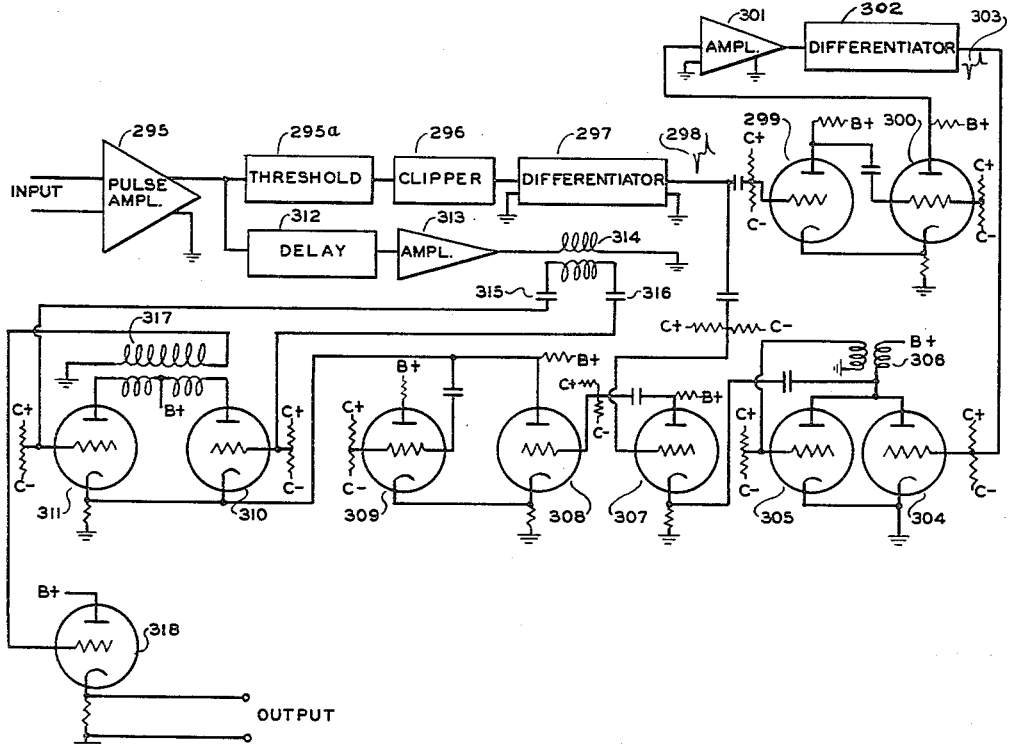
Figure 27:
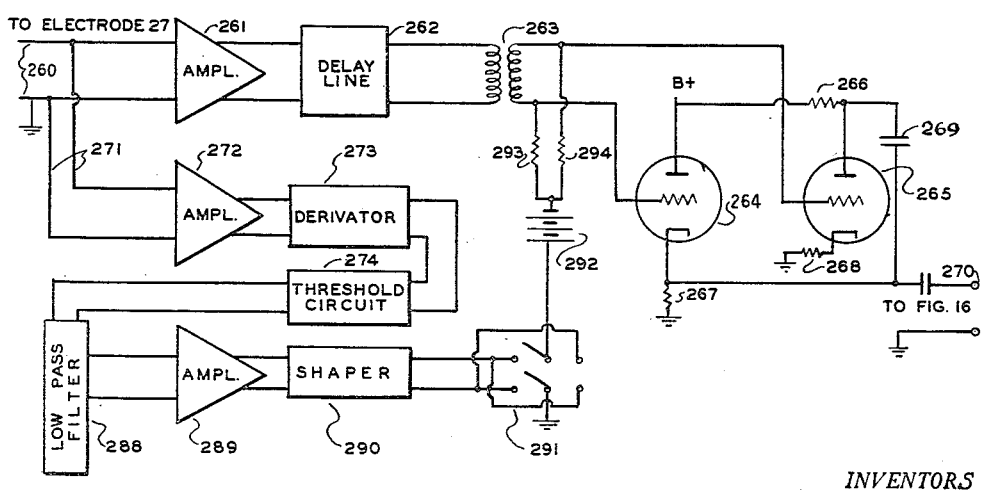
Figure 29:
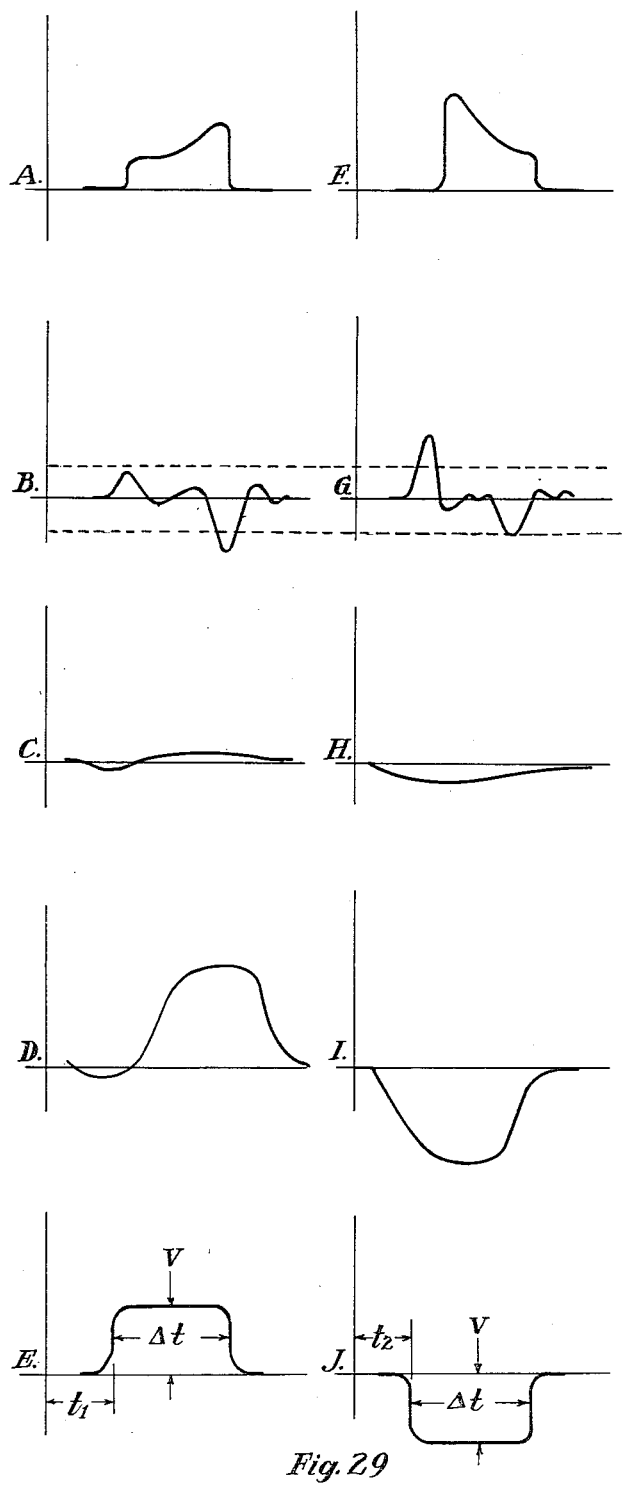
Figure 34:
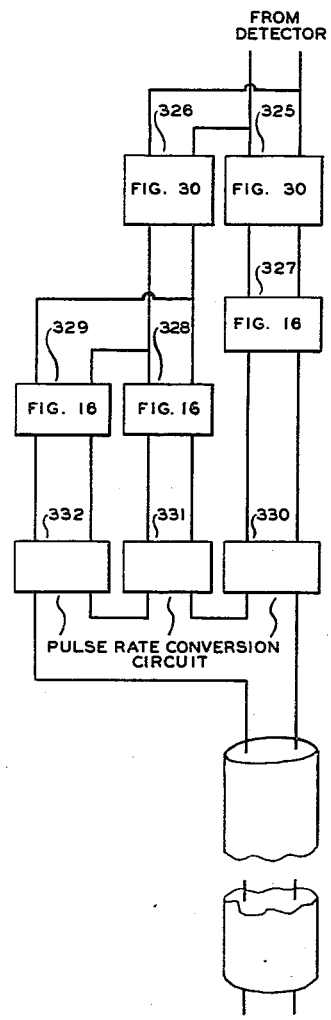
Figure 35:
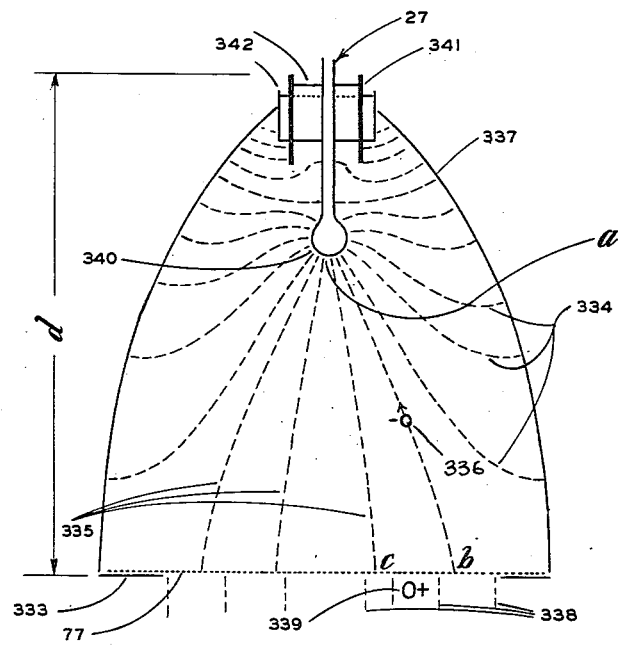

Figures 11A, B, C and D are graphs representing ballistic reactions of neutrons with recoiling atoms;

Figures $12A_0$, $B_0$, $C_0$, $A_1$, $B_1$, $C_1$, $A_2$, $B_2$, $C_2$, and D are graphs representing the application of neutron ballistic theory to analysis of a plurality of neutron energy groups;

Figure 13 is a schematic wiring diagram showing means for observing relative excess or deficiency of fast neutrons of a particular energy;

Figure 14 illustrates schematically a system for classifying the energy of ionizing processes occurring in a fast neutron detector;

Figure 15 schematically illustrates a system whereby ionizing events caused by $n—p$ or $n—\alpha$ processes occurring in a detector of fast neutrons may be selected and faithfully transmitted;

Figure 16 is a schematic diagram of an electrical system whereby pulses of a particular range of height can be selected out of a class of pulses containing all heights;

Figure 17 is a diagrammatic illustration of a wall logging system employing a novel type of detector, and a novel detector-source arrangement;

Figure 18 is a detailed wiring diagram illustrating the contents of one of the elements utilized in Figure 17;

Figure 19 illustrates a modification of the detector shown in Figure 17;

Figure 20 illustrates still another modification of the detector shown in Figure 17;

Figure 21 is a cross-sectional view of the detector shown in Figure 20 taken along the line 21—21 as indicated;

Figure 22 illustrates still another modification of the detector shown in Figure 17;

Figure 23 is a schematic diagram of a fast neutron detecting system having transverse directional sensitivity;

Figure 24 illustrates in cross-sectional view a modification of the detector shown in Figure 23;

Figure 25 is a schematic diagram of a fast neutron detecting system having directional sensitivity and whereby pulses representing the energy of ionizing processes may be utilized;

Figure 26 is a schematic diagram of another embodiment of fast neutron detecting systems in which there are neutron direction sensitivity, sense of directional sensitivity, and energy sensitivity;

Figure 27 illustrates schematically a further embodiment of detecting system in which direction, sense of direction, and energy of fast neutrons are detected;

Figure 28 is a wiring diagram illustrating the contents of the threshold circuit shown schematically in the bottom portion of Figure 27;

Figure 29 shows a system of graphs which illustrate the behavior of the circuit of Figure 28;

Figure 30 is a schematic diagram of an electrical system for pulse duration selection;

Figure 31 is a diagrammatic illustration of a detector, similar to that in Figure 10, in which is shown the geometric interpretation of the application of the circuit shown in Figure 30;

Figure 32 is a graph of data obtained when employing the circuit of Figure 30 and the circuit of Figure 16 in connection with a fast neutron detector containing two elements in the gas;

Figure 33 illustrates schematically a well logging operation based upon the use of fast neutron scattering resonances;

Figure 34 is a schematic diagram showing the arrangement of the units used in Figure 33; and Figure 35 is a fragmentary vertical sectional view of a detector showing the distribution of the electrical field produced by the potential on the collecting electrode.

As pointed out above, consideration of the problem of well logging had led to the conclusion that there is a necessity for the discovery of methods which will identify more specifically the substances found in the rocks adjacent to wells which are logged. Specific identifying properties, which could be relied upon as a means of recognition of substances, must be able to cause an effect which is observable under the logging conditions which prevail. Preferably the process making the observations possible should be one which acts through space and through matter which fills the space between the position in which the rock to be identified is found, and the location of the detecting apparatus in the bore hole. The necessity for acting through space arises because of the prevalence of casing and/or cement and/or fluid of various sorts which commonly exist in the well bores, and which interfere with the measuring process. Another reason why considerable action through space is essential is the need for the depth of investigation to be adequate. Considerable depth of investigation is a highly desirable factor in well logging because of the heterogeneity of rocks making shallow observations unrepresentative, and therefore inaccurate as a representation of the whole mass of rock penetrated.

There are available at the present time only a very few types of influences by which desirable observations as discussed above may be made. Obviously, the magnetic and electric fluxes are not available for consideration in connection with cased wells, and the electric flux is unusable when investigating non-conducting material. The observation of the heat flux is familiar in the art of well logging and has patently the disadvantage that such observations are slow if one desires a considerable depth of investigation. The transmission of observable infrared and ultraviolet radiations is excluded because of the opacity of substances generally present in the earth and in bore holes. The gravitational flux has satisfactory properties, and, in principle, could be measured. But no known means of measuring it for well logging purposes has been found.

In attacking the above problem, seeking for a method of specific recognition of material, in the circumstances of a bore hole penetrating the rock strata of the earth, it has been discovered that there are apparent specific properties of atomic nuclei corresponding with energy transitions in those nuclei. These transitions may evidence themselves in a variety of ways, such as:

*a.* The emission of radiant energy through space.

*b.* The absorption of a particular amount of energy from a bombarding particle or quantum.

*c.* A specific energy threshold or a plurality of energy thresholds of susceptibility of the nuclei to certain classes of nuclear change, which may be caused by bombarding corpuscles or quanta.

It has been discovered that in all branches of molecular, atomic, and sub-atomic physics, one may generally predict that if a specific energy transition is possible in a quantized system, there will be a resonance effect, specifically affecting bombarding particles or quanta possessing energy (either kinetic or potential) in the close vicinity of the amount required to produce a quantized transition. The discovery of the details of quantization of nuclei of atoms still waits for extensive experimental and theoretical work. Limited experimental evidence has already brought support to the conviction which exists in the minds of all nuclear physicists to the effect that nuclei will surely be found to be quantized systems. In some instances energy thresholds of various kinds have already been determined for nuclei. For example, the photo-neutron threshold is now known experimentally through the study of its inverse process, capture, by Kubischek and Dancoff.

A specific energy threshold at 20 megavolts has been found for the system comprising 4 nucleons (2 protons and 2 neutrons). Sundry isomeric transitions corresponding with highly forbidden transformations of the arrangements of nucleons have been found experimentally and can be considered as additional evidence of the truth and experimental significance of the general conclusion that nuclear matter exists in quantized energy states.

In an effort to make use of the foregoing general conclusion, it has been discovered that only two classes of radiation appear to exist which react with nuclear matter appreciably and can be arranged conveniently for the observation of quantized energy levels of nuclei. These classes of radiation are the photon or electromagnetic class, and the corpuscular class comprising neutrons. Other particles (charged) in general do not penetrate the coulomb field of force surrounding a nucleus at energies falling in the range of possible excitation processes of common nuclei. Such excitation processes are typically expected for light nuclei in the vicinity of 1 million electron volts.

Charged particles lack action through a distance as defined herein. Therefore, corpuscular radiations of the charged variety would, in principle, not be particularly useful for investigation of the quantized levels of nuclei. Of the classes of radiation which have been suggested, the only one which has been discovered which has a favorable ratio for the amount of interaction which it undergoes with nuclear matter, as compared with the energy transitions effected in the progress of the radiation by circumstances arising outside the nuclei of atoms, is the neutron. The photon reacts extensively with orbital electrons, and has only a very small cross section (target probability) for interactions with nuclei as such. There is furthermore an additional reaction of photons which becomes prominent above 2 electron megavolts, and which, in the range above 2 electron megavolts results in materialization of electron-positron pairs. This materialization, though influenced by the presence in the near vicinty of the nuclear field of force, does not represent a specific or identifying characteristic of particular nuclei, but is a general characteristic of all nuclei, more prominent for the nuclei of heavy elements like lead and less prominent for the nuclei of light elements such as aluminum. For the above listed reasons, there appear to be only a few especially simple reactions caused by photons which might be of any use. One might find it desirable to observe the neutrons released from nuclei by photons, since there is, for such nuclear photo-neutrons, a specific threshold of energy for each nuclear species (element or isotope thereof). One might also investigate the "unmodified" Compton scattering of energetic photon radiations in the hope of finding some slightly modified lines which suffered loss of energy by interaction with nuclei. This possibility is somewhat favored by the fact that the otherwise much stronger modified Compton scattering radiation is readily eliminated from the flux by absorption.

On the other hand, the interaction of neutrons with the outside parts of the atom is so small that the direct production of ion-pairs by neutrons is found to occur on an average of only about one time per meter of ordinary atmospheric air for a neutron possessing a kinetic energy of five million electron volts. The liberation of energy by neutrons in air therefore amounts to less than one thousandth of 1% per meter of air traversed for energy liberated by processes involving the outside portions of the atoms found in the air. A distance of travel in air which would result in an average loss of energy by reaction with outside parts of the atoms of less than 1%, would, nevertheless, result in total absorption of the neutrons, and all their energy, by reaction with the nuclei of the atoms contained in air. Even so, many of the reactions which neutrons undergo, which occur between neutrons and nuclei of the matter, are not highly specific, nor do they aid in any refined efforts to identify such matter. Among the unidentifying nuclear reactions one may name, for example, conservative ballistic nuclear scattering of neutrons, that is, conservative of total kinetic energy. This process is specifically different to an extreme degree only in the case of very light elements such as hydrogen and helium. The average nature of other matter contained in the rocks is sufficiently alike in this respect that the main possibility of use of the property of conservative ballistic nuclear scattering of neutrons is to observe differences in the propagation of neutrons through the rock which enable conclusions regarding the presence of hydrogen to be made. This effect is already made use of, and there exist a considerable number of U. S. patents and other published descriptions bearing on this subject. Among these patents are No. 2,308,361, No. 2,220,509, and No. 2,349,712. The broad class under which these previously named inventions fall corresponds with a patent issued to John C. Bender, No. 2,133,776.

The theory of detection of hydrogen by conservative ballistic nuclear scattering is treated in an article written by Robert E. Fearon and published in the June 1949 issue of Nucleonics, entitled "Neutron well logging."

Figures 1, 8:
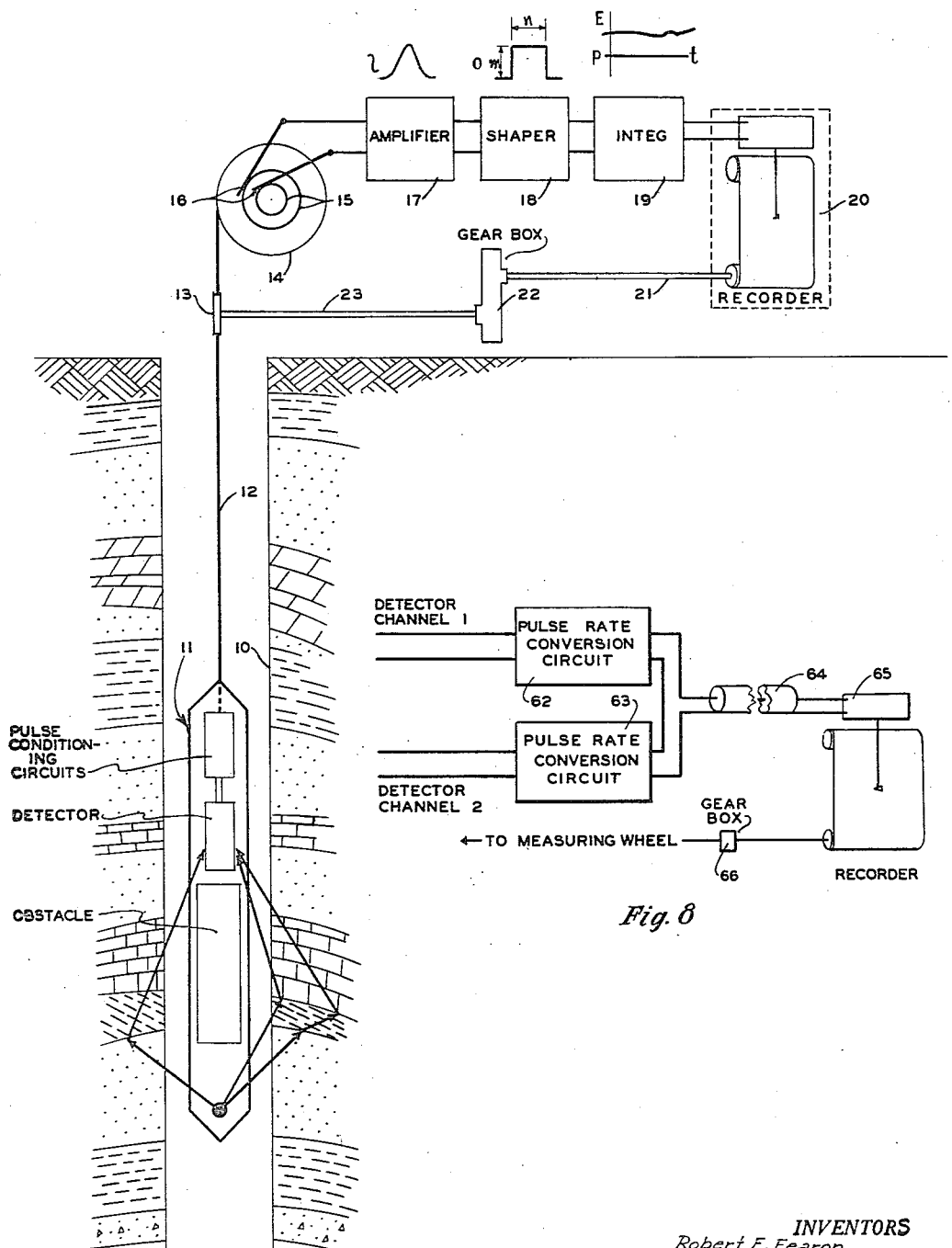
Figure 1 is a schematic illustration of a well logging operation showing the surface recording system.
Figure 8 shows a schematic wiring diagram illustrating a use of pulse rate conversion circuits.
Figures 2, 7:
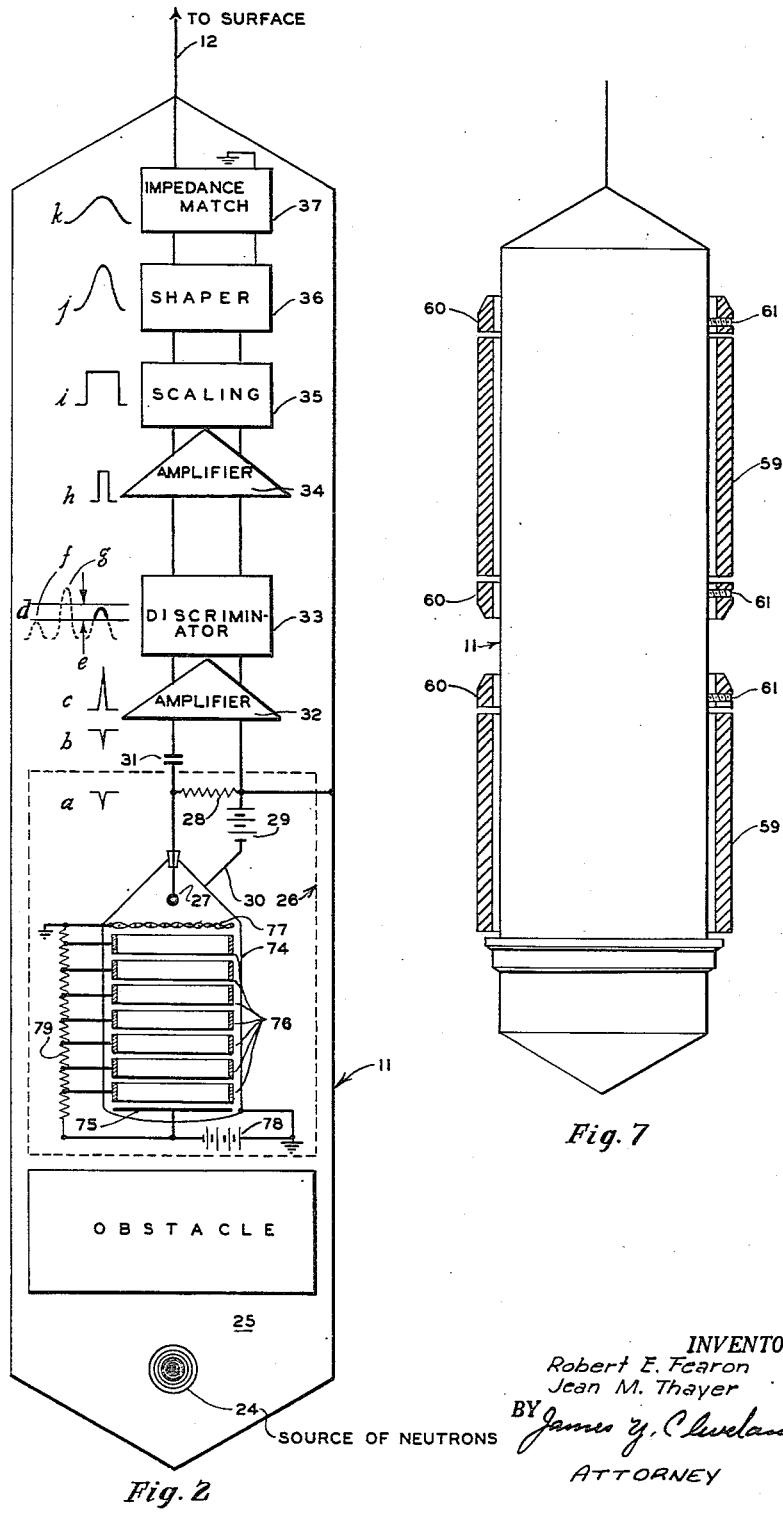
Figure 2 is a diagrammatic illustration of a subsurface instrument with the detector illustrated in vertical section.
Figure 7 shows a schematic illustration of a subsurface instrument having removable shields thereon.

The above theory finds general application in pursuing this method, and Figures 1 and 2 more particularly set forth the details of arrangements through which these general concepts find specific application to the problem set forth above.

Referring to these figures there is illustrated an application of this invention to a well surveying system. In Figure 1 there is shown schematically a drill hole 10 which may or may not be cased. Disposed in the drill hole and adapted to be raised or lowered therein is a housing 11 supported by a cable 12. Cable 12 comprises at least one electrical conductor connecting the electrical apparatus within the housing 11 to apparatus located adjacent the mouth of the drill hole 10. The apparatus on the surface of the earth consists of a measuring wheel 13 over which the cable 12 passes and a winch or drum 14 on which the cable is wound, or from which it is unwound, when the housing 11 is raised or lowered in the drill hole 10. Conductors are connected to the cable 12 by means of slip rings 15 and brushes 16 carried on one end of drum 14. These conductors lead to an amplifier 17. Amplifier 17 is a conventional audio amplifier having a flat frequency response. The output of amplifier 17 is conducted to a pulse shaper 18, the purpose of which is to insure the delivery of square topped waves of constant height to an integrator 19. Integrator 19 is adapted to receive the aforementioned pulses and generate therefrom an electromotive force which is proportional to the average time-rate of occurrence of the pulses. This signal is delivered to the recorder 20 where it is recorded versus depth. The depth axis of the recorder is actuated by the shaft 21 which leads from a gear box 22, connecting through shaft 23 to the measuring wheel 13. The gear box 22 has adjustments to enable suitable choice of depth scales.

Referring specifically to Figure 2 a description of the contents of housing 11 will follow. It is to be understood that housing 11 will be constructed to withstand the pressures, and mechanical and thermal abuses encountered in surveying a deep bore hole and yet provide adequate space within it to house the necessary apparatus and permit the transmission of radiation through it.

In the bottom portion of housing 11 there is located a radiation source 24 which may be surrounded by a radiation filtering material 25. This radiation source may take various forms which will be described in detail later in the specification. Above the filtering material 25 and lying between the source of radiation and a radiation detector 26, there is a region of space which may be occupied by suitable materials or left vacant determined by considerations explained as the description progresses.

The detector 26 is of the type which will detect neutrons as a result of the production of prominent bursts of ionization therein, caused by rapid movements of heavy charged particles such as protons, alpha particles, etc., set in motion by the neutrons. The bursts of ionization are very quickly collected in the detector 26. These bursts are registered as electrical pulses and resolved timewise from other or smaller pulses which may occur almost concurrently. The detector 26 is so designed and so operated that the magnitude of the electrical pulse released from the collection of a specified amount of electrical charge will always be quite accurately proportional to the amount of the electrical charge collected and substantially independent of the path in the detector along which the burst of ionization occurred.

The current corresponding to a pulse, flowing in the electrode circuit which includes conductor 27, resistance 28, battery 29 and conductor 30, produces a voltage pulse across the resistance that is of the form illustrated at $a$. The pulse produced across the resistance 28 is impressed through the condenser 31 upon the input of an amplifier 32. As shown at $b$ the pulse has suffered negligible loss and no distortion in passing through the condenser 31. The amplified pulse, illustrated at $c$, has been inverted in polarity but otherwise faithfully reproduced. It is then conducted to the pulse height distribution analyzer 33. Here only those pulses whose magnitude fall within a prescribed range, such as illustrated at $d$ and designated by $e$, are accepted and transmitted. Other pulses such as are illustrated at $f$ and $g$ are not accepted and transmitted. Those pulses which are accepted and transmitted are delivered to an amplifier 34. Amplifier 34 is one having a flat frequency response extending upward to the highest frequency required to faithfully amplify the pulse delivered to it in a manner shown at $h$. The output signal from the amplifier 34 is fed into a scaling circuit 35 which, in a known manner, delivers pulses as illustrated at $i$, the number of which, occurring in a given time is less by a constant factor than the number received in the same interval of time. The output of the scaling circuit is fed into a shaper 36 which transforms the pulse into the shape illustrated at $j$. The shaper 36 may take the form of a powdered iron core transformer. The signal from the transformer is then fed into impedance matching means 37, such as a cathode follower, which faithfully reproduces the voltage wave as illustrated at $k$. The impedance matching means 37 introduces the signal into the transmission line contained within the cable 12 for the purpose of transmitting it to the surface.

It is to be understood that all elements within the housing 11 which require power may be powered in a conventional manner as taught in the art by means such as batteries or rectified alternating current. Batteries which very satisfactorily fulfill the temperature requirements in hot wells are the zinc, potassium hydroxide, mercuric oxide cells.

Figure 3:
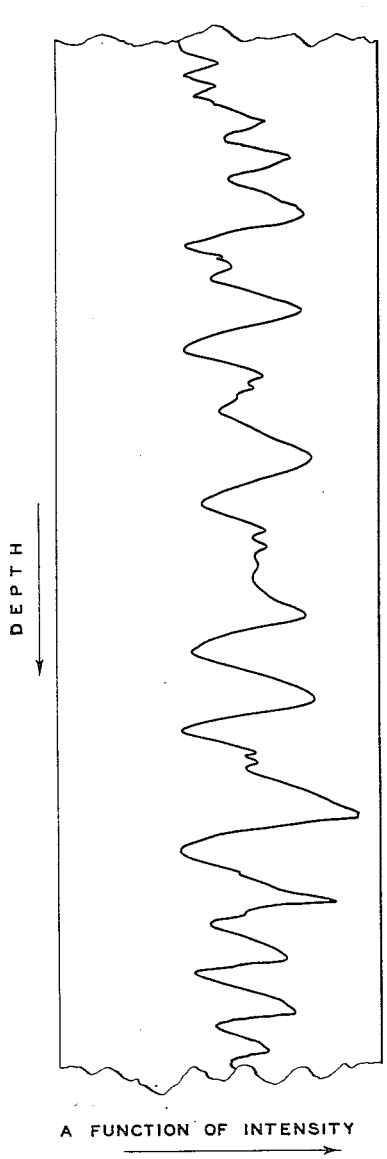
Figure 3 illustrates the type of well log that would be produced by the present invention.

Again referring to Figure 1, the signals transmitted to the surface by means of cable 12 are taken therefrom by means of slip rings 15 and brushes 16 and are conducted to the amplifier as pulses, one of which is illustrated at $l$. These amplified pulses are received by a pulse shaper 18 which modifies their form in the manner illustrated at $o$. The pulse illustrated at $o$ will always have a fixed square form and a fixed width $n$. These substantially square pulses are then fed into the integrating circuit which delivers the signal to the recorder 20, as has been previously described. The integrating circuit thus produces a time-dependent voltage wave such as shown at $p$. When this signal is impressed on the recorder, which has been coordinated with depth, a curve will be drawn as shown in Figure 3. This curve has as its ordinate depth in the bore hole and as its abscissa a function of an intensity of received radiation, or of a plurality, or combination of intensities. These intensities may be combined by adding, subtracting, or dividing in any desired manner, or may be otherwise mathematically combined. The manner of combination is suitable to specifically indicate, or be especially sensitive to, the presence of a particular substance in the region adjacent the bore hole.

Although no power supply has been shown in connection with the surface apparatus, it is to be understood that it will be powered in a conventional manner such as was pointed out in connection with the subsurface apparatus.

As can be understood from previous parts of this application, it is an object of this invention to measure only certain parts of an otherwise less informative flux of scattered, diffused, or partially absorbed flux of neutrons, and to use data concerning the intensity of these dissected portions of the neutron flux as a means of obtaining more specific information regarding the nature of the substance by which the primary neutron flux is diffused, scattered or absorbed. Quite naturally, therefore, it may be seen that the measurement proposed herein is more difficult in certain particulars than those called for by the discoveries of the prior art. For example, the requirement that there be, within the interval of time in which a measurement is performed, a statistically sufficient number of processes to produce an accurate observation of the average rate of occurrence of such processes, will be less satisfactorily met. This conclusion is derived from the proposition that this discovery concerns itself in each instance with a measurement of only a part of the neutron radiation. Probable error in the measurement of any radiation is decreased when adequate intensity prevails, the percentage probable error in general being inversely proportional to the square root of the intensity. For illustration, therefore, if there are neutrons composing an energy spectrum uniformly distributed from zero to five million electron volts, and it is desired to observe that portion of the energy spectrum lying between three thousand four hundred electron kilovolts, and three thousand five hundred electron kilovolts, the percentage probable error of such a measurement will be approximately seven times worse than it would be if the measurement had used all the neutrons. It follows, therefore, that strong fluxes of neutrons are needed to practice this well logging method. It likewise follows that, if the neutrons are to be undirected, there is need that they be generated in some isotropic nuclear process.

The strength of neutron source required will be related to the economic requirement of logging speed, and the error which is considered tolerable in a given case, by the formula $$\rho = 1.5 \times 10^{-6} \frac{S}{\delta}$$

where

S is logging speed in feet per hour $\delta$ is the fraction of the total flux of fast neutrons incident on the detector from all directions $\rho$ is the intensity of primary neutrons, in units of $10^7$ per second at 3 million electron volts from the source.

Error of $\pm 5\%$ has been assumed (for spacings, source to detector in the range 10"–18").

If the undirected flux of neutrons is monoenergetic, the chosen isotropic nuclear process must of necessity be one in which a constant amount of energy is liberated into the propulsion of the neutron every time the said process occurs. It also follows that if the primary neutron flux is to be of a penetrating nature, the neutrons generated therein must be of relatively high energy. If helium is to be considered as a recoiling substance in a detector of neutron radiation, neutrons cannot be employed which have energies high enough to undergo an inelastic collision with helium. If high energy neutrons are employed, a more complex and ambiguous distribution of recoil energies will occur. To illustrate the ambiguity brought about in such a case, consider, for example, the problem of determining the presence of fast neutrons having a kinetic energy of one million electron volts. If the incident flux of fast neutrons which impinges upon helium contains also some neutrons having energy of 21 million electron volts, absorption of the resonance energy of 20 million electron volts will occur to these, sometimes generating 1 million electron volt neutrons, a fraction of which will be measured, and will be indicated in a manner indistinguishable from the effect caused by the neutrons which had one million electron volts in the first place. This result is altogether avoided if no neutrons having energies equal to, or greater than, 20 million electron volts are emitted from the source.

The requirement that very many neutrons be available is met only if there be sufficient energy dissipated per unit of time by whatever bombardment produces the neutrons. There are two ways of producing an adequate flux of neutrons within the space available for a well logging radiation source. One of these ways is to provide a mixture of beryllium with an alpha-ray emitter of a sufficient degree of activity per unit volume. This achievement is favored if such an alpha-ray emitter—

(a) Has a short half life. This increases the rate of energy liberation per unit weight and per unit volume, other things being equal.

(b) Is a parent of a series which gets into equilibrium sufficiently quickly, and which comprises sufficiently numerous alpha-emitting daughter products in the series.

(c) Has large energy per alpha particle.

(d) Has a low atomic weight.

Of the above 4 conditions, only the first 3 are at all possible since there are fundamentally serious theoretical difficulties which appear to absolutely prohibit the fulfillment of any expectations of consequence with respect to item (d). It may be said further that, with only one exception, which is not of any importance to the uses of this invention, the expectation of the present theory is fully confirmed with respect to the above stated conclusion pertaining to item (d). Of the thousand or so isotopes that are now known, only one having atomic number less than 81, or an atomic weight less than 208, samarium, is found to emit alpha particles. Furthermore, this one exception emits alpha particles of such a low energy, and emits so few of them per unit weight of material per unit time, that it would be utterly useless to consider it as a practical source of bombardment to generate neutrons from beryllium. It is, therefore, perfectly clear that the considerations of the first three items are those which prevail in attempting to arrange a bountiful source of neutrons made of a mixture of beryllium with alpha-ray emitting substance. The particular merits of an arrangement containing an adequate quantity of actinium, or actinium salt, mixed with beryllium have been taken note of in United States Patent No. 2,515,502 and will not be reviewed extensively here, except to note the fact that one can, with actinium, crowd 200 times as much neutron-emitting power into a given space as can be done with radium-beryllium mixtures. Polonium would be a suitable substance for a concentrated source of neutrons. Thorium X would be suitable, and would enable the design of very powerful neutron sources with limited available space. Numerous other effective choices of powerful neutron sources are possible, and will be apparent to those familiar with the art, upon consideration of the previously outlined conditions for the design of such powerful neutron-emitting sources.

Returning to the general question of powerful and intense sources of neutrons in a broader sense, it is apparent that in the limited space within a well one is at liberty to consider electrically or electro-magnetically accelerated ion beams impinging upon suitable target material provided they do not require particle energy in the beam that is too high to be conveniently producible (considering insulation problems, etc.) within the limited space available. It is clear therefore, that reactions between ionic beam materials and suitable target substances are a matter of consequence to the practice of this invention with increasing emphasis in the case of those target reactions having a low threshold of energy per bombarding ionic particle for their onset.

As is well known in the art of designing R. F. power supplies such as those used for television sets, it is feasible to produce electrical potential differences of the order of 20 thousand volts within a limited space, and insulated by very reasonable thicknesses of rubber or other high voltage insulation.

There are available for consideration two nuclear reactions which can be excited by ionic beams propelled by no greater electrical potential difference than 20 thousand volts. These reactions are:

(a) The bombardment of deuterium atoms by deuterium ions, or if preferred, bombardment of substances rich in deuterium atoms with moving deuterium ions.

(b) Bombardment of tritium atoms or molecules rich in tritium atoms with deuterium ions, or conversely, the equivalent process, bombardment of deuterium atoms, or substances rich in deuterium atoms by moving tritium ions.

This latter reaction is one especially favored for the practice of this invention, because of its large efficiency, and because of the extremely favorable way in which the efficiency of this reaction improves with electrical potential applied at very low electrical potential differences. The second of these reactions is also particularly favored because of the large self-energy, that is, conversion of mass into kinetic energy, by which it is characterized, amounting to approximately 17 million electron volts, of which approximately 14 million are delivered to the neutron which is produced. Owing to the very large self-energy to which reference has been made above, neutrons derived from this preferred target reaction at very low bombarding energies nevertheless have very great energy, and are substantially monoenergetic. The same things can be said, but to a lesser degree, in respect to the first named of the two described bombardments. In it, the self-energy is less, delivering only 2.5 million electron volts to the neutrons, and the efficiency of the reaction is much lower. Accordingly, smaller fluxes of neutrons would be available under like circumstances, and the neutrons would be less monoenergetic.

Figure 4:
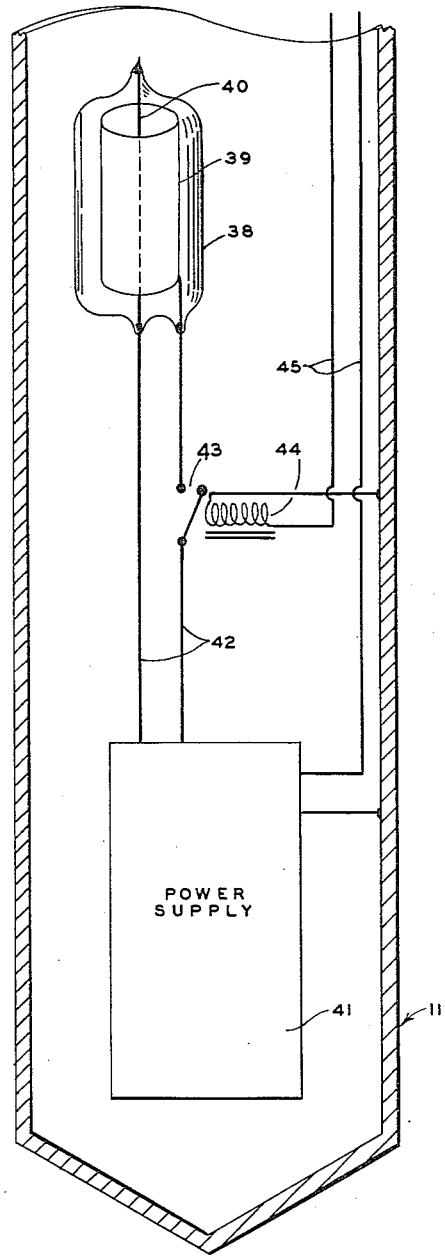
Figure 4 is a fragmentary sectional view of a subsurface instrument showing one of the novel neutron sources, contemplated by this invention, in operative position therein.

In Figure 4 of the drawings there is illustrated diagrammatically a neutron source of the type described above. This source can be used in the housing 11 to replace the source 24 shown in Figure 2.

A glass envelope 38 encloses electrodes 39 and 40. These electrodes may be formed of tantalum, uranium or zirconium. Electrode 40 may be a wire or a cylinder of suitable size. Electrode 39 is in the form of a concentric cylinder.

These electrodes are processed to introduce in them deuterium or tritium, or both. This is accomplished by supplying a suitable atmosphere of deuterium or tritium, or a mixture of these, under conditions which enable the electrodes to absorb these gases. Such conditions are produced by heating the electrodes or by conducting an electrical discharge between them as separate processes or both processes may be carried on concurrently. This conditioning of the electrodes is necessary in order that target atoms of deuterium or tritium may be situated in a suitable manner such that they will suffer collisions with bombarding ions. Tantalum, uranium and zirconium were selected as materials for the reason that they have the property of absorbing large quantities of deuterium and tritium.

Electrodes 39 and 40 are disposed in an atmosphere of deuterium gas, tritium gas, or a mixture of both at a pressure of from 1 to 100 microns of mercury.

If it is desired to operate this neutron source as a deuterium-deuterium reactor, the electrodes will be conditioned with deuterium and the final filling atmosphere will be deuterium.

If it is desired to operate this source as a deuterium-tritium reactor, conditioning with deuterium may be followed by filling with tritium, or conversely conditioning with tritium and filling with deuterium may be used.

In both the above arrangements for producing the deuterium-tritium reaction, the substance in the electrodes will exchange with the filling atmosphere, causing the efficiency of the reaction to vary slowly during operation.

Stability of operation, with somewhat lower initial efficiency is secured by conditioning the electrodes with a half and half mixture of deuterium and tritium and filling with the same mixture. Collisions in the target, in this case, are 1. D on Zr _____ No radiation.
2. T on Zr _____ No radiation.
3. D on T _____ 14.2 m. e. v. neutrons
4. T on D _____ 14.2 m. e. v. neutrons
5. D on D _____ 2.5 m. e. v. neutrons.
6. T on T _____ Inefficient.

If the half and half mixture is used the sum of reactions 3 and 4 would predominate about 50 to 1 over the process of item 5 in number of neutrons emitted from these causes. Reaction 6 is inefficient at low bombarding voltages.

Voltage is supplied to the electrodes 39 and 40 from the power supply 41 by means of conductors 42. A switch 43 is provided in one of the conductors 42. Switch 43 may be operated by the solenoid 44 which is energized through the conductor 45 that extends through the housing 11 to the surface of the earth.

The intensity of emission of neutrons will be augmented in increasing proportion as the electrical power delivered to the discharge is increased. The range of energies which will result will depend upon how the energy of the incident ion is divided between the neutron and the recoiling nucleus; this depends upon the direction of the neutron relative to the incident ion. Of the order of $10^9$ neutrons per second can be secured from a discharge dissipating 500 watts of electrical energy, in the D-T reactor.

Where an extremely large flux of neutrons is desired it is expedient to raise the bombardment energy of the D-T reaction to a higher value. This is particularly good because the efficiency of the D-T reaction rises rapidly as bombardment energies of the order of 100 kilovolts are attained. With the space available in a well logging instrument and with the new insulating materials, it is entirely feasible to build electronic voltage generators with output of the order of 100 kilovolts. An example of such a generator would be a high frequency Cockroft-Walton type of apparatus. Particular stress is laid on the high frequency feature in order that the condensers in the circuit would fit in the well logging instrument.

Figure 5:
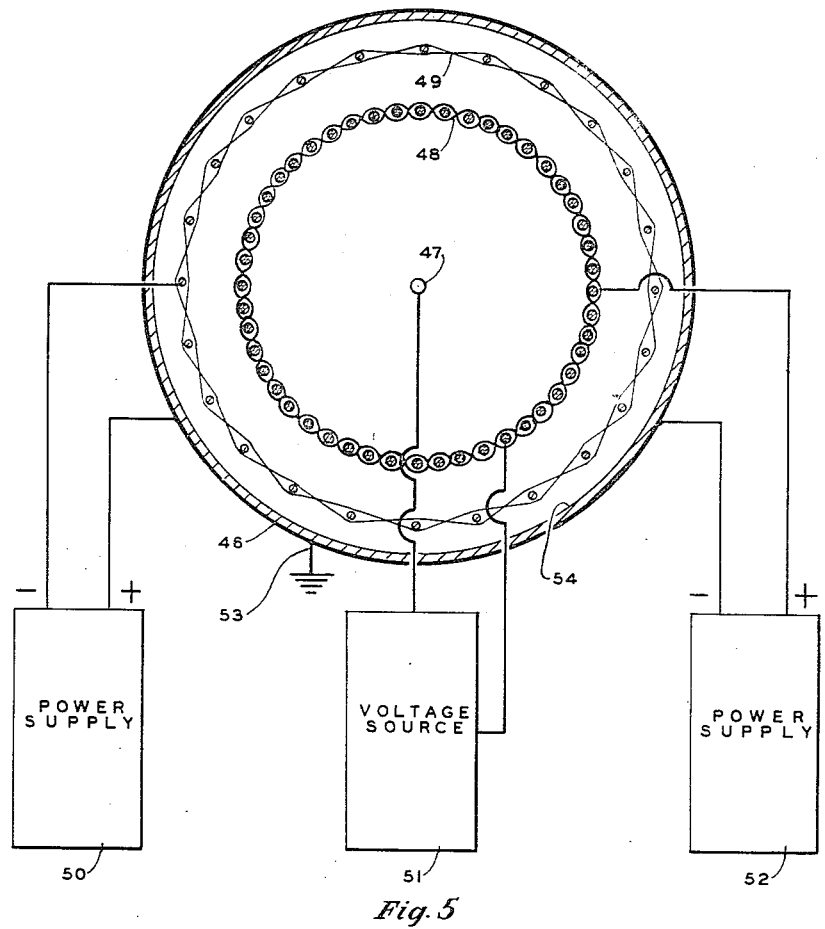
Figure 5 illustrates diagrammatically a modified form of neutron source.

Still another type of neutron source is illustrated diagrammatically in Figure 5. This source produces by the D-D reaction neutrons having energies of approximately 2.5 million electron volts as described in connection with the source illustrated in Figure 4. By employing the D-T reaction, neutrons having energies of approximately 14.2 million electron volts can be produced. This apparatus is also adapted to produce 17 million electron volt gamma rays by the lithium-proton reaction.

Referring to Figure 5 a substantially cylindrical housing 46 encloses a central electrode 47, a first screen 48, and a second screen 49. These elements are disposed in an atmosphere which consists of an isotope of hydrogen or a mixture of such isotopes. Potentials are placed across the elements by the voltage sources 50, 51, and 52. The housing is grounded as shown at 53. The voltage source 50 impresses a potential between the second screen 49 and the housing 46. The screen 49 is made sufficiently negative that the electric field perpendicular to the inside surface of the housing 46 is nowhere positive. The voltage source 51 impresses a potential between the central electrode 47 and the first screen 48. This voltage source serves to strike a low pressure arc to produce and make available positive ions. The voltage source 52 impresses a potential between the screen 48 and the housing 46. This potential produces an accelerating electric field which acts upon positive ions which escape through the screen 48 and causes them to impinge upon a thin layer of target substance 54 which is uniformly deposited on the inner surface of the housing 46. The target material is formed of a diatomic compound of lithium and a suitable isotope of hydrogen.

The electrodes shown in Figure 5 are spaced from one another in a manner which is correlated with the pressure of the filling gas. The radial distance between elements 46 and 48 is made short compared to the mean free path of an electron in the filling gas at the prevailing pressure. The radial distance between elements 47 and 48, on the other hand, is chosen to exceed several times the electron mean free path in the chosen atmosphere. The purpose of these choices is to permit a self-sustaining low pressure arc in the circuit of power source 51 and to forbid it in the circuit of power source 52 as a result of the short space between the electrodes 46 and 48. Any discharge between electrodes 46 and 48 will, therefore, be continuously dependent on replenishment of ions from the space inside of screen 48. Because the electric field between 46 and 48 can accept only positive ions from inside 48, electrons being repelled, the parasitic discharge in the space between electrodes 46 and 48 will be a positive ion affair, continuously replenishing its supply of ions by leakage through the holes in the screen 48. The positive ions leaking through the holes will impinge, in part, on outer screen wires of screen 49, which functions much as does a suppressor grid in a pentode vacuum tube. This outer screen serves to suppress the emergence into the electric field between elements 46 and 48 of electrons emitted by the target material 54. Were the suppressor screen not present, the bombardment of the target with positive ions, and with light and ultraviolet radiation, would cause a copious emission of electrons, which, falling through the electric field between electrodes 46 and 48, would waste the electrical energy of power source 52, which was intended to do work exclusively on the positive ions.

The voltage supplied by source 52 controls the bombarding energy of the ions incident upon the target 54. The choice of this voltage must be varied to suit the requirements of the problem. For example, the D-D reaction has a zero threshold, but a more copious flow of neutrons will occur as the voltage rises. The supply of neutrons from the D-D reaction is observable, and would have some uses at ten thousand volts, but would be very much better at 20,000 volts or more. However, as has been stated earlier, the neutrons will not be as strictly monoenergetic, that is, the energy range will be broader as the bombarding energy rises.

The D-T reaction also has a zero voltage threshold, but becomes importantly efficient at very low voltages. The efficiency of both the D-D reaction and the D-T reaction is satisfactory below fifty thousand volts for well logging purposes. Higher voltages will, however, produce a more copious flow of neutrons, especially in the case of the D-D reaction.

The lithium-proton reaction has a resonance in the neighborhood of 450,000 volts for the production of the 17 million electron volt gamma rays, but like the other reactions, D-D, and D-T, commences at very low voltages.

For the D-D reaction, lithium deuteride would be the target, and the filling would be deuterium. For the D-T reaction the target could be lithium tritide and the filling deuterium, or the target could be lithium deuteride and the filling composed of tritium. These two cases would have an instability due to exchange between the atmosphere and the target, exactly analogous to the instability caused by the same consideration in the case of the tantalum or zirconium source. The instability referred to above may be corrected by using a target composed equally of LiD and LiT molecules, and a gas composed equally of deuterium and tritium. For the production of the lithium-proton reaction, a target of lithium hydride will be used, and a filling of ordinary hydrogen. Voltages and spacings will have to be adjusted for these various fillings, and the pressures will have to be adjusted because the mean free path of electrons is not exactly the same in the three isotopes of hydrogen at the same pressures.

Figure 6:
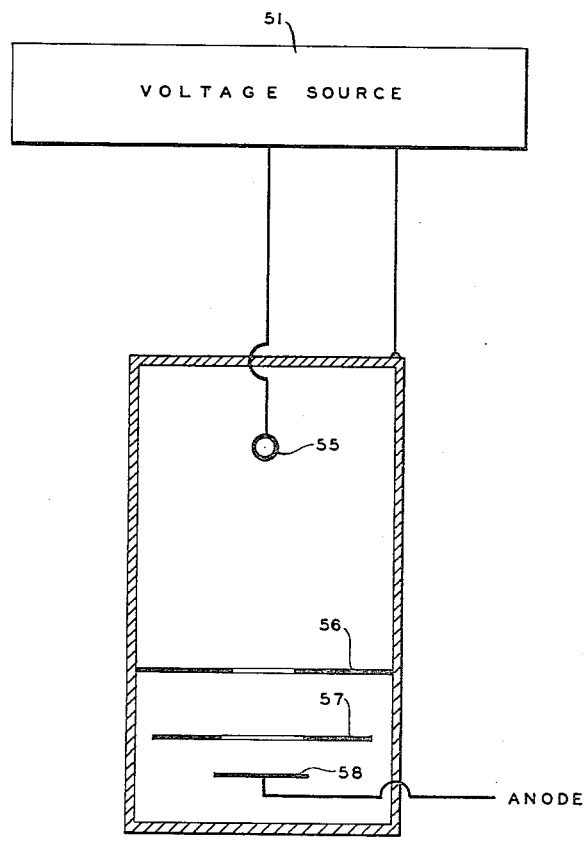
Figure 6 illustrates diagrammatically still another modified neutron source.

In Figure 6 there is illustrated a modified form of the neutron source shown in Figure 5. Its principle of operation is the same. Element 55 corresponds to element 47 in Figure 5. The housing 56 corresponds to element 48 and space charge electrode 57 corresponds with the outer screen 49. The anode 58 corresponds with the housing 46. Similarly a large space exists between elements 55 and 56 and a small space exists between elements 56 and 58. Similarly the large space exceeds by several times the mean free path of the electrons in the filling gas at the prevailing pressure, whereas the short space is chosen less than the mean free path of the electrons.

Besides sources of neutrons, which may or may not be at the same time sources of gamma rays, this well logging arrangement comprises shields adapted to be placed around the source of radiation or around the detector of radiation.

Examples of such shields are shown in Figure 7 in operative position on a subsurface instrument. The shields 59 and retainers 60 are shown in vertical or axial section. The retainer rings 60 may be held in position by suitable set screws 61. Shields 59 may be formed of different kinds of material selected for the particular problem to be explained in detail as the description proceeds.

The space between the source and detector of radiation has often been specified in previously issued patents, Nos. 2,308,361 and 2,349,712, as being filled with material of a nature substantially opaque to the radiations emitted from the source. Though under certain circumstances such an arrangement can be achieved, and although it is at times desirable to attempt to insert between the source and the detector of radiation a substance which is capable of eliminating direct travel of radiation between the source and the detector, it has been discovered that quite often the arrangement of a suitable obstacle will not be practically possible. For example, if 14 million electron volt neutrons are used, and a distance of 4 inches between the source of radiation and the detector is used, there is not in existence any substance or combination of substances which would be capable of substantially preventing neutrons from travelling directly from the source to the detector of radiation. For higher energies of neutrons originating from the primary source, a larger number of distance units can be stated, and a similar degree of impossibility of prevention of direct travel can be alleged. Now it happens that, in order to make deep and representative investigation of the strata, it is necessary to use neutrons of high energies, since these are the ones which are susceptible of deep and representative penetration. Therefore, means have been discovered for eliminating the necessity of the insertion of an obstacle. However, certain preferred choices of penetrable material are contemplated in lieu of an obstacle, as will appear. An obstacle may be used if convenient, and its use, together with the other elements of the present apparatus, comes within the scope of this invention. Herewith are provided means of eliminating from consideration the neutrons which penetrate any intervening mass of penetrable material that may be employed in lieu of an obstacle. For this purpose it is provided that, when an obstacle is used, it be composed of substance containing atomic nuclei having properties which differ largely from the nuclear properties pertaining to material composing the rock adjacent to the bore hole. For example, since many heavy nuclei possess relatively many and very widely distributed quantized energy levels, such a substance as mercury, thallium, or bismuth, intervening in the space between the source and detector would not selectively remove quantities of energy from neutrons passing through by steps of one million electron volts. On the other hand, nuclei of atoms of which the rock consists do cause removal of kinetic energy by steps of approximately one million electron volts order of magnitude. Since it has been determined, for example, that oxygen absorbs energy in steps of a particular size, one may bombard the formations with monoenergetic neutrons, making observations of the neutrons which are scattered from the rock with the specific loss of energy characteristic of oxygen. Having measured the flux of neutrons which have suffered such a loss of energy, one can compare the flux of partly de-energized neutrons which are found to be scattered from the formations or transferred through the obstacle, and the flux of neutrons which have energies lying closely adjacent to the energy of those which have been slowed down by colliding with oxygen. The next step is subtraction of the intensity of the specific energy group corresponding with oxygen. This subtraction adapts the method to take account of energy losses by such a prevalent non-specific phenomenon as conservative ballistic nuclear scattering, and gives a correct measurement of the energy group which suffered loss by specific reaction with oxygen. The corrected data provides specific information regarding the frequency of occurrence of the processes caused by oxygen. Since the obstacle does not cause any such processes, whatever effects may occur that are due to it will be cancelled out in the above correction, and it will be as though there were no obstacle. The correction which has been outlined is analogous to the procedure of subtracting the base line of a spectral photometer trace in the neighborhood as a specific absorption line caused by a substance which it is desired to identify and measure, in a case in which such substance is found intermingled in a medium possessed of general or distributed absorption of radiation.

In Figure 8 there is illustrated schematically a system for effecting the above subtraction. In this figure there are shown two channels which originate in a system for detecting neutrons which represents in each channel pulses caused by specific energies of neutrons. Channel 1 from this detecting system is adjusted to deliver pulses which correspond with the arrival in the detector of neutrons having energy approximately equal to E, where E is the energy of a neutron derived from the monoenergetic source, after it has lost the specific amount of energy characteristic of oxygen. Channel 2 from the detector is adjusted to deliver pulses which correspond with the arrival in the detector of neutrons having energy approximately equal to $E_2$ differing slightly from $E_1$, but in the vicinity of $E_1$.

Pulse rate conversion circuit 62, which receives the signal of channel 1, produces therefrom an E. M. F. proportional to the time-rate of arrival of pulses in channel 1.

Figure 8A:
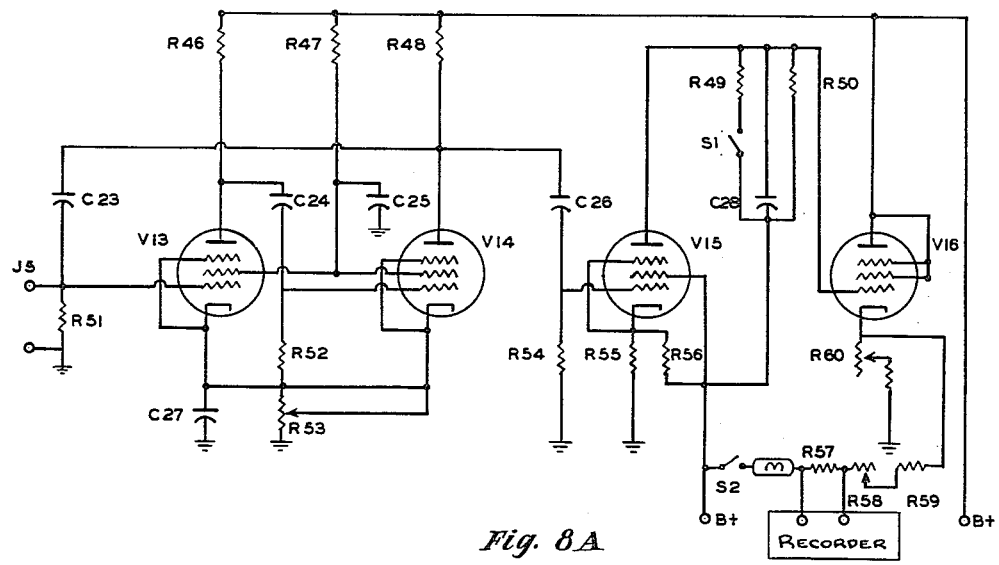
Figure 8A is a detailed wiring diagram of a pulse rate conversion circuit.

Pulse rate conversion circuit 62 is shown in detail in Figure 8A. The operation of this circuit is as follows: a positive pulse is impressed upon the control grid of tube V-13 which is normally non-conducting. This pulse is amplified and appears at the plate of tube V-13 as an amplified negative pulse. This amplified pulse is then transmitted to the control grid of tube V-14 which is normally conducting. Tube V-14 may be a 6SJ7. The negative pulse cuts off the current in tube V-14 thus lowering the bias potential across cathode resistor R-53. This causes the current to rise in tube V-13. The circuit remains in this condition with tube V-13 conducting and tube V-14 non-conducting for a period of time the length of which is dependent upon the values of the following circuit elements: resistances R-46, R-52, and R-53, plus condenser C-24. When the condenser C-24 is sufficiently discharged to allow tube V-14 to again become conducting there is feedback of a negative pulse through condenser C-23 to the control grid of tube V-13. This reduces the current in tube V-13 which causes a positive pulse to be impressed upon tube V-14. Thus the positive feedback of this circuit rapidly drives tube V-13 again to cutoff and tube V-14 to a saturated conducting condition. The circuit remains in this condition until the next pulse is received from the detecting system. The positive feedback of the system and the high gain tubes used result in well-shaped pulses. The output of this circuit appears on the plate of tube V-14. This is transmitted through condenser C-26 to the grid of tube V-15. The circuit used with tube V-15 is a long time-constant circuit with fixed bias on the cathode. The long time-constant plate circuit is direct coupled to the control grid of tube V-16. The positive pulses appearing on control grid of tube V-15 are appreciated as longer negative pulses in the long time-constant plate circuit. The effect is to integrate pulses over a short period of time. Thus the potential at the control grid of tube V-16 is a slowly varying positive, direct current potential depending for varaition on the time-rate of occurrence of the pulses. The less positive the voltage at this point, the greater are the number of pulses being received. Tube V-16 may be a triode-connected 6AC7. Any drop in the potential of the control grid of tube V-16 causes the current to fall in the tube. This, in turn, causes the potential of the cathode to fall, thus increasing the current flow in resistors R-57 and R-59. Hence, the IR drop in R-57 is increased, thus providing a higher input potential to the recorder.

The corresponding circuit of detector channel 2, which is identified as element 63 in Figure 8, likewise produces a D. C. signal in its output, which is subtracted from the output of element 62 by being connected electrically in series opposition to the output of the element 62. The difference signal is delivered to the cable 64 which connects the above recited subtraction apparatus to a suitable recorder 65 at the surface of the earth. The recorder is adapted to make a record of the difference versus depth, the depth axis being actuated by a measuring wheel, not shown, through a gear box 66.

In the above discussion oxygen has been named as an illustration of a substance to be detected. Such choice, however, is not to be taken in any sense as a limitation. This discovery applies equally well to the delineation of silicon, aluminum, chlorine, carbon, magnesium, nitrogen, or any other elements which it is or may be desired to identify, adjacent to a bore hole. Because it may be considered that specific information regarding the absorption properties of some of these elements is not definitely known for neutrons, there is provided in this method a procedure for determining the requisite properties, in order that use may be made of this information in adjusting well logging apparatus for conditions of optimum performance.

Figure 9:
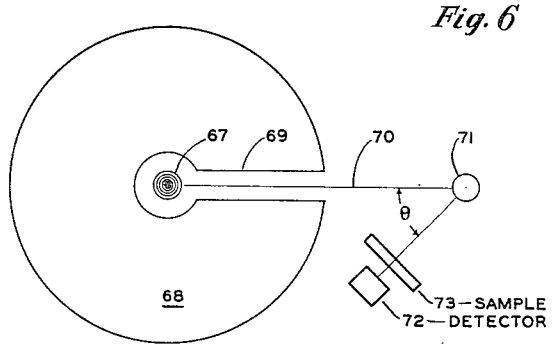
Figure 9 illustrates diagrammatically means for obtaining information about the absorption in a sample of neutrons having a particular energy.

In Figure 9 a system is illustrated for determining the existence and location of nuclear resonances for interaction between nuclei contained in a sample and a stream of bombarding fast neutrons. These nuclear resonances will correspond with specific energy losses which can be used in considering the adjustment of a detector of fast neutron radiation such as was set forth in connection with Figure 8. In this figure there is shown a source of monoenergetic fast neutrons 67 almost surrounded by a mass of paraffin 68. Through this mass of paraffin there is provided a narrow opening 69 from which emerges a narrow beam of neutrons 70 which impinges upon a mass of hydrogenous material 71. Material 71 serves to scatter neutrons derived from the beam 70. The diameter of the hydrogenous mass 71, which may be spherical in shape, is sufficiently small that neutrons of the beam 70 will generally be scattered by having only one collision with a hydrogen nucleus in the mass 71 rather than a plurality of collisions which would occur if the diameter of mass 71 is excessive. A detector 72 is located for and adapted to rotation about mass 71 as a center. A sample 73 is situated at a constant distance from the detector 72 and maintained always on a direct line joining the center of the detector and the center of the scattering mass 71. The angle of rotation determines exactly the loss of energy which a neutron from the beam 70 will suffer in being deflected by the object 71 in the direction of the detector 72. Since all the neutrons of the beam 70 have equal energies the neutrons passing through the sample and in through the detector will also have, at their incidence upon the sample, equal but smaller energies, smaller than the energies of the neutrons in the beam 70. The energies of the neutrons incident upon the sample will, accordingly, vary from the energy of the source for $\theta=180°$ to practically nothing for $\theta=0$, and there will be for each value of $\theta$ a corresponding value of the energy within the above range. One may accordingly restate $\theta$ as a scale of energy and plot the transmission of neutrons through the sample as a function of energy by varying $\theta$. Minima in the said function of energy will correspond with a specific reaction in the sample suffered by the neutrons at that energy.

Conditions of optimum performance may also be chosen by purely empirical experiments, in which operating conditions are chosen arbitrarily, in wells logged in which the occurrence of the various elements penetrated by these wells has been ascertained independently through chemical analysis of cores. Nevertheless, there has been provided, in addition to other methods of selectively studying neutron radiation as influenced by a particular element, a means of making such selective study altogether without any knowledge of the nuclear properties of the element. This procedure consists in a combination of method and apparatus relying upon a general discovery regarding absorption of radiation which has been made. This general discovery is that: for successive absorption of any kind of radiation by a selective absorber, a smaller proportional influence upon the flux of radiation is produced, in the case where the radiation has already been shielded by a similar selective absorber. Now if it is agreed, for example, that chlorine is a selective absorber of neutrons, then it is self-evident that the influence of a chlorine filter will be smaller in the presence of neutron radiation already filtered by matter containing chlorine, than it would be for radiation similarly derived and similarly filtered in other respects, and through a medium otherwise the same in which the chlorine is absent. Therefore, in order to observe the presence of a particular element in the strata adjacent to a bore hole, a measurement of fast neutrons should be made by means of a fast neutron detector which has no shield around it, or at most a layer of material not containing the particular element which it is desired to identify. Further, a second measurement will be made in which the detector of neutrons, otherwise similar, will be surrounded by a layer of shielding material composed of a substance rich in the element which it is desired to detect or, if possible, wholly composed of such element.

It is preferable in practicing this discovery to maintain the distance between the neutron source and the detector of neutrons, which is alternately shielded and unshielded, at a small enough distance from the source such that there will be a considerable proportion of primary fast neutrons traversing the matter in the vicinity of the detector of neutrons.

In addition to providing for a relatively different way of specifying the radiation source, a different specification of, or omission of, the obstacle of the prior art, and a different way of choosing shields around the detector of radiation, this discovery comprises also a particular type of radiation detector which has been invented and heretofore constructed and tested, together with certain improvements which have also been discovered. This improved radiation detector consists of an ionization chamber containing a gas of very low molecular weight, sufficiently low that, when a molecule or atom thereof is struck by a neutron, considerable of the kinetic energy of the neutron is likely to be transferred to the molecule or atom. Adequate pressure must be maintained in this detector, so that the number of atoms of the target substance contained in it will be sufficient per unit of volume for a small detector adapted for well logging (of the order of 3⅝″ outside diameter) to have a usable efficiency. It is contemplated in this respect that pressures will be employed which will lie in the range of from one to several atmospheres, extending upward to the vicinity of 300 atmospheres. It has been found that, for the observation of electrical impulses which will be caused when the atoms of this contained gas are struck by neutrons and proceed to liberate their energy by moving through the remaining portion of the gas it is necessary to choose a gas which does not, under the conditions of the use of the detector, permit the formation of negative ions of molecular size from the electrons which are freed by the passage of the recoiling atom. The electrons are thus permitted to remain free, and may be very quickly collected, distinguishably from the heavy ions of positive charge which remain, and which are set in motion very much more slowly, and are relatively unobserved. Such a detector is illustrated generally in Figure 2 and more specifically in Figure 10.

As shown in both figures a housing 74 encloses a system of electrodes disposed in an atmosphere of compressed helium. Electrode 75 in the form of a cylindrical plate is disposed in the bottom of, but insulated from, the housing 74. Ring-shaped electrodes 76 are arranged in spaced relationship, one above another, and insulated from each other and from the housing. The axes of all these rings are coincident and coincide with the axis of the housing. Each ring by itself may be said to lie generally in a plane perpendicular to the axis of the housing 74. The vertical distances between the successive planes passing through the centers of successive rings, are equal. A screen 77 is situated at the top of the system of rings and also lies in a plane perpendicular to the axis of the detector. Screen 77 is electrically connected to and supported by the inner surface of the housing 74 and divides the space within the housing into two parts. The lower portion contains the greater part of the internal volume. The portion of space above the screen 77 contains an electrode 27 which is maintained at a strong positive potential with respect to the housing 74 by means of the battery 29 which is connected to the resistance 28. The circuit is completed to the case by virtue of the connection of the cathode of battery 29 to ground through the conductor 30. The electrode 75 and rings 76 are electrically connected to a battery 78, and coupled by equal resistors 79 in such a manner that the numerical value of the negative potential from the first of these electrode elements 75 and 76, steadily and evenly decreases toward ground potential referenced from the bottom electrode to the top electrode inside the housing 74. The effect of these electrodes 75 and 76, and of screen 77, is to produce a uniform straight electric field, directed downward along the axis in the greater part of the interior of the chamber, everywhere except in the close vicinity of the rings 76. If an ionizing path occurs in the helium below the screen in the region of electrode elements 75 and 76, the electrons thus released are immediately translated upward toward the screen 77. Some are absorbed by the screen and are lost, but a larger number, and a relatively large and constant fraction of the total number pass through, and are attracted toward the collector electrode 27, where they are collected, causing an electrical impulse to occur in the external circuit, coupled through condenser 31. The pressure of the helium is chosen with respect to the use which it is desired to make of the detector. The specific choice of pressure in a given case will correspond with a value for which the range of the most energetic recoiling helium atoms will be appreciably less than the diameter of the rings 76, but the range of electrons of like energy will be much more than the diameter of these rings. The neutron detector of Figures 2 and 10 may be employed for the detection of fast neutrons, since slow, or thermal ones do not produce observable recoil processes. As such, it is a detector which observes fast neutrons, and can be used to observe them in the presence of slow ones without being influenced by the slow ones. Also it is able to ignore gamma rays by the choice of pressure which renders inefficient the ionization of its atmosphere by gamma rays. Thus, while gamma rays will cause pulses to be generated in this detector they will be of lesser energy per pulse, and may, therefore, be eliminated.

The detector of Figures 2 and 10 may also be used to detect slow neutrons, or to observe n-p reactions on substances which may be mixed with the helium. All these uses of the detector of Figures 2 and 10 enable determination to be made of the energies of the fast neutrons impinging on the detector, as will be fully shown further on as the description progresses.

It has been found that the gases of chemical group zero do not form negative ions when approached by electrons. Use has been made of this fact in certain counters arranged for the measuring of alpha particles. Such counters have been constructed which use noble gases at atmospheric pressures or lower pressures. There is, contrary to previous theoretical considerations, an appreciable rate of recombination in the noble gases for ions produced therein. It has been satisfactorily demonstrated that such recombinations are not caused by third body processes or by wall effects, but are specific and inherent physical characteristics of the noble gases themselves. These findings regarding the rate of recombination do not, nevertheless, exclude the use of these gases, at elevated pressures. On the other hand, Biondi has recently found that a much higher rate of recombination prevails for hydrogen. The pressure limitation for the production of electron-caused quick pulses from hydrogen will therefore be much lower than the corresponding limitation for helium. Helium is preferred over hydrogen for use in this radiation detector at elevated pressures. The recoil of helium from a neutron derives from a square hit roughly ⅗ of the kinetic energy of the neutron. In the case of a 10 million electron volt neutron, the recoil could have nearly 6 million electron volts energy, and would correspond with an alpha particle having a range approximately 6 centimeters in standard air. The liberation of energy by such an alpha particle in standard air would be about the same as it would be in helium at seven atmospheres. The dimensions of a chamber in which such a recoil could efficiently liberate its energy are therefore not excessive for any pressures above fourteen atmospheres of helium.

It is necessary to produce a pulse having a size which corresponds with the number of electrons liberated by the recoil, and which always has the same size for alpha ray paths liberating the same number of electrons, but liberating them in different parts of the ionization chamber. This result may be accomplished by an arrangement like that described in U. S. Patent No. 2,469,460. Pulses proportional to the number of electrons initially released may also be produced by the use of a relatively fine wire for the center electrode and a sufficiently strong electric field in the vicinity of the center electrode to bring about gas amplification, that is, an incipient avalanche, in the close vicinity of the fine wire. Also the neutron detector, as shown in Figures 2 and 10, accomplishes this purpose and it may be used as a point proportional counter by connecting a suitably high voltage battery at 29. Any of these methods will result in pulses which are proportional to the number of electrons initially liberated and substantially independent of the potential difference through which the electrons initially liberated have fallen. If these precautions are not taken, pulses will occur in which the influence of each primary electron is multiplied by a weighting factor which is the potential difference through which it falls in arriving at the collector electrode from the point at which it originated. Since the weighting factors which have been mentioned are not dependent upon the characteristics of the electric field in the measuring apparatus, and since the use of these weighting factors cause pulses absorbing the same amount of radiant energy in the chamber to bring about the transfer of different amounts of energy into the electrical output, and since they also cause pulses for which different amounts of radiant energy were liberated in the chamber to effect transfer of equal amounts of electrical energy into the output, on a chance basis; the use of an ordinary ionization chamber will result in great confusion, and will prevent, or tend to prevent, the clear recognition and classification of nuclear phenomena as they occur in the ionization chamber. It is understood that in pursuing this method, it is intended to make use of such special detecting methods as are described herein. There are certain ways of practicing this invention which do not require the use of a special detector. Note shall be taken of these exceptions, and it will be pointed out that the detector may be more freely designed in such cases.

A quicker collection of electron charge is achieved in ionization chambers which contain at least sufficient diatomic or polyatomic molecular gases to furnish means of dissipating the energy of electrons wherever their energy becomes appreciably higher than the value that would correspond with equipartition of energy, under Maxwellian statistics of the gas. Where such polyatomic molecules or other dissipants of energy are not present, as for example, in an ionization chamber filled exclusively with very pure helium, there is no mechanism which enables an electron to lose its energy at all efficiently unless it has acquired energy more than that which corresponds with the first quantized state above ground level for the extranuclear electron shells of the helium atom. Since this first transition corresponds with a few volts, the electron gets out of true equilibrium with its environment, wherever it is able to derive kinetic energy from an electric field, and while its motion remains random in direction except for drift with the field, the average energy nevertheless will correspond with a tremendously high temperature of the order of tens of thousands of degrees centigrade. It will shortly be seen how this very high electron temperature interferes with efficient and desirable registration of the pulses.

A mixture of electrons and gas atoms bears a resemblance to a mixture of two kinds of gas. So long as the electrons remain, they will diffuse about randomly in the gas, tending to fill up, and uniformly so on the average, all places where electrons are present to a less extent than the average amount in the mass of gas considered. On the other hand, those places which at the beginning of a diffusion process contain more than their share of electrons will have their concentration reduced in the direction of the average value by diffusion. Electrons diffuse very rapidly. An electron having an energy corresponding with room temperature (about .04 electron volt) diffuses about one hundred times as fast as helium. Also, the rate of diffusion of electrons rises as the square root of the temperature corresponding with the average kinetic energy per electron. At 30 thousand degrees, a temperature which might be attained by electrons in drifting with an electric field in pure helium, the rate of diffusion would be approximately 17 thousand times the rate of diffusion of helium. Now it happens that electrons which cause pulses always originate in a non-uniform distribution within the gas where they are produced. A recoiling helium atom energized by a collision with a fast neutron will travel in helium and in an approximately straight path, in a typical case, and will, at fourteen atmospheres, liberate electrons at a rate of approximately $10^4$ per centimeter of travel, with an even more concentrated liberation per unit path near the end of the travel of the energized recoil atom. The electrons liberated along this path are suddenly set into motion by the electric field, if the path occurs in a mass of helium upon which an electric field is superimposed. These electrons, however, not only drift with the electric field, but also have random energies of motion like the other molecules or atoms in any gas not at absolute zero. Therefore, as the cluster of electrons initially liberated by the travel of the recoiling energized atom starts toward the collector electrode, the random motions are continuously superimposed upon the consistent drift toward the collector electrode. The random motions have the effect of causing some of the electrons to arrive early and some of them to straggle behind the main group which is drifting toward the collector electrode. The net result is that the corresponding electrical pulse is broadened with respect to time; that is, it is made to last longer than it would if there were no early arrivals and no stragglers. Now, the more intense the random motions, the greater will be the amount of spreading, and the more numerous and the more early will the early arrivals be the more numerous and more late will the late comers be. Therefore, if the electrons acquire greater energy of random motion than they should, the pulse of charge will not arrive in as clear cut and quick manner as would be desired. This defect will be observed particularly in the case where absolutely pure gas of group zero is employed in an ionization chamber or where a mixture of such gases is employed. For such gases, the electron drifting parallel to the direction of the field tends to impart its extra energy, resulting from its fall through a potential difference, to the atoms of the gas by colliding with them, and it makes one such attempt for every such collision. However, it is very nearly impossible for an electron to transfer energy to an atom in a ballistic encounter. This is because the lightest atoms that are known, for example, helium and hydrogen, are thousands of times more massive than an electron. An electron containing extra energy, and attempting to impart this energy ballistically to a helium atom will lose approximately one seven-thousandth of its energy per encounter. In an ionization chamber containing helium at atmospheric pressure, it is quite easily possible to collect an electron from the space of an inch or so thickness in a period of time so short that only a few thousand encounters will have occurred.

Quite obviously, then, the electron would not be promptly losing the energy that it gains from the electric field, at least not by ballistic encounters, but the energy would rise until it reached a level so high that more effective means of transferring its energy to helium atoms would come into play, that is, the transfer of energy will be effected through inelastic collisions resulting in the transferences of potential energy with the helium atom from the ground state to suitable quantized levels above the ground state. Since, in the case of helium, as has been pointed out before, this transition possibility only sets in at very elevated energy levels compared with the room-temperature kinetic energy of an electron in equilibrium. The electron gas in a typical ionization chamber will become very hot in the process of being collected by a sufficient electrical field, and will, therefore, manifest an exaggerated diffusion effect and time spreading of the pulse to an extreme degree. A molecule is no more able to absorb the energy of an electron ballistically than is an atom, but the molecule has a much larger group of closely spaced possibilities of inelastic collisions, which have their onset at very low bombardment energies for incident electrons, bombarding energies lying in the range of .04 electron volt, more or less, and closely spaced in the vicinity thereof. Therefore, a diatomic molecule, when present, will act as a means of absorbing the energy of "hot electrons" and dissipating this energy to the remaining portions of the gas. The diatomic and polyatomic molecules thus present may be required only in very small quantity, and are not altered or dissipated, but act in a capacity which we describe as catalytic, catalyzing, as it were, the effective transfer of energy back and forth between electrons and gas atoms or molecules, and promoting a prompt attainment of Maxwellian statistics, which are largely deviated from otherwise. The prompt attainment of Maxwellian statistics favors lower electron temperature, and accordingly, results in a minimizing of the undesirable random motions, and the production of quick pulses resulting from the collection of electron clusters caused by paths of recoiling atoms energized by neutrons. There is employed, in connection with the preferred method of well logging, and it is essential to some ways of practicing this discovery, a gaseous mixture containing, in addition to helium, an adequate trace of diatomic or polyatomic, but substantially nonelectron-capturing material, to bring about the above described energy transfer catalysis, and promote clean-cut quick registration of ionizing events occurring in the ionization chamber.

Although there is disclosed in Patents Nos. 2,469,460 and 2,351,028 the idea of absorbing all of the energy of an ionizing process in an ionization chamber, and although circumstances exist in which both these prior inventions may be practiced, it has been found that there arises in connection with the practice of this new discovery, considerable difficulty owing to the tendency of fast neutrons to interact with the medium in an ionization chamber in such a way that they liberate energy, not entirely, but only in part. The energy liberated is randomly determined, and is not necessarily the same each time a neutron of the same primary energy reacts. For example, only a negligibly small fraction of the recoiling helium atoms which are struck by neutrons will receive energy in the close neighborhood of the maximum amount transferred by a square hit. Much more frequently, considerably less energies will be imparted, and there will never be any way to know, from the energy of a particular recoil, what might have been the direction or energy of the neutron which struck the recoiling atom. There has been discovered a method whereby one can interpret information regarding recoils, in spite of this ambiguity, and determine from such information what were the exact energies or groups of energy, of incident neutrons which caused these recoils. This method relies upon the understanding which has been achieved regarding the statistical distribution of populations of recoils which arise from the neutrons. This invention teaches a way to take a statistical distribution of populations of recoils with respect to energy, and perform upon the said statistical distribution of populations of the recoils a mathematical operation which may be done by mechanical means and which produces, from the distribution of recoils with respect to energy, the distribution of the causative neutrons with respect to energy. A general property of ballistic reactions of particles which has been found to prevail is that the number of recoils per unit energy interval caused by specific energy (monoenergetic group of incident neutrons) falls abruptly to zero in the vicinity of the recoil energy corresponding with a square hit. The abrupt fall to zero is what mathematicians speak of as a "corner" and corresponds with an abrupt change in the slope of the population distribution function above defined.

Figure 11:
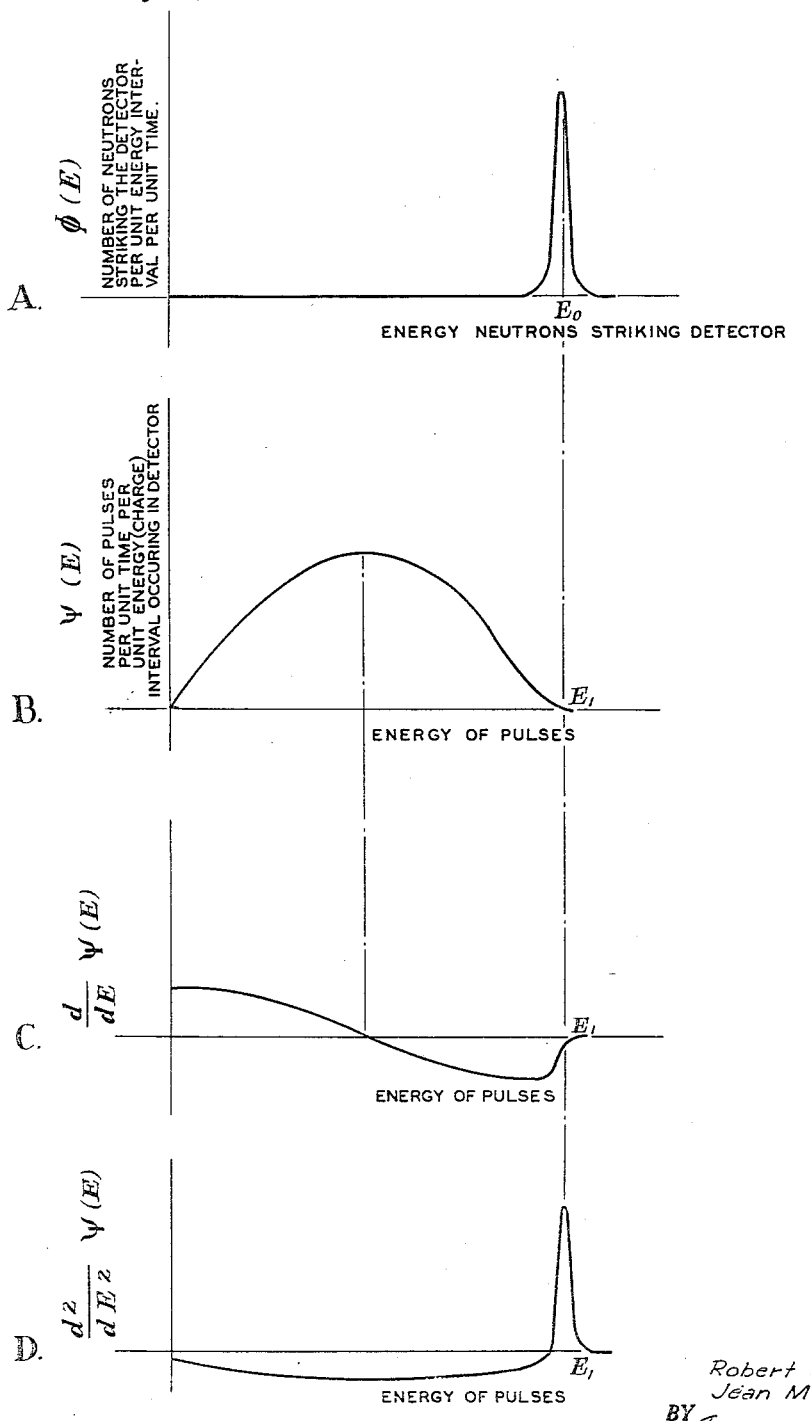

Referring to Figure 11 there is plotted in Graph A an approximate representation of a monoenergetic stream of neutrons incident upon a recoil type neutron detector. The graph shown can be only an approximate representation, since truly monoenergetic neutron fluxes could be represented only by a maximum in the neighborhood of $E_0$ which would be infinitely high. The approximation which has taken in deliberately drawn narrow, steep-sided, and quite high and will be employed in lieu of the exact representation which it is not possible to show. This approximation has many qualities of the exact representation and characteristics in common with such an exact representation, and the difference therefrom will be noted throughout this description. This discussion is, nevertheless, quite to the point insofar as practical work is concerned, since actual neutron emitters which are available will never be truly monoenergetic but will in general be susceptible of precise representation by a graph similar to Figure 11A.

Figure 11B shows the energy distribution of recoils observed in the neutron detector which will be caused by the approximately monoenergetic beam of incident neutrons illustrated in the graph of Figure 11A. A dotted line connects the value $E_0$ of Figure 11A with the value $E_1$ of Figure 11B in which the function $\psi(E)$ comes down more or less abruptly to zero. The quantity $E_0$ will be substantially equal to the quantity $E_1$ only for the case of a recoiling nucleus having almost exactly the same mass as a neutron. For this possibility, the only example is common hydrogen. For other nuclei, their mass will always be greater than the mass of the incident neutrons, and for such cases $E_1$ will always be less than $E_0$, but for any given nucleus it will be a constant fraction thereof. In Figure 11B reference is made to the coordinate $E_1$ at which the function $\psi(E)$ comes down more or less abruptly to zero. What characterizes the coordinate $E_1$ is that, in the vicinity of the coordinate, there is a more or less abrupt change in the slope or direction of the function $\psi(E)$. This more or less abrupt change of slope or direction would be wholly abrupt, and would correspond with a corner in the function $\psi(E)$ at the abscissa $E_1$ if the incident neutrons were monoenergetic. Figure 11C is drawn for the purpose of showing how the more or less abrupt change of direction or slope occurs in the function $\psi(E)$ which is illustrated in Figure 11B. The continuous dotted line relates the value $E_1$ of Graph B where there is a high curvature of $\psi(E)$, to a point of inflection in the derived curve at the corresponding abscissa. The point of inflection is, as can be understood, a coordinate at which the derived function $$\frac{d}{dE}\psi(E)$$

has maximum slope. To better illustrate this last statement there is presented Figure 11D, which represents, as a function of energy of pulse, the quantity $$\frac{d^2}{dE^2}\psi(E)$$

which may also be thought of as the derivative with respect to energy of the function illustrated in Figure 11C, and therefore, is a continuous representation of the slope of the function appearing in Figure 11C. The maximum slope corresponding with the point of inflection at abscissa $E_1$ in Figure 11C shows, quite naturally, as a steep-sided maximum in the graph of $$\frac{d^2}{dE^2}\psi(E)$$

which has been plotted in Figure 11D. It is desired to point out the close resemblance between Figure 11D and the true representation of the incident neutrons, which shows a maximum at the same or corresponding abscissa, a maximum correspondingly narrow and steep-sided. It may be shown that the height of the maximum produced in Figure 11A will be proportional to the height of the maximum of Figure 11D. Thus for a neutron flux consisting of only one energy of neutrons, there results the determination of the energy of the incident neutrons and, measure of their intensity, if one employs a recoil type pulse ionization chamber, and classifies the pulses according to energy groups, thus producing the function $\psi(E)$, and then generates therefrom the function $$\frac{d^2}{dE^2}\psi(E)$$

Figure 12:
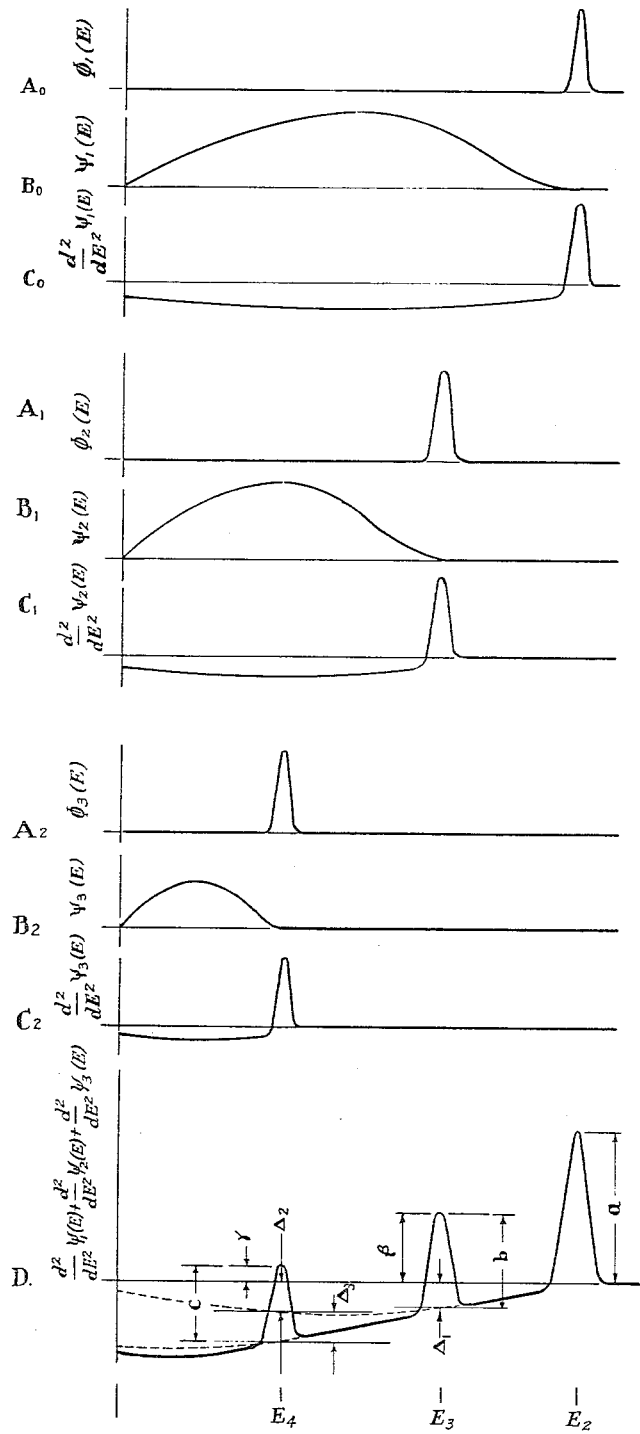

Reference is now made to Figure 12 in which there is illustrated the analysis of a more complicated case of neutron energy detection, and in which is shown how the problem of measurement of the intensity of a stream of neutrons of several energies can be accomplished concurrently. There is chosen, for example, a case in which there are three approximately monoenergetic fluxes of neutrons incident upon a recoil type neutron detector. The three energies which have been chosen to illustrate the incident neutron fluxes are $E_2$, the greatest energy, shown in Figures 12A$_0$, B$_0$, and C$_0$; $E_3$, the intermediate energy group shown in Figures 12A$_1$, B$_1$, and C$_1$; and $E_4$, the lowest energy group shown in Figures 12A$_2$, B$_2$, and C$_2$. The significance of the function notation which appears on these graphs and the definitions of the coordinates correspond exactly with the corresponding notation and definitions in Figure 11. Figure 12D shows an enlarged view of a composite function obtained by adding graphs of Figure 12C$_0$, Figure 12C$_1$, and Figure 12C$_2$. It will be seen that the composite representation of Figure 12D has maxima which correspond very closely in their abscissa with the energy values $E_2$, $E_3$, and $E_4$. Furthermore, the height of the maximum occurring at $E_2$ in the composite function is unaffected by the presence of the contributions from Figure 12C$_1$, and Figure 12C$_2$ because these functions are zero in the neighborhood of the maximum corresponding with $E_2$.

This argument leads to the general proposition that the highest energy group present in a composite spectrum of neutrons may always be satisfactorily measured by producing the function $$\frac{d^2}{dE^2}\psi(E)$$

Also the energy groups which are present in a mixture of neutron fluxes containing other energy groups which exceed the energy of the given group or groups, will be affected with error caused by the presence of the superior energy groups, if one attempts to describe the analysis of the intensity of these inferior energy groups by producing from the summation of $\psi(E)$ the summation of the second derivatives. It should be noted in passing that the operations of summation and derivation employed with respect to these functions are commutative, it being unimportant which of these is done first in any given case. Referring now to the specific description of Figure 12D, it can be seen how through the use of this figure, a correct determination of the energies and intensities of all three of the energy groups present may be produced.

As has been pointed out in the above more general discussion the energy and intensity of the maximum energy group may be read off directly from Figure 12D. The energy of group $E_3$ may be directly read off from Figure 12D. Its intensity, on the other hand, must be corrected by a quantity $\Delta_1$ equal to the intensity of the maximum energy group multiplied by a function of the quantity $E_2$ and of the quantity $E_2 - E_3$.

Similarly evaluation can be made of energy group $E_4$ and it is found that, again the abscissa of the corresponding peak correctly represents the energy of this group, but that the intensity, that is to say, the number of particles per second in this group, contains one error for each of the superior energy groups, which error must be removed from the ordinate of the peak in order to arrive at an accurate determination of the intensity. The two errors which exist are $\Delta_2$ and $\Delta_3$, respectively. $\Delta_2$ is equal to the intensity of the maximum energy group multiplied by a function of $E_2$ and $E_2 - E_4$. $\Delta_3$ equals the intensity of the second highest energy group multiplied by a function of $E_3$ and $E_3-E_4$. The correction functions referred to above are all the same function, and may be defined in general terms as a function of two variables.

Defining the corrections $$\Delta_1 = aQ(E_2, E_2-E_3)$$
$$\Delta_2 = aQ(E_2, E_2-E_4)$$
$$\Delta_3 = bQ(E_3, E_3-E_4)$$

$\Delta_1$ is a correction term as defined heretofore.

$\Delta_2$ and $\Delta_3$ are similar correction terms.

$Q(x, y)$ is a function of two variables, into which specific values related to energy are put, such as $E_2$ and $E_2-E_3$. The form of Q is theoretically and experimentally derivable information, dependent on the neutron ballistics of the recoiling nuclei, on the pressure of the gas, and shape and size of the interior of the neutron detector.

$a$ and $b$ are the actual intensities of the neutron fluxes of energy groups $E_2$ and $E_3$, respectively.

$E_2$, $E_3$ and $E_4$ are the energies of the three approximately monoenergetic groups of neutrons illustrated in Figure 12.

If $$\frac{d^2}{dE^2}[\psi_1(E) + \psi_2(E) + \psi_3(E)]$$

has values $\alpha, \beta, \gamma$ at $E_2$, $E_3$, and $E_4$, respectively, then the true intensities of the three energy groups, corrected by the $\Delta$ terms may be written $$a = a$$
$$b = \beta + \Delta_1$$

if $\Delta_1$ is taken with a positive sign, or $$b = \beta - \Delta_1$$

if the algebraic sign is attributed to $\Delta_1$. So:

$$a = a$$
$$b = \beta - \Delta_1$$
$$c = \gamma - \Delta_2 - \Delta_3$$

restating these with use of Q functions, there results $$a = a$$
$$b = \beta - aQ(E_2, E_2-E_3)$$
$$c = \gamma - aQ(E_2, E_2-E_4) - bQ(E_3, E_3-E_4)$$

substituting for $b$ in the second term of the right hand side of the third equation above $$c = \gamma - aQ(E_2, E_2-E_4) - [\beta - aQ(E_2, E_2-E_3)]Q(E_3, E_3-E_4)$$

The third equation is now stated exclusively in terms of the empirically determinable function Q, and the experimental values of the $$\frac{d^2}{dE^2}\Sigma\psi(E)$$

all of which are known, or are determinable in this method.

Similar substitutions can be progressively made for more equations. In general the number of terms of the expanded $n$th equation will be

A. 1+1+2+2+3+3+4+4 ...
B. 1, 2, 3, 4, 5, 6, 7, 8 ...

where row B above represents the number $n$ and row A, summed up to the vertically adjacent number, expresses the number of such terms. It can readily be seen that, if one requires the formulation to be explicit in terms of known functions and experimentally determinable data, the calculation becomes extremely complex.

It is, therefore, convenient to leave the expressions to be used in these calculations in non-explicit form, and write, in general $$\Delta_{n_0} = \sum_{E_{n_0}}^{E_{n\,max}} \phi_n(E)Q(E_n, E_n - E_{n_0})$$

Therefore $$\phi_{n_0} = \frac{d^2\psi}{dE^2}\bigg|_{E=E_{n_0}} - \sum_{E_{n_0}}^{E_{n\,max}} \phi_n(E)Q(E_n, E_n - E_0)$$

Transforming the above equation into terms of a general form, as an integral applicable to a continuous distribution of incident neutron energies, there is $$\phi(E_0) = \frac{d^2}{dE^2}\psi(E)\bigg|_{E=E_0} - \int_{E_0}^{E_{max}} \phi(E)Q(E, E-E_0)dE$$

Since the variable E disappears in the above integration, $$\phi(E_0)\frac{d^2}{dE^2}\psi(E) - \int_{\lambda=E_0}^{\lambda=E_{max}} \phi(\lambda)Q(\lambda, \lambda-E_0)d\lambda$$

$\lambda$ is not a quantity which appears in the expansion of the definite integral.

If now it is supposed that $\phi$ may be expanded in a power series and the Q function written literally in terms of a doubly infinite series, and $\psi(E)$ expanded in a power series in $E_0$ and the $\lambda$'s integrated term by term, equations will appear by which the coefficients of the power series in ascending powers of $E_0$ representing $\phi(E_0)$ can be calculated. These equations arise from the necessity that the literal coefficients of like powers of $E_0$ on the two sides of the equation above be identities.

Other methods of approximating the function $\phi(E)$ from a given experimental evaluation of $\psi(E)$ and a specified statement of $Q(X,Y)$ will be apparent to those skilled in the mathematic arts, and will not be dwelt on here.

Obviously the above approach to the problem is cumbersome. An approach which gives valuable data and is simpler to apply, can be carried out by making use of the representation of Figure 12D. In this simplified method there is no need to perform the complete process of deriving the neutron spectrum, as set forth in the previous matter. This method of accomplishing the above makes use of the general baseline subtracting procedure which has been previously outlined in connection with Figure 8.

A summation of at least four quantities, half of which are introduced with a negative sign, is required to perform the baseline process from the $\psi(E)$ function. This process compares values of $$\frac{d^2}{dE^2}\psi(E)$$

at adjacent values of energy, one of which corresponds with a specific absorption. The formulation amounts to a statement of the process of determining from increments of the function, an approximation to the third derivative of $\psi(E)$.

Such an approximation to the third derivative may be stated $$\Delta^3 \frac{d^3\psi}{dE^3} = \psi(E) - 3\psi(E+\Delta) + 3\psi(E+2\Delta) - \psi(E+3\Delta)$$

$$\frac{d^3\psi(E)}{dE^3} = \frac{\psi(E) - \psi(E+3\Delta) + 3[\psi(E+2\Delta) - \psi(E+\Delta)]}{\Delta^3}$$

There have been presented two methods of determining from recoil data the energy spectrum of fast neutrons. The former of these is an absolute method. The latter is a relative method. In Figure 13 there is illustrated diagrammatically a system according to the second method for measuring a relative excess or deficiency of neutrons having a specified energy.

In this figure a detecting system 80 is illustrated diagrammatically. Connected to the detecting system 80 are four pulse rate conversion circuits 81, 82, 83, and 84. Each of these circuits illustrated in Figure 8A, contains means for converting a pulse rate into a direct current. These circuits are connected in series for a purpose to be described in the following disclosure. The composite output of these circuits is delivered by conductors 85 to the transmission cable 86. The cable 86 conducts the signals to a recorder 87 where they are recorded in correlation with depth. This is accomplished by driving the recorder strip through a gear box 88 by a measuring wheel, not shown, over which the cable passes.

In operation there is performed a measurement of a relative excess or deficiency in a flux of neutrons which is otherwise, more or less continuously distributed with respect to energy, such relative excess or deficiency being observed at or in the vicinity of a specified energy. A detecting system 80 operates in such a manner that it furnishes into a plurality of channels of pulse conversion circuits 81, 82, 83, and 84, signals in the nature of pulses derived from recoils generated by fast neutrons. The signals delivered into the channels of pulse rate conversion circuits 81, 82, 83, and 84 are arranged to coincide in time, in each case, with pulses caused by ionizing processes occurring within a specified narrow range of energy. The energy of the ionizing processes is classified by correlating this energy with the electrical charge liberated by means of a pulse height distribution analyzer which is a part of the detector, and will be described in connection therewith. Electrical charge released in the chamber by an ionizing event is quantitatively proportional to the energy liberated in that event for events of the same class.

The narrow ranges of pulse height (energy) selected for delivery into the channels 81, 82, 83, and 84 are spaced apart approximately equally and are of unequal width. The centers of the intervals are in increasing order of energy in passing from channel 81 to channel 84 in that order. Inequality of the width of the energy intervals to which these channels correspond is so arranged that channels 81 and 84 are one-third as wide in each case as are channels 82 and 83. The width of the energy intervals corresponding with channels 81 and 84 is the same, as is the case with channels 82 and 83. As stated above, the circuits 81 to 84 are of the nature of pulse rate conversion devices which deliver into their respective outputs D. C. voltages proportional to the time-rate of occurrence of pulses in their incoming channels. These elements are arranged to deliver their outputs in series, but elements 82 and 84 are polarized in opopsite sense to elements 81 and 83. The intervals of energy over which the entire system operates will be of the order of the width of the type of nulclear resonance which is measured.

The system just described is employed in measuring specific elements which may be present in the strata adjacent a bore hole. The presence of these elements, which it is dsired to measure, can be taken as indicative of the presence of chemical compounds composed of those elements, and may therefore be taken, for example, to represent in a given case petroleum, and in other cases may be taken to represent other economically valuable substances. The valuable result above described is accomplished by making certain chosen adjustments of the energy intervals corresponding with the channels which deliver pulses into the elements 81 to 84.

If the entire energy interval covered by elements 81 to 84 is taken in the vicinity of a specific region of absorption of carbon, such as its resonance at 3.7 million electron volts, then the indication received on the recorder will be a specific measure of the presence of carbon.

Similarly as has been explained before one may measure oxygen by means of its resonance, as for example the resonance at 4 million electron volts. Inasmuch as these particular resonances overlap somewhat, it may be preferred to work on the carbon resonance at 4.3 million electron volts and the oxygen resonance at .9 million electron volts, in substances containing both these elements.

The adjustment to accomplish these particular objectives amounts merely to the choice of suitable upper and lower limits of the total energy intrevals over which the channels 81 and 84 receive their pulse signals. This adjustment is made in the detecting system, to be described hereafter.

Similarly, the presence of aluminum may be observed, for the purpose of recognizing the presence of shale in possible producing horizons. For this purpose one can adjust the energy intreval over which the discriminators are sensitive, to correspond approximately with the aluminum resonance at $4.3 \times 10^5$ electron volts.

Another example is the detection of aluminum by its very narrow specific resonance in the vicinity of 1.27 million electron volts.

Similarly, all elements which exhibit such resonances can be specifically measured and distinguished from one another.

The nature of the detecting system which has been hitherto indicated diagrammatically in Figures 8 and 13 is more particularly set forth in Figure 14. In this figure there is shown a detecting system which employs a detector such as that shown in detail in Figure 10. The detector here shown differs from that of Figure 10 only in the provision of a guard ring 89. Potential is placed across the central electrode 27 and the housing, which housing is at ground potential, by a battery 90. Connected in series with the battery 90, is a resistance 91. The guard ring is connected to the positive end of the battery 90. The apparatus described up to this point is electrically coupled to an amplifier 92 by means of a condenser 93. Condenser 93 is preferably mounted on two stand-off insulators 94 and 95. Resistance 96 is a conventional coupling resistance and may be a part of the amplifier 92.

The output of amplifier 92 is impressed on one detecting circuit of each of a plurality of cathode ray tubes 97. Directly in front of each of the screens of the cathode ray tubes is an optical system 98 which delivers an image to an energy gate or selector slit 99. It is to be understood that each cathode ray tube is provided with such an optical system and all of the elements that will be described in connection with one cathode ray tube. There is provided a photoelectric cell 100 which is disposed directly in back of the selector slit 99. A resistance 101 and a battery 102 are connected in series with the photoelectric cell 100. Connected across resistance 101 is an amplifier 103 which has its output connected in a circuit that comprises a battery 104, a resistance 105, and a diode rectifier tube 106. Connected across resistance 105 is an amplifier 106' whose output is connected to a pulse shaping circuit 107. The output of the pulse shaping circuit is in turn connected to the pulse rate conversion circuit 108 shown in detail in Figure 8A. The pulse rate conversion circuit 108 has its output connected in series with other such units as illustrated in Figure 13.

Selector slit 99 may be provided with a gear rack 109 in which a pinion gear 110 may be operated to change the position of the slit or energy gate 99.

Pulses are produced in the circuit connected to the electrode 27 in the manner which has been previously described, by collection of electrons by the electrode 27. These pulses, after being amplified are delivered to a pair of deflection electrodes in a cathode ray tube. The time course of a pulse on a cathode ray tube may be thought of as a more or less smooth rise and fall of a fluorescent spot caused by a stream of electrons striking the screen. This more or less smooth rise and fall, for the sake of illustration, may be likened to the positive leg of one cycle of a sinusoidal wave. For a better understanding of this, attention is directed to pulses of the above described nature which consist of excursions of equal height on the cathode ray tube, and which are supposed to occur only in one direction, there being no long transient. It can readily be seen that the brightness of the streak of light, caused by the repeated occurrence of such pulses, will have a high maximum in the part of the pulse where the cathode ray beam may be regarded as stopping and turning around to return to the baseline in preparation for another pulse. If now the slit of the selector 99 is so arranged that this region of great brightness shows upon the slit, much larger electrical pulses will occur in the circuit connected to the photocell 100 than would occur if the image of the streak of light fell upon the slit in such a manner that a portion of smaller brightness entered in the region of the slit. Accordingly, therefore, the gain of amplifier 103 is chosen, and the magnitude of the voltage delivered by the battery 104 is taken, just sufficient that a pulse corresponding with the maximum brightness portion of the cathode ray streak causes a signal to be delivered into the amplifier 106' over the opposition of the battery 104. The signals delivered into amplifier 106' will not exist for slit positions on pulse heights corresponding with parts of the streak of a lower brightness, out of the pulse image on the selector 99.

The discussion which has just preceded sets forth the reasons why pulses of any height, other than those having their peaks falling upon the slit 99, will not be seen in the system coupled to amplifier 106'. Pulses of lower height will not be seen because no portion of the transit of the fluorescent spot caused by the electron stream falls upon the slit of selector 99. There will, therefore, be pulses delivered to amplifier 106' which coincide in time with those events occurring in the circuit coupled to electrode 27, and only to those events which fall in a specified pulse height range. Because the output of amplifier 106' will be somewhat uncertain in regard to the size of pulse which it will deliver out of those which have been selected, there is provided an apparatus well known in the art, designated as element 107, the purpose of which is to equalize the size and time duration of the pulse furnished by amplifier 106', in order that these may be better utilized by suitable pulse rate conversion circuits, which were heretofore discussed in connection with Figure 13 and Figure 8.

Still another method of measuring relative excesses or deficiencies of neutrons in a specific energy group out of a general distribution of neutrons of many energies incident upon a detector of fast neutrons will now be described. In this form of the invention neutrons incident upon an impulse ionization chamber will be measured.

The practice of this additional fast neutron measuring method involves the observation of processes in which the energy available in the processes is specifically related to the energy liberated through the action of ionizing particles set in motion by the neutrons. In previously described fast neutron measuring methods, energies of neutrons incident upon the detector were measured by analyzing the statistical distribution of the recoil processes. In this method, each neutron which reacts causes an ionizing process by which its energy may be individually determined.

The process which is most illustrative of the class which is employed is one that is commonly called an *n-p* reaction. An *n-p* reaction is a process involving a neutron and the nucleus of an atom in which the nucleus of the atom suffers a net gain of one electric charge and often a small net gain in the mass. The incident neutron may be thought of as being transformed into its other stationary state, in which it exists as a proton. The subtraction of the electric charge from the neutron, and its addition to this bombarded nucleus results in two products, a proton and a nucleus, both having mass of nuclear order of magnitude and possessing electrical charge, which therefore makes the intensity of ionizing action of these products very large, comparable with that of an alpha particle, and greater in ionizing intensity than gamma rays or beta rays.

The choice of *n-p* reaction as a means for practicing this method is favored by the fact that there has been discovered a specific method for recognizing reactions of this kind, and differentiating them from recoil processes which were previously discussed. The choice of *n-p* reactions is also favored by the fact that these reactions are a practically universal property of all bombarded nuclei, it being expected that, at suitable bombarding neutron energy, any gaseous substance whatever which may be mixed with helium in an impulse ionization chamber will give rise to such processes.

A particular benefit which comes about through the selection of *n-p* reactions for use in connection with this method is that, by this means, one can produce fast neutron detection which is selective and which is much more sensitive to certain energies of incident neutrons. This highly selective fast neutron sensitivity results from the existence of certain specific energy resonances for the production of *n-p* reactions, for example, those which have been experimentally observed in the case of nitrogen. As can be seen in the literature pertaining to this subject, *n-p* reactions and *n*-alpha reactions are similar in some ways, and are governed by the laws of conservation of energy, and their specific properties are determined by the velocity and characteristics of the recoiling nuclei and the lighter particles respectively.

A particular characteristic of such a process, which is used as a method of recognizing and differentiating it from a recoil process, is that the recoiling nucleus ionizes along its very limited track much more densely, because of its greater mass and electrical charge. This is true in spite of the fact that there is a very unequal division of energy between the recoiling nucleus and the lighter particle, and that the inequality is in the disfavor of the recoiling nucleus. Thus while it is true that the path of a lighter particle is much longer and produces more total ionization, it is also true that there is a much denser cluster of ions in the close vicinity of the path of the recoiling nucleus. It can be readily seen from the consideration of an impulse chamber such as is shown in Figure 10, that for the electrons corresponding with particle paths which are produced in the space below the screen 77, no influence in the output circuit connected to the electrode 27, will occur until such time as, these electrons being translated upward, pass through the screen 77. This result occurs because the screen 77 acts as an electrical shield, and prevents the electrical field caused by charges moving outside the space containing the electrode 27 from influencing the electrical charge which is bound on the electrode 27.

Now it may be seen that, if an ionizing path occurs in the space surrounded by the rings 76, and below the screen 77, in Figure 10, and is wholly contained therein, and that if this ionizing path is so directed that it has an appreciable component of its direction lying parallel to the axis of detector 74, then the electrons liberated by this path will be uniformly translated upward and will not come through the screen 77 simultaneously and enter into the region where they can be measured, but will come through this screen 77 in the order in which they were originally closest to the screen. The ones which were originally most distant will be the last to enter. An electrical pulse will therefore occur in the circuit coupled to electrode 27 which will represent, by its shape, if it is plotted versus time, the rate at which electrons were passing through the screens at various times; which rate will of course represent, piece by piece, the various sections of the ionizing track which are entering this screen. This uniform translation, and quantitatively similar piece by piece absorption of the successive sections of a liberated column of migrating electrons is made possible, and rendered accurate, by the provision of a uniform straight electrical field in the space below the screen 77 in the detector of Figure 10.

To recognize and observe exclusively the class of pulses caused by n-p reactions, means of pulse classification is provided. Such means takes the form of an electrical apparatus sensitive to the very sudden pulse caused by the dense cluster of ions associated with the heavy recoil atom. The sensitive classifying means just referred to is used in conjunction with amplifier 92 of Figure 13, in a fast neutron detecting system like that of Figure 13.

By this means one can distinguish these from ordinary recoils, which do not have anywhere along their path such a dense cluster of liberated electrons. The n-p reactions can also be distinguished from recoils of heavy atoms caused by ballistic encounters of neutrons with these heavy atoms. Such a distinction is accomplished by making this system sensitive to total ionization of the entire process, which will be much less in this latter case, although there will be, connected with such heavy nucleus recoils, the characteristic extremely dense cluster of electrons.

N-p reactions in light elements fall in two general classes. One of these classes corresponds with the case in which no added kinetic energy is needed to make the reaction go. For this case the reaction will be caused by slow neutrons, and will have, in that instance, a total energy represented by the loss of mass occurring in the reaction. To use the n-p reaction of such a substance to detect fast neutrons, it is necessary to shut out slow and thermal neutrons. Suitable filters for this purpose may be put around the detector of fast neutrons as illustrated by Figure 7 and may consist of cadmium. It is to be understood that the housing of the detector may be formed in part by cadmium or other suitable material, such as cobalt, gold, boron and indium. Elements having n-α reactions caused by slow and thermal neutrons also may be used in fast neutron detectors, but similarly demand protection from slow neutrons. Examples of substances requiring such protection are nitrogen, helium three, and boron ten, which may be employed in its gaseous compounds. Gases characterized by the presence of elements oxygen, sulphur, and fluorine, are examples of n-p reactants not requiring protection from slow neutrons, as they react exclusively with fast neutrons.

The apparatus shown diagrammatically in Figure 14, with modification, can be used to measure the processes described above. In order to measure such processes amplifier 92 of Figure 14 is replaced by the elements shown in Figure 15, that is, the potential across resistor 96 of Figure 14 is impressed upon the pulse amplifier 111 of Figure 15. The output of the circuit shown in Figure 15, which is taken from the plate and cathode of tube 112, is conducted to the cathode ray tubes 97 in a similar manner to that of the output of amplifier 92 of Figure 14.

The apparatus illustrated diagrammatically in Figure 15 makes it possible to observe only the processes described above which may take the forms shown at 113. Two pulses are shown at 113, one being the reverse of the other. These pulses may occur in the detector instrument in either form illustrated, or both. After being amplified by the amplifier 111 the pulses are introduced into three circuits to be described in order. The first circuit which includes the pulse amplifier 114 is what may be termed an enabling circuit, which enables the amplifier comprising tube 115 to become conductive when the detector output pulse is of specified length for a purpose to be described in connection with the next circuit. The output of amplifier 114 may be impressed across a resistor 116 connected in the cathode circuit of tube 115. The second circuit comprises an amplifier 117 which contains a high-pass filter, which may be in the form of a differentiator, and an amplifier 118 containing discriminating means. The circuit containing the elements 117 and 118 may be termed a peak recognition circuit. The signal which may take the form of one of the pulses illustrated at 119, is fed through elements 117 and 118 to derive a pulse of the form shown at 120. When this pulse is impressed on the grid of tube 115 simultaneously with the conditioning of the tube to render it conductive, there is derived from the tube 115 a signal which has the form shown in 121. This signal is passed through an amplifier and pulse shaper 122, and is impressed upon a resistor 123 connected in the cathode circuit of the tube 112. Tube 112 is normally nonconductive, that is, biased to a point beyond cutoff. For the functioning of the tube 112, it is necessary to consider the third circuit which contains a time delay and shaping circuit 124. The signal output from element 124 is impressed on the grid of tube 112 at a time when it has been rendered uniformly transconductive by the signal portion which has been impressed on the resistance 123 by the amplifier shaper 122. The output signal from tube 112, as described above, is conducted to the cathode-ray tubes 97 in the manner described in connection with the circuits of Figure 14 and measured in the same way.

An alternative method of measuring the above described processes is to use the apparatus shown in Figure 14 from the detector up to the input of amplifier 92; substituting the apparatus shown in Figure 15 for the amplifier 92 in the manner described immediately above and introducing the output of the circuit shown in Figure 15 into the input of the circuit shown at 125 in Figure 16 and the output from this circuit conducted directly to the transmission cable 136 in a manner to be described. For simplicity, the description of that part of the circuit used from Figure 14, and the circuit illustrated in Figure 15, will not be repeated here.

The circuit shown diagrammatically in Figure 16 is essentially an anti-coincidence pulse counter circuit in which the signals fed into the circuit are divided and one portion impressed upon the grid of an amplifier tube 126 which has been biased in the manner illustrated at 127 to a point beyond cutoff by an amount illustrated by the quantity "y." This tube then will pass only pulses whose height is greater than "y." The output of tube 126 is fed through an attenuator 129 to the grid of amplifier tube 130 to produce a function to be discussed later. The remaining portion of the signal at 125 is conducted into a second circuit which includes the amplifier tube 131. Tube 131 is biased, in the manner illustrated at 132, beyond cutoff an amount illustrated by "x," "x" being greater than "y" which is the bias for tube 126. Therefore, tube 131 will pass only signals whose height is greater than the value illustrated by "x." The signals from amplifier 131 are impressed across a resistor 133 which is connected in the cathode circuit of the amplifier tube 130. Tube 130 is biased in such a manner that it is normally conductive, however, when signals greater than $(x+\Delta)$ are impressed upon tube 131, the tube 130 is rendered sufficiently nonconductive that signals from 126 will not be conducted through tube 130. The increment of signal $\Delta$ depends on the setting of potentiometer 129. Therefore, it is impossible for tube 130 to produce a signal in its plate circuit when coincident impulses, such as those illustrated at 127 and 132, are impressed upon the grid and cathode, respectively, of this tube. The signal output from tube 130 is fed into a shaping circuit indicated diagrammatically at 134. The shaped pulses are then impressed upon the pulse rate conversion circuit 135 which is similar to those described in the circuit of Figure 13 and in detail in Figure 8A. The pulse rate converson circuit converts the signals so far produced into a direct current which may be impressed directly upon the transmission cable 136 which leads to the recording equipment located on the surface of the earth adjacent the drill hole.

Figure 16 has broader application to neutron measuring systems than that in connection with which it has been described. This circuit can be used in connection with that portion of the circuit of Figure 14 extending from the detector through amplifier 92. It is to be understood that the number of leads coming from amplifier 92 will be the same and that there will be as many channels, identical to those of Figure 16, as are necessary for the measurement that it is desired to make. There will be, in other words, one channel to replace each cathode-ray tube, and its connected equipment. The ends of these channels are provided with separate pulse rate conversion circuits, which may be connected in series in the manner shown in Figure 13, and the output from such a connection fed to the transmission cable in the manner shown in this figure.

The system described in connection with the last alternative method presented may be provided additionally with two circuits of the type shown in Figure 16, their inputs connected in parallel, but otherwise used as stated before, and employed in connection with the system of Figure 8. In such a case the two pairs of input leads of the two channels shown in Figure 8 will be connected respectively to the two outputs of the circuits of the type of Figure 16. The receptivity of the channels of Figure 8 to the desired energy of pulses, as required in connection with that system, will be secured by suitably adjusting the two circuits of the type of Figure 16.

Further methods of recognition of kinds of ionizing events will be shown in general, and consist in other and different substitutions for the element 92 in Figure 14. The circuit of Figure 16 finds application in all of such measuring systems as also does the cathode-ray tube arrangement shown in Figure 14.

It is to be understood that the method of recognition herewith shown in Figures 14, 15 and 16 for the identification of *n-p* reactions, may also be used to identify and study *n-α* reactions. With suitable substances in the detecting chamber, such as nitrogen, *n-α* processes can be selected by exactly the same electrical means, and likewise, provide an exact indication of the energies of the neutrons which caused them.

Another form of the instant invention is illustrated diagrammatically in Figure 17. This form of the invention is adapted to measure hydrogen content of the formations adjacent a drill hole. The measurement is effected by detecting maximum energy neutrons entering a special detector substantially perpendicularly to the axis of the instrument after they have been emitted by a source vertically spaced a short distance from the detector, entered the formation, and rebounded from relatively massive nuclei therein. These energetic processes which are measured are those which correspond with neutrons entering the special detector, making a substantially square hit on a helium (or hydrogen) nucleus in the detector, and causing the recoiling nucleus to be so directed in the detector, that it dissipates its entire energy in the ionizable medium therein, along a path transverse to the axis of the instrument. Neutrons, which are detected are, for square hits, collinear with the recoil paths they cause. Therefore, the special detector, as used herein, is quite accurately directional and will be sensitive only to neutrons of maximum energy, incident perpendicularly to the axis of the instrument.

It has been made certain that this directional sensitivity will prevail by selecting the shape of the gas space in the detector between its walls so that long recoil paths can only exist perpendicular to the axis.

Neutrons which have maximum energy can have rebounded but very few times from atoms in the strata, because those which have rebounded more times will generally not have retained maximum energy. For simplicity, consider a maximum energy neutron which has left the source substantially perpendicularly to the axis of the instrument, and has rebounded in a suitable direction to enter the detector. Such a neutron can retain approximately its total energy, only if the atom is struck in rebounding was not hydrogen. Neutrons striking hydrogen nuclei under the above circumstances will have lost nearly all of their energy. Hydrogen will, therefore, be very specifically measured because it will produce a deficiency of returned energetic neutrons, compared with the intensity which is returned from similar strata not containing hydrogen.

Referring particularly to Figure 17 for a description of the apparatus, there is shown a housing 137 that has been designed for operation in a drill hole in which high pressures are encountered. Housing 137 contains, in its lower part, a source of neutrons 138, a battery 139 and a variable connection thereto indicated as 140. Battery 139 serves to place a potential on the electrodes 141 and 142 of the impulse ionization chamber 143. Electrodes 141 and 142 are disposed in an atmosphere of helium or hydrogen. These electrodes are in the form of discs which are axially spaced from each other an amount which is many times less than their diameter. In a practical well logging instrument the spacing between electrodes can be 1 cm. for a diameter of electrodes of 7 cm. and a helium pressure of approximately 7 atmospheres, or a hydrogen pressure of approximately 100 atmospheres.

In order to cause equal weighting of the influence upon the external circuit for electrons produced in the ionization chamber, there has been provided a screen 144. The screen 144 is connected to the variable tap 140 of the battery 139. The screen is so chosen that it is a practically perfect electrostatic shield for the electrode 141. This is accomplished, as is well known, by using screen having a spacing between its wires which is small compared to the distance between the screen 144 and the electrode 141. This arrangement results in equal weight being given to all electrons which originate in the major part of the interior volume, that is, between screen 144 and electrode 142.

Except for screen 144, the electrode circuit includes electrodes 141 and 142, battery 139, the ground or casing 137, and resistor 145. Processes occurring within the ionization chamber 143 cause to be produced, across the resistor 145, pulses which may be amplified by the amplifier 146. Amplifier 146 is preferably one having a flat frequency response in the range of from 100 kilocycles to 10 megacycles. The amplified signals, or pulses, are fed into a pulse height selector 147' of the type shown in Figure 16. The output of this circuit is in turn conducted to a pulse shaper and impedance matching circuit, indicated by block diagram at 148'. The impedance matching means are necessary in delivering to the transmission cable signals of suitable nature to be transmitted to the recording system located on the surface of the earth adjacent the mouth of the drill hole. It is to be understood that the recording system will have a pulse rate conversion circuit, such as has been described heretofore, connected therein.

The pulse height discriminator 147' may take the form illustrated diagrammatically in Figure 18. In this figure there is shown input conductors 149' which serve to conduct a signal to the grid of a vacuum tube 150', which is normally biased beyond cutoff, by an amount sufficient to reject all but the largest incoming pulse signals. Tube 150' has its output connected by means of a cathode follower to the succeeding circuit element 148'.

Since the method and apparatus just described is a directed ray method of investigation, it is exceptionally well adapted to make deep investigations of very thin strata, without error being caused by the near presence of other and different strata above and below.

A modification of that form of the invention described immediately above is shown in Figure 19. In this modification the ionization chamber 143 is shown having the planes of its electrodes disposed at a substantially acute angle to the axis of the instrument. This angle may be any angle desired which will align the space between the electrodes with the path of rebounding fast neutrons which it is desired to measure. In this figure, corresponding elements have the same reference characters. The electrical output circuit extending to the transmission cable may be the same as that utilized in connection with Figure 17.

The difference between the arrangement of Figure 17 and the arrangement of Figure 19 is that, by means of the Figure 19 arrangement it is possible to direct attention to the most favorable angles of scattering, at which the primary maximum energy neutrons of the source have the largest likelihood of being scattered by the nuclei of atoms present in the strata. Furthermore, since this favorable angle is realized only in the plane including the axis and the lowest part of the tilted ionization chamber, and only at the left of the axis, in this plane, as shown in the figure, the arrangement of Figure 19 will be orientation sensitive in a bore hole, and may be used to investigate the strata lying in different geographic directions from the axis of the bore hole being investigated. The device in Figure 19 may, therefore, be used in conjunction with orientation means known in the art, to determine transverse variations in properties of strata penetrated by a bore hole, and to determine the geographic direction of these variations.

A further modification of that form of the invention illustrated in Figure 17 is shown in Figures 20 and 21. Figure 21 is a horizontal sectional view of Figure 20 taken along the line 21—21 as indicated. In these figures there are provided two ionization chambers 143 and 143' such as that illustrated in Figure 19. The disposition of ionization chambers 143 and 143' is such that each occupies one-half of the cross-sectional area of the housing 137 and is slanted in the same manner, as illustrated in Figure 19, but mutually opposite. Like reference characters are used on corresponding elements of chamber 143. It is to be understood that chamber 143' contains corresponding elements, as well as a source of potential.

The output from chambers 143 and 143' are fed to amplifiers 146 and 146', respectively. Each amplifier output is conducted, in the manner described in connection with Figure 17, to independent recording circuits where separate records are made.

The device of Figure 20 is sensitive to geographic orientation, and may be oriented by methods familiar in the art.

Determination of the vertical dip of strata crossing a bore hole may be made by measuring the angle at which the strata cross the bore hole. It is to be understood that this measurement has to be corrected by deviations from vertical for the drill hole, which may be determined by methods well known in the art. The magnitude of the dihedral angle between the plane of the strata and the plane perpendicular to the axis of the bore hole may be determined by observing, on an enlarged depth scale, the exact depths at which two corresponding transitions between adjacent strata occur, and comparing these depths by subtracting them. It is understood that the instrument is so oriented that the above difference is maximum, and that such orientation has been measured, to indicate the direction of the dip. The angle of dip is then $$\theta = \tan^{-1} \frac{\Delta}{W + 2p}$$

where $\theta$ is the angle of dip
$\Delta$ is the above described measured difference of depth
$p$ is the penetration, or average depth of investigation of the radiation detection process, out from the sides of the bore hole
$W$ is the diameter of the bore hole Still another modification of the form of the invention, as illustrated in Figure 17, is illustrated in Figure 22. This modification differs from those described immediately above in that the ionization chamber and contained elements are given a conical form. There is employed in this modification a single ionization chamber. Generally speaking, the pointed portion of the chamber and contained elements point upwardly. In this modification, the same character references are used to denote parts corresponding to those described in connection with Figures 17 to 21.

This modification of an embodiment of the invention has the characteristic set forth in connection with Figures 19 to 21 inclusive, that it emphasizes, through its directional sensitivity, those fast neutrons which have been scattered from relatively heavy nuclei in the strata (not hydrogen) at favorable angles of scattering. The directional sensitivity of the device of Figure 22 is such that it preferentially observes fast neutrons of maximum energy coming in on a cone having the same apical angle as the apical angle of the conical elements of the chamber, a conical axis coincident with the axis of these elements, 141, 142, 144, and an apex vertically situated between elements 142 and 144. The advantage of the device of Figure 22 is that it has no orientation sensitivity, therefore it gives a representative sampling of the material adjacent to the bore hole in all geographic directions from its axis.

The use of a favorable apical angle, together with a correct placement of the source 138 with respect to the apex of the ionization chamber 143, gives better utilization of the neutrons, and greater sensitivity, because of the large number of neutrons scattered by nuclei of elements in the strata at the more favorable scattering angle thus observed.

Obviously, the sensitivity of all the detectors of fast neutrons illustrated in Figures 17 to 22 will be limited by their small internal volumes. This limitation may be overcome, while retaining the desired directional properties by repeating the elements of these radiation detectors, connected electrically in parallel, and with all the elements geometrically parallel.

Another embodiment of the instant invention is shown diagrammatically in Figure 23. This embodiment makes it possible to determine horizontal sensitivities of processes attributable to fast neutrons, by selecting out of all the ionizing processes due to fast neutrons, recoils occurring in a particular space in the detector. The recoils which are selected are those having a path that traverses the ionization chamber in a definite manner.

The ionization chamber 147 is of the general type described in connection with Figure 10. However it differs from that of Figure 10 in that the portion above the screen 148 is partitioned by an element 149 to divide that portion into two parts 150 and 151. The partition 149 depends from the top of the housing 152. However its bottom end does not necessarily contact the screen 148, in face, under some conditions it may be completely omitted.

Each of the chambers 150 and 151 is provided with its collecting electrodes 153 and 154, respectively. These electrodes are elements in separate circuits. Electrode 153 is connected in a circuit including a resistance 155, a battery 156, and ground which is connected to the case of the ionization chamber. In a like manner, there is a circuit which includes resistance 157, battery 156, and ground. Potentials developed on the electrodes 153 and 154 are transmitted to amplifiers 158 and 159, respectively. The output circuits of these amplifiers are connected to a coincident circuit 160, indicated diagrammatically as a rectangle. Coincident signal pulses are delivered by the output of the coincident circuit to combination amplifier and pulse shaper 161. From this element, the shaped pulses are fed to a pulse rate conversion circuit 162, which in turn delivers a direct current, which varies in accordance with the time-rate of occurrence of the pulses introduced to it, to the cable 163. The signal transmitted to the surface is recorded in a conventional manner in correlation with depth.

In the operation of the above described device, dense ionizing paths are detected which cross the interior of the detector 147, in the region below screen 148, and cross the plane of the partition 149, extended. Because of the fact that recoils are directed generaly forward, in relation to the movement of the neutron which produced them, this arrangement tends to be relatively more sensitive to incident neutrons which enter the detector perpendicularly to the plane of the element 149. This transverse sensitivity also applies in the sense that neutrons incident upon the detector will be relatively neglected if their travel is chiefly along the axis of the bore hole, and will be more emphasized if they travelled in such a manner as to enter the detector generally perpendicular to the bore hole. Such a preference is an advantage because it tends to emphasize deeply-penetrating neutrons, which have gone a long way out into the strata, from the source, before returning to the detector. Such deep penetration of the neutron flux, which is emphasized, tends to produce more representative observations of heterogeneous strata.

In order to more clearly illustrate the manner in which horizontal sensitivities can be determined, reference is made to the modified form of detector shown in cross section in Figure 24. In this form partitions 164 and 165, which cross at right angles to each other, are shown instead of the single partition 149 described in connection with Figure 23.

Obviously the partitions 164 and 165 divide that portion of the detector above the screen 148, as illustrated in Figure 24, into four equal portions 166, 167, 168, and 169. The portions are provided respectively with collecting electrodes 170, 171, 172, and 173.

It is to be understood that each electrode is provided with the usual circuit consisting of a source of potential and a resistance. The output from each collector electrode is fed into a separate amplifier designated as 174, 175, 176 and 177, respectively. The outputs of the amplifiers, in pairs, are fed into coincidence counter circuits 178 and 179. The outputs of amplifiers 174 and 176 are fed into coincidence counter circuit 178 and the outputs from amplifiers 177 and 175 are fed into the coincidence counter circuit 179. The output signals from coincident counter circuits 178 and 179 are separately conducted through amplifier-shaper circuits and pulse rate conversion circuits to separate transmission circuits in the cable 180 by means of which they are conducted to separate conventional recording systems located on the surface of the earth. Under certain circumstances, the partitions 164 and 165 may be omitted.

In the modification of this invention shown in Figure 24, more useful directional sensitivity is possible because of its ability to compare effects in two mutually perpendicular directions. If, for example, there is a hole with considerable directional difference, several oriented passes would be necessary to determine the fact, by the device of Figure 23, but much less effort of this kind would be needed to determine transverse anisotropy of the strata in the case where the device of Figure 24 is used. Anisotropy can always be reliably determined by the device of Figure 24, if two such devices are concurrently used, mechanically coupled with their respective quadrants turned at 45°. The exact measurement of such anisotropy is obtained, in the case of the device of Figure 24, by subtracting the indications, delivered in the two coincidence channels containing circuits 179 and 178. In the case of the concurrent use of two Figure 24 apparatuses at 45° orientation, the same thing would be done to both of them and two differences obtained. A figure would then be calculated, which would represent a measure of the anisotropy.

$$(D_1^2 + D_2^2)^{1/2} = \delta$$

where $D_1$ is the difference obtained from one of the Figure 24 devices, $D_2$ is the difference obtained from the second such device, $\delta$ is the quantity which represents anisotropy. Obviously also, Figure 24 may be modified if desired to use octants instead of quadrants, pairing opposites and subtracting the pulse rate conversion circuit output of pairs of these which are 90° apart. The result thus accomplished is to supply the two differences which may be introduced into the above formula. Any such device or devices may be held in the middle of the bore hole and aligned axially therewith by means familiar in the art.

In both the device of Figure 23, and the device of Figure 24, an advantage is gained in making the directional properties more precise, if the coincidence circuits 160, 178, and 179 are made to be insensitive to any but large and concurrent pulses. Also, the same purpose can be accomplished by inserting between amplifiers 159 and 158 in Figure 23, and the coincidence circuit 160 in that figure, and between amplifiers 174, 175, 176, and 177 and the corresponding coincidence circuits, devices such as have been illustrated in Figure 18.

For the purpose of improving the directional sensitivity of the arrangements shown in Figures 23 and 24, masks composed of sheet metal may be superimposed in electrical contact with the screen 148 shown in Figure 23, and the screen, not shown, which is used in the same manner in connection with Figure 24. In lieu of such a mask, it will at times be convenient merely to close the holes in chosen areas of the screen. The open areas which exist where either of these modifications is employed will have a form and shape related to the direction measuring purpose for which the detector is used. For transverse sensitivity limited within a dihedral angle, the remaining open areas of the screen will be limited within the intersection of the planes of the dihedral angle and the screen. It is understood in the above that the line along which the planes composing the dihedral angle limits of sensitivity intersect is coincident with the axis of the instrument shown in Figure 23. Open sectors of 30 degrees will often be convenient. In the detector illustrated in Figure 10 one may use an open area lying between parallel chords of the screen disc, and distant one-fourth inch from the center of the disc. Two circular open areas may be employed in the case of detector 23. These may be one-half inch in diameter, and with their centers lying on a diameter of the circular wire screen parallel to the line joining the tips of electrodes 153 and 154. In a preferred form, the above circular open areas will be tangent to the circular rim of the wire screen 148.

In Figure 25 there is illustrated diagrammatically an electrical system by means of which the output from a detecting system, such as that illustrated in Figure 23, can be treated in such a manner as to give a more accurate measurement of direction of neutrons incident on the detector. In this figure the detecting system, up to and including amplifiers 158 and 159, corresponds to that shown in Figure 23 and carries the same reference characters.

The electrical system connected to the outputs of amplifiers 158 and 159 serves to measure through a coincident enabling circuit the added effect of coincident pulses produced upon electrodes 153 and 154 in the detecting system. The arrangement of apparatus for accomplishing this includes amplifiers 181 and 182 whose inputs are connected respectively to the outputs of amplifiers 158 and 159. These amplifiers include pulse height limiters so that output pulses are of uniform height.

The output of amplifier 182 is used to apply a bias potential to amplifier tube 183 by impressing a potential across the resistance 184 connected in the cathode circuit of the tube. The output of amplifier 181 is impressed directly upon the grid of tube 183. Tube 183 is normally biased beyond cutoff by an amount greater than the potential of one pulse alone, regardless of whether it is received on the cathode resistor from amplifier 182, or whether it is received on the grid of the tube 183 from the amplifier 181. Thus, tube 183 cannot conduct a pulse when non-coincident pulses are received from amplifiers 181 and 182. However, any coincident pulses received from the amplifiers 181 and 182 are, when totaled, sufficient to overcome the bias on tube 183 to produce a pulse in the plate circuit of this tube. The pulse so produced is impressed on a delay circuit which comprises a condenser 185 and a resistance 186 which are connected in parallel between the plate circuit of tube 183 and ground. Since the signal from tube 187 must enable the tube 190 during the whole interval of time in which the pulse is arriving from low pass filter 196 it is necessary that the pulse from tube be lengthened and that is the purpose of elements 185 and 186. The delayed signal is impressed on the grid of amplifier tube 187. Amplifier tube 187 is normally biased to a point sufficiently close to the upper cutoff, that a relatively wide pulse is delivered to the plate thereof. The pulse produced in the plate circuit of tube 187 is conducted through a condenser 188 to a resistance 189 which is connected in the cathode circuit of the tube 190 for the purpose of rendering this tube conductive.

By means of an auxiliary circuit, portions of signals delivered by the amplifiers 158 and 159 are diverted through conductors 191 and 192 to separate grids of a dual triode amplifier tube 193. The two triodes of the tube 193 have the same properties. The cathodes of tube 193 are connected together and to ground through a resistance 194. The plates of this tube are connected together and to a source of plate potential through a resistance 195. With such an arrangement of tube elements, coincident pulses on the grids of tube 193 are added together to produce a single pulse signal in the plate circuit of the tube representing the sum of two pulses. This signal is conducted through a low-pass filter 196 to the grid of amplifier tube 190 to produce a signal in the plate circuit when the tube is rendered conductive by the enabling circuit which impressed the bias potential from amplifier tube 187 on the resistance 189. The signal output from tube 190 is divided into a plurality of channels each of which is as illustrated in Figure 16. The outputs from the plurality of channels may be recorded or respectively fed into pulse rate conversion circuits in the manner described in connection with Figure 13. The output signals from the pulse rate conversion circuits are then combined in the manner described in connection with Figure 13, and transmitted through conductors in the cable 86 to a recording system located on the surface of the earth adjacent the mouth of the drill hole where they are recorded in correlation with depth.

The device illustrated in Figure 25 enables the operator to accomplish concurrently a measurement of the relative excess or deficiency of a particular energy group of neutrons, and a better determination of the direction of the neutrons of which there is an excess or deficiency with respect to neighboring energy groups. This very desirable result is brought about by the fact that the third derivative process, which is described in connection with Figure 13, amounts to a procedure for recognizing, in the ionization chamber, events caused by square hits due to neutrons of the energy group of which there is an excess or deficiency. The square hit recognition property of Figure 13 and Figure 25, limits the detecting system to observing recoils which are substantially collinear with the neutrons which set them in motion, and which therefore have a direction which may be used to measure the direction of the incident neutrons.

The square hit recognition property of the third derivative analysis of Figures 13 and 25 may be understood by reference to Figure 12. In Figure 12, it will be seen that the maxima in Figure 12D arise because of the onset of new processes in the detector as the energy is decreased, as may be understood from diagrams $12B_0$, $12B_1$, and $12B_2$. The new processes, which have their onset at $E_2$, $E_3$, and $E_4$, in these diagrams are, respectively, substantially square hits with neutrons of the corresponding energies. Since it is these substantially square hits which cause the maxima in Figure 12D, and which also will influence the third derivative of $\psi(E)$, (baseline subtraction), these derivatives will be chiefly influenced by substantially square hits, and will select, as a class, events which have the collinear geometric selectivity of a square hit. The type of recognition of processes accomplished in these operations differs from specific recognition of $n$-$p$ or $n$-$\alpha$ reactions, in that, in these derivative methods, only recognition of a class is possible, not recognition of specific events occurring in the chamber. Maximum energy recognition as practiced in connection with Figures 17 to 22 is specific to square hit recognition of individual processes. Such specific recognition has not thus far been found possible for square hits of less than maximum energy. The need for class recognition, such as is provided in Figure 25, arises because it is impossible, in general, to provide for a wide variety of specified maximum energies in a bore hole. Without the arrangement of Figure 25, attention of directionally sensitive processes involving square hit recognition would be severaly limited as to the energies of neutrons at which such processes can be carried out, limited in fact to approximately 2.5, 12, and 14 m. e. v. It is desirable to study the general range of energies, because only so can one detect specific elements by their nuclear resonances, as has been taught elsewhere in this invention. The apparatus of Figure 25 thus provides for an essentially new and valuable result, to wit, the directional recognition of specific elements by their specific interaction with neutrons.

Another embodiment of the instant invention is illustrated in Figure 26. This embodiment lends itself to the measurement of the direction and sense of direction taken by an ionizing particle in a detector, as well as the energy of the incident neutron.

In this figure there is shown a novel detector 199 and a source of neutrons 198 located below the detector 199. It is to be understood that all the apparatus of Figure 26 is to be assembled within a housing that is adapted to traverse the bore hole.

Detector 199 consists of a housing 200 which encloses an ionizable medium such as a mixture of hydrogen and helium, but predominantly one or the other, under a pressure of from 10 to 500 atmospheres dependent upon the dimensions of the detector, and the voltage applied thereto. Inside the detector, and disposed in the ionizable mixture, are a plurality of ring shaped electrodes. These are divided into two groups 201 and 202 by a screen 203. The ring electrodes are vertically spaced from each other by substantially uniform intervals of distance. Also disposed in the detector in such a manner that they extend inwardly a short distance from each end, are electrodes 204 and 205. The region about electrode 204 is divided from the region of the ring electrodes 202 by a screen 206. In like manner the screen 207 divides that portion of the ionization chamber immediately surrounding the electrode from the region of the rings 201. The housing 200 of the detector is grounded at 208. Conductors 209 and 210 make connections respectively between the electrodes 204 and 205, and external circuit elements to be described.

Conductor 209 forms, with resistance 211, battery 212, and ground 213, an electrode circuit for the top electrode 204. In the same manner conductor 210 forms, with resistance 214, battery 212, and ground 213, an electrode circuit for the bottom electrode 205.

Signals produced across the resistance 211 are amplified by the pulse amplifier 215, and fed to a threshold circuit 216. Threshold circuit 216 serves to block small signals such as those that are produced by the dissipation of gamma rays.

Any signals that extend over the threshold for which circuit 216 is adjusted are allowed to pass and be conducted to a pulse sharpening circuit 217, which may be a differentiator. The signal output from 217 is introduced into a pulse shaping circuit 218 which consists of means for lengthening the pulses with respect to time but not changing their height. The pulses so shaped are then impressed upon the grid 219 of a double triode amplifier tube 220, for a purpose to be described later.

Signals produced across the resistance 214 are amplified by the pulse amplifier 221, and fed into a threshold circuit 222. Threshold circuit 222 functions in the same manner as that described in connection with threshold circuit 216. Signals from the threshold circuit 222 are fed into an inverting circuit 223. After inversion the signals are conducted to a pulse sharpening circuit 224, which may be a differentiating circuit. The sharpened pulses are then fed into a pulse shaping circuit 225 which lengthens the pulses with respect to time but does not increase or decrease their height. The shaped pulses are then impressed upon the grid 226 of the amplifier tube 220. It is to be understood that both halves of the double triode will have similar properties. Obviously, tube 220 can be replaced by two triodes having matched characteristics. The cathodes of the double triode 220 are connected together, and through resistance 227 to ground. The plates of this tube are connected together to form a single output circuit. Plate potentials are supplied to both plates through the resistance 228.

Both halves of tube 220 are biased to a point which is at substantially the center of their linear amplifying range. Any signal flowing in the plate circuit from tube 220 will be representative of the difference between signals impressed upon grids 219 and 226. The polarity of this signal will determine which of the grids had the greater potential impressed upon it by their circuits described immediately above. The difference between the potentials applied to the grids 219 and 226 will determine the direction and sense of direction of ionizing particles passing through both halves of the ionization chamber within the range of the electrodes.

The density of ionization occurring along the path of a heavy-particle recoil in an ionizable medium is non-uniform and is much greater near the end of the path. Hence, if an arrangement of apparatus is provided for measuring the ionization of the early and late part of the path separately, obviously, the ionization appreciated from the late part of the path will be greater than that from the early part of the path. If the ionizable medium is a gas which does not attach electrons and which has a means provided for maintaining the free electrons at a relatively low temperature, it is possible to collect the free electrons occurring along the heavy-particle path sufficiently quickly that their time arrival at the collector electrode will be a faithful representation of their time of liberation. An exception to this is a particle path which lies along an equipotential plane in the detector. These paths, however, are ignored in the apparatus here described. The collection of electrons from the late part of the path will not only contain more total energy but will also be characterized by a higher rate of arrival of energy at the electrode than from the early part of the path.

The detector 199 shown in Figure 26 makes possible the results stated above. Particle paths arising in the space enclosed by ring electrodes 201 and ending in the space enclosed by ring electrodes 202 will then cause a positive pulse in the plate circuit of tube 220 and if the beginning and end were reversed with respect to these two spaces the pulse appearing in the plate circuit of tube 220 will then be negative.

The output signal from tube 220, regardless of its polarity, is impressed upon the grid of an amplifier tube 229. The function of this signal will be described in connection with the auxiliary circuits, a description of which will follow.

A portion of the signals passing through the threshold circuit 216 are diverted to an auxiliary circuit which includes an amplifier 230 and a clipping and shaping circuit 231. The output pulses from circuit 231 will then be conducted to and impressed upon, the grid of tube 232. In operation this tube functions jointly with the auxiliary circuit which conducts a portion of the signals diverted from the output of the threshold circuit 222 to an amplifier 233. The output of amplifier 233 is fed into a clipping and shaping circuit 234 from which it is conducted to the cathode circuit of tubes 229 and 232 and there impressed across the resistor 235.

Tube 232 is normally conductive. Tube 229 is normally biased to a point beyond cutoff, by means of the normal potential on resistance 235 due to the condition of the circuit through tube 232 and to the bias placed on the grid of tube 229. However, when the potential supplied by the clipping and shaping circuit 234 is applied across the resistor 235, and a pulse impressed from the clipping and shaping circuit 231 is applied simultaneously on the grid of tube 232, then the signal from tube 220 which is impressed on the grid of tube 229 causes a pulse of current to flow in the plate circuit of tube 229. This is true because tube 229 has been rendered conductive by the simultaneous arrival of pulses from circuits 231 and 234. These output pulses will have individual polarity determined by the polarity of the pulses from tube 220. The enabling pulses impressed across the resistance 235 and on the grid of tube 232 are of lower frequency than the signals received on the grid of tube 229. This situation is made to exist in order that separation of the desired signals can be made from the enabling pulses by means of a suitable high-pass filter 236. The pulses flowing from the high-pass filter 236 are amplified and clipped by the amplifier 237. The pulses flowing from amplifier 237 may be either positive or negative in polarity depending upon the output pulses from the tube 220. Pulses of positive polarity will flow through the condenser 238 to the grid of tube 239, while negative pulses will flow through the condenser 240 to the grid of tube 241. This is made possible by maintaining tube 239 in a normally cutoff condition and tube 241 in a normally conducting condition such that tube 239 will pass only signals which are positive in polarity and tube 241 will pass only signals which are negative in polarity.

When a positive signal is impressed upon the grid of tube 239 the tube tends to become conductive and negative pulses are produced on the plate of tube 239. These negative pulses are conducted through condenser 242 to the grid of tube 243. This tube is normally conductive. This negative pulse causes a drop in the plate current of tube 243, resulting in a tendency to produce a drop in potential across resistor 244. Resistor 244 is a common cathode resistor for both tubes 239 and 243. This reduced potential across resistor 244 causes the plate current in tube 239 to increase still further. This, of course, causes a further negative signal on the plate of tube 239. This positive feed-back arrangement continues to operate until tube 239 reaches saturation and tube 243 becomes nonconductive. When a portion of the charge in the condenser 242 leaks off through the bias resistors, the circuit is rapidly restored to normal by the positive feed-back just described. The pulse produced by the circuit at the plate of tube 239 is a relatively low frequency pulse which is conducted through condenser 245 to the cathode of tube 246. Tube 246 is normally biased beyond cutoff, but this negative pulse impressed upon the cathode, causes the tube to become conductive. The tube now can receive signals on the grid and faithfully amplify them. A manner in which signals impressed upon the grid of this tube are produced and the function that they serve will be described later.

As pointed out above, pulses from the amplifier 237 are delivered to the tube 241. Tubes 241 and 248 operate in the manner described in connection with tubes 239 and tubes 243. The only difference is that tubes 241 and 248 are triggered by negative pulses whereas tubes 239 and 243 are triggered by positive pulses. The pulses produced in the plate circuit of tube 248 are conducted through a condenser 249 to the cathode of tube 247. Tube 247 in the same manner as described in connection with tube 246, is normally biased beyond cutoff and the signal impressed upon the cathode resistor serves to condition the tube for the reception of a signal on its grid. Tube 246 or 247 will function to produce a pulse in their plate circuits, dependent upon the polarity of the signal produced by tube 220. The signal that is desired to be represented in the plate circuit of either tube 246 or 247 is a pulse which will represent the total energy of the ionizing process which occurs in the detector. To accomplish this, a portion of the signal from the threshold circuit 216 and a portion of the signals from the threshold circuit at 222 are respectively impressed upon the grids 250 and 251 of the dual triode 252. It is to be understood that both halves of this tube will have similar properties, or this tube may be replaced by two independent triodes having similar properties. The cathodes of this tube are connected together and to ground through resistance 253. The plates are connected together and to a source of potential through a resistance 254. A coincident pulse delivered by the threshold circuits 216 and 222 when impressed upon the grids of tube 252 will add together to produce a signal in the plate circuit of this tube which is proportional to the sum of the amplitudes of the coincident pulses. The signal is conducted through an artificial line 255 which has as its purpose to delay the signal a specified length of time. The delayed signal is then conducted to the grids of tubes 246 and 247 through condensers 256 and 257. This signal represents the energy of the incident particle. This signal is impressed upon the grids of both tubes 246 and 247 and will be conducted through only one tube, dependent upon which tube has received an enabling pulse on its cathode. The tube which receives the enabling pulse depends upon the polarity of the signal from tube 220 and hence upon the direction and sense of direction of the path of the ionizing particle in the detector.

Pulses flowing in the plate circuit of tubes 246 and 247 are conducted through high-pass filters 258 and 259, respectively. The outputs from these filters are conducted through separate circuits to recorders where separate records may be made in correlation with depth. The outputs from the high-pass filters 258 and 259 can be conducted into other equipment, such as the arrangement shown in Figure 13, which may be inserted between them and the cable for the purpose to be explained.

The apparatus shown in Figure 26 represents a novel and valuable way of practicing the instant invention. The new element of information which has been added is the sense of direction of neutrons. Heretofore, the directional means which have been disclosed offer no opportunity to determine this fact, offering only the possibility of knowing that a particle took one of two opposite courses.

This desirable result enables the operator to select neutron particles entering with a component in the direction opposed to the sense which a particle would have if it travelled on the direct line of travel from the source. By selecting incident neutrons which are so directed and which have high energy, one is able to measure that portion of the flux of neutrons, derived from the source which has penetrated very deeply through the strata, and is therefore adapted to give a valuable improvement of accuracy in the measurement of very heterogeneous strata.

The method of well logging which is shown in Figure 26 will combine valuably with four pulse height selector circuits as shown in Figure 16, and with the pulse rate conversion circuits, as taught in connection with Figure 13, to enable the directed sensitivity of the device of Figure 26 to be applied to the measurement of the presence of specific elements in the strata. The presence of specific elements may be determined as taught in connection with the theory of Figure 12, by measurement of relative excesses and deficiencies of neutrons having energies corresponding with specific nuclear reactions of the elements to be detected. The specific desirable qualities of the n-p reaction may be used by putting between the output of the double tube 220, and the succeeding element, a device of the type shown in Figure 15. The effect of this is to recognize energy of individual neutron-caused processes, avoiding the necessity of making third derivatives as outlined in connection with Figures 12 and 13. The resulting arrangement requires only one Figure 16 device, and only one pulse rate conversion circuit to bring about a measurement of a specific energy group of neutrons. Because the n-p reaction does not convey the perfect collinear directional meaning of the square-hit recoil, the above arrangement gives a considerably less well defined indication of sense of direction than is obtained by the method of observing recoils. It is understood that choice of observation of recoils or observation of n-p reactions is accomplished by choosing a suitable gas composition in the detecting impulse ionization chamber. An example of such a gas is helium three.

As in the other cases, the recognition of square hits may be carried out in a restricted manner by applying a pulse threshold selector of the type shown in Figure 18 to the output signals of the device of Figure 26. Such a device, followed by a pulse rate conversion circuit, will, with suitable adjustment of the threshold of the Figure 18 apparatus, observe only substantially square hits due to maximum energy neutrons derived from the source. The advantage of such a method of employing the device of Figure 26 in well logging is that, by this means exceptionally deep and representative penetration of the neutron flux is observed. With sources of neutrons of any desired energy available, the above maximum energy square-hit system can be applied to determine nuclear resonances of specific elements in the strata, whereby they would be measured, at a particular direction and sense of direction from the radiation detector of Figure 26.

A modified electrical system for determining direction, sense of direction, and energy of the particle producing a process within the detector, is illustrated in Figure 27. Conductors 260 lead from a detector, not shown, such as that illustrated in Figure 10. The top one makes connection with electrode 27 and the bottom one makes connection with the case or ground.

It is to be understood that the detector will be provided with the conventional electrode circuit which includes a resistance and high potential source. Pulses from the detector are conducted to the amplifier 261 where they are amplified and delivered to a delay line 262. The pulses passing through the delay line 262 are transformed by the radio frequency transformer 263 and impressed upon the grids of tubes 264 and 265 in the manner shown. The plate of tube 264 is connected to a source of potential indicated as B+. The plate of tube 265 is connected to the same source of potential through a resistor 266. The cathode of tube 264 is connected to ground through a resistor 267. The cathode 265 is connected to ground through the resistor 268. The cathode of 264 is connected to the plate of tube 265 through condenser 269 and a lead is brought out to the condenser 270. Condenser 270 may be connected to a pulse height discriminator circuit such as that illustrated in Figure 16 or to a plurality of such circuits.

A portion of the signals conducted from the detector are diverted through an auxiliary circuit. Conductors 271 conduct the diverted portion to amplifier 272 where they are amplified and are delivered to the derivating circuit 273. The derivated signals are then introduced into threshold circuit 274. The threshold circuit 274 takes the form shown in Figure 28. In Figure 28 the input of the derivating circuit comprises the conductors 275, by means of which the signals are conducted through a condenser 276 and resistances 277 and 278 to the grid of a tube 279. The plate of tube 279 is connected to a source of potential indicated by B+. The cathode of this tube is connected to ground through a resistance 280. A resistance 281 having one end connected to ground, has its other end connected at a point located between resistances 277 and 278. Tube 279 is followed by a tube 281. The grid of 281 is grounded for radio frequency through condenser 282. The cathode of tube 281 is connected to the input end of the resistor 277. The plate of tube 281 is connected to a source of potential through a resistor 284. This plate is also connected to the cathode of tube 279 through the condenser 285. The output of this circuit is transmitted through the condenser 286 and ground terminal 287 is the other output terminal. The threshold circuit shown in Figure 28 passes positive pulses greater than a certain magnitude through tube 279 and negative pulses greater than a certain magnitude through tube 281.

Again referring to Figure 27 the output signal from the threshold circuit illustrated in Figure 28 is fed through low-pass filter 288 to the amplifier 289. The amplified signal is then introduced into the shaping circuit 290. After the signal has been shaped in circuit 290 it is fed through a double pole, double throw switch 291, to the secondary circuit of radio frequency transformer 263. The signal in reaching the secondary circuit of transformer 263, passes through the battery 292 and is then divided. A portion of the signal flows through the resistance 293 and the remaining portion flows through the resistor 294. The signal fed through the resistances 293 and 294 does not appear in the output of this system when there is no signal coming through the radio frequency transformer from the delay line 262. Likewise the signal transmitted through the radio frequency transformer 263 does not appear in the output terminal leading from condenser 270 when there is no signal transmitted by resistances 293 and 294. When a sufficient signal is transmitted through the resistances 293 and 294, uniformly shaped in element 290, and when concurrently there arrives a signal commencing after the beginning of the shaped signal and ending before the conclusion of the shaped signal which is the other signal coming through the radio frequency transformer 263, then a signal will appear at the terminal of condenser 270 and it will faithfully represent the signal transmitted through the radio frequency transformer 263.

In operation, signals transmitted through the upper portion of the circuit, which includes the amplifier, delay line, and radio frequency transformer 263, will be impressed upon the grids of tubes 264 and 265. These tubes will conduct pulses to the output circuit only when they have been enabled by a signal which has been conditioned in the lower circuit, and delivered to the grids of these tubes, as previously described, through the resistors 293 and 294. The enabling circuit is provided for the purpose of causing transmission to the output, of a particular class of information and excluding unwanted classes of information.

The type of classification which is accomplished by the enabling or lower circuit of Figure 27, has as its purpose, as has been previously stated, the recognition of direction and sense of direction of particles which cause the ionizing paths in the detector to which the circuits of Figure 27 are connected. The classification of processes which is accomplished by the aid of the lower circuit of Figure 27 is made possible by the fact that the electrical signals which occur in the radiation detector connected to the input of this system are different for different direction, and sense of direction of the particles which cause the ionizing paths in the aforesaid detector. The case which is most useful for the employment of the classification processes accomplished by the lower circuit of Figure 27, is that in which the ionizing process occurring in the circuit of electrode 27, was caused by an ionizing path generated by a particle in the radiation detector, which moved in a direction having a substantial component parallel to the axis of the detector.

For the above class of processes, corresponding with incident neutrons directed generally along the axis of the detector either upwardly or downwardly, there are two kinds of electrical signals which appear on the electrode 27. For neutrons moving along the axis, and moving downward, the resulting recoil atoms generally produce on the electrode 27 signals like that represented in Figure 29A. For neutrons incident upwardly upon the detector of radiation, the resulting recoils generally produce electrical signals on the electrode 27 like that illustrated in Figure 29F. The signal illustrated in Figure 29A takes the form shown in Figure 29B after passing through the derivator circuit 273. The derivated signal is then passed through the threshold circuit 274. This signal in turn is passed through the low-pass filter 288 to produce the signal shown in Figure 29C. This signal represents an approximation to the negative integral of that part of the signal illustrated in Figure 29B outside the threshold range. The amplifier 289 produces from the signal of Figure 29C the signal shown in Figure 29D. The shaper 290 produces from this impulse a signal not crossing the zero axis of voltage such as that shown in Figure 29E. This signal commences at a time $t_1$ and ends at a fixed time thereafter, corresponding with a positive voltage slightly greater than the sum of the voltage of battery 292 and the normal operating bias of tubes 264 and 265. The signals corresponding with a recoil caused by a neutron incident upwardly along the axis of the detector of fast neutrons are similarly transformed, and result in a similar flat-topped signal 29J, but of opposite polarity. The polarity which occurs in diagrams 29E and 29J is, in each case, brought about by the fact that the integral of the high peaks of the derivator output has opposite polarity. The transient which occurs between these peaks, and after them, which would otherwise cancel the value of integral, is eliminated through the action of the threshold circuit 271. Circuit 271 acts to ignore the portion of the derivator output between the dotted lines in diagrams of Figures 29B and 29G. The action of the lower circuit of Figure 27 will enable the passage of pulses through the upper circuit, only in those instances where the pulses generally have the form of Figure 29A if the inversion switch 291 is in the left hand position. If the inversion switch 291 is in the right hand position, the enabling circuit will then transmit signals only when the pulses received from electrode 27 have the form shown in Figure 29F. The waves shown in diagrams E and J of Figure 29 differ in that they will have different times of onset by an amount which is of the order of the duration of the pulses shown in Figures 29A and 29F. To overcome the difficulty caused by this inequality of times of onset of waves illustrated in Figures 29E and 29J, $\Delta t$ shown in the figure is made two or three times longer than the duration of time in which the pulses shown in Figures 29A and 29F exist. The delay introduced by the delay line 262 is made sufficient to cause a pulse traveling along the upper circuit of Figure 27 to the radio frequency transformer 263, to arrive just after the time of commencement of the enabling pulse shown in Figure 29E, which is the last arriving, of the two possibilities. The pulses transmitted in the upper circuit will be faithfully represented and transmitted to the output terminal of condenser 270, because of the chosen smooth top of the enabling pulse, and because of the fact that it is made to offer an equal voltage which does not vary through the time that the upper circuit is enabled. The enabling pulse therefore renders the tubes 264 and 265 continuously and equally conductive during the enabling interval, which includes the time of arrival of the desired event from the R.-F. transformer 263, regardless of whether it is an event corresponding with Figure 29A, downwardly incident neutron, or an event corresponding to Figure 29F, upwardly incident neutron, selected by suitable setting of switch 291.

In Figure 30 there is illustrated an electrical system that is adapted to be employed with certain apparatus or combinations of apparatus shown in the preceding figures of drawings for the purpose of discriminating between pulses on the basis of time duration and faithfully amplifying and recording the pulses having a specified time duration in correlation with depth.

Pulses from a detector, such as that shown in Figure 10 are amplified by the amplifier 295 and introduced into a threshold circuit 295a and clipper circuit 296. The clipped pulses are then differentiated by the differentiator circuit 297. The action of the differentiator is to produce a signal such as that illustrated at 298, that is, one having negative and positive pips. The circuit built around tubes 299 and 300 will be recognized as a trigger circuit, which is triggered by the leading pip of the signal shown at 298 to produce a pulse of specified height and duration. The duration of this pulse is determined by the lower limit of the range of pulse duration selection desired. The pulse produced by the pulse generating circuit is amplified by an amplifier 301 and then differentiated by differentiator 302 to produce a signal such as is illustrated at 303. It is to be noted that this signal is composed of a negative pip followed by a positive pip. The positive or trailing pip triggers a blocking oscillator circuit which includes the tubes 304 and 305, connected in the manner shown, and the transformer 306. The blocking oscillator when triggered, produces a narrow pulse which is used as an enabling pulse in the cathode circuit of tube 307. The width of this pulse determines the range of pulse duration selection. Tube 307 is normally biased to cutoff and the enabling pulse conditions it to become conductive when a signal of proper polarity is impressed on its grid. If a signal corresponding to that illustrated at 298 occurs while the tube 307 is enabled the positive pip thereof, when impressed on the grid of tube 307, will cause a pulse to be produced in the plate circuit thereof. This pulse will be impressed on the grid of a tube 308 which will, with tube 309 and the associated elements, form a triggered pulse generating circuit. When triggered by a pulse from tube 307 this circuit will produce a pulse having specified height and duration. This pulse is impressed across the resistance connected in the cathode circuit of tubes 310 and 311 and serves to enable or condition these tubes for conduction when signals are impressed on their grids.

A portion of the output signals from amplifier 295 is diverted through a delay circuit 312 and amplifier 313 to the transformer 314. The signal from transformer 314 is conducted through condensers 315 and 316 to the grids of tubes 310 and 311. Tubes 310 and 311 are normally biased beyond cutoff. The pulse from tube 308 is negative in sense and just sufficient in height to cause a fall in potential of their cathodes such that the tubes 310 and 311 will be in the middle of their conducting range. The duration of this pulse is sufficient to maintain the tubes in a conducting state until the pulse arriving from transformer 314 is finished. The output of tubes 310 and 311 is taken from the push-pull plate-to-plate high frequency transformer 317. This output signal is a faithfully amplified representation of the pulse arriving from transformer 314, and because of the push-pull connection, contains none of the enabling pulse impressed on the cathodes of these tubes. The output of transformer 317 is impressed upon the tube 318 which is operated as a cathode follower and hence the output of this tube is taken between the cathode and ground.

The output of this circuit may be fed into a pulse rate conversion circuit and conditioned for recording in correlation with depth of the drill hole in the manner taught in an earlier part of this specification.

The uses of the device of Figure 30 are very numerous in neutron well logging. Among other things, the device of Figure 30 enables the operator to concurrently determine the energy and direction of neutrons incident upon the detector. If the devices of Figures 28 and 29 are suitably combined with the device of Figure 30, the operator may determine concurrently the energy, direction, and sense of direction of neutrons incident upon the fast neutron detector. Direction, as used above, means simply the angle of incidence of the neutron upon the detector with respect to the axis of the detector. Geographic sense of direction may be added, when desired, by superimposing on the pulse selection described in connection with Figure 30, selection like that described in connection with Figures 23 and 24 which gives geographic direction selectivity.

By use of the device of Figure 30 it is also possible to accomplish a classification of the types of ionizing tracks occurring in the chamber of Figure 10, according to the types of ionizing particles which cause these tracks. How all these purposes are accomplished will become clearer from a consideration of Figure 31.

In Figure 31 there is illustrated at $a$ a path of a heavy ionizing particle, such as a recoiling helium atom. Because the space inside the detector rings 76 is occupied by a uniform and straight electric field, so polarized as to draw the electrons upward, the row of electrons released by the recoil may be thought of as being uniformly translated upwardly at high speed, but relatively undistorted after being formed. For purpose of illustration, there is shown at $b$ the location of the row of electrons at time $t_1$ after it was formed at $a$, and at $c$, the position of the row at a still later time $t_2$. Because of the concentrated nature of the electric field around electrode 27, electrons are appreciated at a constant short interval of time after they pass through the screen 77 independently of where they enter it. The electrical pulse generated on electrode 27 will, therefore, substantially faithfully represent the rate at which the electrons passed through the screen, during an interval of time in which a path defined by electrons arrives in front of the screen in a position to pass through it. Because of the uniform nature of the translation of the electron paths and the uniform manner in which they pass through the screen and are effective on electrode 27, a given duration of electrical pulse $\Delta t$ will always characterize ionizing paths occurring in the detector. Such a path could be thought of as beginning and ending on any two parallel planes 319 and 320 which are perpendicular to the electrical field in the detector, provided these planes are separated by a distance $d_1$.

When using a detecting system such as that illustrated in Figure 31 it is desirable to definitely limit the class of directions of recoil paths caused by recoils of a specific energy group which are detected. Such a definite limitation is achieved by superimposing on the signals received from a detector, such as is illustrated in Figures 10 and 31, two selecting processes. These selecting processes are accomplished by connecting to the output of the detector a circuit of the type shown in Figure 30 and then passing the output from the circuit of Figure 30 to a circuit as shown in Figure 16. In such a case the recoils, which result in electrical pulses being appreciated in the recording circuit, will correspond with paths in the detector which had a fixed angle with direction of the axis of the detector. The above selection processes fix this angle because they amount to a measurement of the total length of the particle path plus a measurement of its component parallel to the axis. The total length of the path is known because the processes were selected with respect to energy by the circuit of Figure 16. Since the amount of ionization is determinative of the path length and the pulse height is proportional to the amount of ionization then the pulse height must necessarily be proportional to the path length. For a given particle, and in a given atmosphere there will be a uniquely determined particle path length corresponding with each energy. Likewise the component of the recoil particle path parallel to the axis is known, being determined by the selection of $\Delta t$ and interplanar distance $d_1$ in the circuit of the type shown in Figure 30.

The selection angle determined, as explained, is calculated from the equation $$\theta = \cos^{-1} \frac{d_1}{h}$$

where $\theta$ is the angle between the direction of a recoil path and the direction of the axis of the detector;

$d_1$ is the interplanar distance shown in Figure 31; and $h$ is the ionizing particle's path length, determinable from the pulse height setting of the connected circuit of Figure 16.

If, in addition to the above exact determination of the direction of the ionizing particles, the operator brings about a relatively exact relationship between the direction of the incident fast neutrons, and the direction of the paths of particles set in motion by them, it is clear that the direction of incidence of the neutrons is also determined. Such a relation to the direction of incidence of fast neutrons exists to some degree in the case of nearly every ionizing path caused by them, but is more precise for the case of substantially square-hit recoils, such as may be recognized by maximum energy square-hit selection of Figure 18, or by derivative analysis of square hits, as set forth in connection with Figures 12 and 13. Sense of direction selectivity may be added as taught in connection with Figure 29. By such means, the exact recognition of energy of neutrons, or relative excesses or deficiencies of fast neutrons of a given energy group, may be accomplished for fast neutrons incident on the detector in definitely determined directions. Thus it is possible to ascertain the presence of scattering phenomena having preferred directions, due to nuclei present in the rock substance, and to select the preferred direction of incidence and rebound of neutrons which are affected by a particular selective energy loss by which it is desired to measure the concentration of specific nuclei. Analysis may thus be accomplished more efficiently, and sensitivity may be concentrated in desired directions, out from the bore hole.

For the purpose of determining the kinds of ionizing paths occurring in a fast neutron detector one makes another use of the circuit of Figure 30. To accomplish this, advantage is taken of the fact that for a path caused by a particular kind of ionizing particle commencing and terminating at interplanar distance $d_1$ of Figure 31, there will be a minimum energy (pulse size) corresponding with the particles of interplanar distance $d_1$ and directed parallel to the axis. All energies less than the minimum energy which would have a total path length less than interplanar distance $d_1$, cannot conform to the requirements of the selection circuit of Figure 30, and will therefore be rejected.

Figure 32 illustrates those conclusions, showing discontinuites corresponding with helium recoils related to $\Delta t$, and expressed as $f_1(\Delta t)$ and corresponding to proton recoils, also related to $\Delta t$, and expressed as $f_2(\Delta t)$.

Still another embodiment of the instant invention resides in the provision of a method and apparatus for measuring fast neutrons having a specific energy, or energies, corresponding with neutron scattering resonance for a substance present in the neutron detector.

This embodiment provides a superior measurement of light elements, such as carbon, nitrogen, and oxygen, which may exist alone, or as components of substances that it is desired to recognize.

This phase of the invention takes advantage of the fact that certain elements have specific energy resonances for ballistic interaction of their nuclei with neutrons. Of the elements having such specific resonances, some exist which can be combined in gaseous compounds suitable for use in an impulse ionization chamber like that illustrated in Figure 10. Other elements or isotopes of elements having ballistic resonances are gaseous and are suitable for use by themselves in an impulse ionization chamber. Examples of the latter are nitrogen and the three isotopes of neon. Examples of the former class are carbon and oxygen. The specific observation of these resonances and the correction for the nonresonant ballistic reaction in the case of the chosen elements is effected by subtracting the number of corresponding processes caused by neutrons upon another element concurrently present, which has no resonance of a ballistic nature in the same energy range. An example of a suitable nonresonant recoiling substance is hydrogen, which has no energy resonances at all for its ballistic reactions with neutrons. The application of the above broadly stated principle is accomplished through the use of a fast neutron detector generally resembling Figure 10. This fast neutron detector contains the required two gaseous substances and is connected to an electrical apparatus like that in Figure 30. The apparatus of Figure 30 is concurrently operated upon by an electrical apparatus connected to the output of the apparatus of Figure 30, which subsequent electrical apparatus is the same as that illustrated in Figure 16.

A specific detector which is required in the practice of this embodiment of the invention is illustrated in Figure 33. In this figure there is shown a complete subsurface instrument containing elements which, in the greater part, are illustrated diagrammatically. The detector 321 is of the general type shown in Figure 10, differing therefrom in that it is shorter along its axis, and disposed transversely with respect to the axis of this instrument. This detector is shown disposed within the housing 322. The complete subsurface instrument includes the neutron source 323, the detector 321, its associated power supplies and its electrode circuit, as well as the circuit elements of Figure 30, Figure 16, and the pulse rate conversion circuit. These are connected as shown diagrammatically. The output from the pulse rate conversion circuits is received on the conductors 324 which transmit the intelligence to the surface, where it may be recorded, by a recording system not shown, in correlation with depth. Arrangement of the circuits of Figures 30 and 16, as well as the pulse rate conversion circuit are more specifically illustrated in Figure 34.

The transverse arrangement of the detector 321 provides that the electrical field within the detector is transverse with respect to the axis of the capsule 322. The signals received upon the electrode 27 are classified into two interplanar distance classes by circuits 325 and 326 of the type shown in Figure 30. These are shown combined in the detailed Figure 34. Also in the detailed Figure 34 are shown diagrammatically three circuits of the type illustrated in Figure 16, designated 327, 328, and 329 and three pulse rate conversion circuits 330, 331 and 332. These pulse rate conversion circuits combine their outputs in series, in a manner to be discussed. The interplanar distances, selected as already taught in connection with Figures 30, 31, and 32, are recognized by elements 325 and 326 and are related to one another in a way which is determined by the nature of the resonant and nonresonant ballistically reacting gases which have been put in detector 321 of Figure 33. The adjustment of the interplanar distance corresponding with element 325 may be understood to be based on the range of the lightest ballistically recoiling nuclei present in the detector 321. It is chosen so that the energy of the resonance to be observed corresponds with a maximum range of the recoiling particle in the detector which is just over the preferred interplanar distance. Similarly the interplanar distance preferred for use with element 326 is based on the range of heavier recoiling nuclei of substances present in the detector 321. In this case the preferred interplanar distance is just more than the maximum energy of the heavier recoiling particle corresponding with the neutron resonance which it is desired to observe. The Figure 16 apparatus identified as element 327, connected to element 325, is adjusted to selectively receive an energy group of recoils having energies just greater than the value $f_2(\Delta t)$ as shown in Figure 32. The pulse rate thus transmitted into the pulse rate conversion circuit is indicative of the number of recoils of the lightest nuclei present at the energy stated. The energy gate of apparatus of the type of Figure 16, element 328, is adjusted to transmit pulses having energies just less than $f_1(\Delta t)$, as illustrated in Figure 32. The apparatus shown has elements 331 and 332 arranged with the outputs oppositely polarized so that, by subtraction, the pulse rate difference corresponding with the discontinuity shown at $f_1(\Delta t)$ in Figure 32 is represented. The output of element 330 is so polarized that, if the above difference is positive, the output of element 330 will be negative, and will be subtracted from the above recited difference. The above subtraction has the effect of isolating the resonance portion of the reaction measured in the lower channel, which comprises elements 326, 328, 329, 331, and 332.

The strength and distribution of the electric field established by electrode 27 in Figure 33, as well as in the detectors shown in other previously discussed figures, plays an important role in the practice of this invention. The prompt recovery of electrons which pass through the screen 77 of Figure 10 is essential. This is necessary in order to effect faithful piece-by-piece registration of a track defined by electrons released by a heavy ionizing particle as required in the use of the circuit of Figures 15 and 27. A further requirement which exists is that the motion of small clusters of electrons, passing through the screen 77, occurs in such a manner as to produce a very sudden electrical pulse on the electrode 27. It is also necessary that there be the same proportionality constant for electrons entering the screen 77 in different places from center to edge.

The purposes set forth generally above apply to all the detectors of fast neutrons which have been described, except those set forth in connection with Figures 17 to 22. These objectives are accomplished in a manner which can be clearly seen from a consideration of Figure 35.

In Figure 35, there is shown a part of an impulse ionization chamber, comprising the upper portion of the housing 337, the shielding screen 77, and the electrode 27. Also indicated in Figure 35 are a ring shaped sheet metal mask 333; lines of electric force are diagrammatically indicated at 334, 335, and 338; the position and direction of motion of an electron 336 is shown diagrammatically; the position of a positive ion 339 which is relatively at rest is shown in the region below the screen 77; a guard ring 341; and insulators 342 for the central electrode and guard ring. The guard ring is maintained at approximately the same electrical potential as the collector electrode 27.

The electron illustrated at 336 will be accelerated by the electric field to the region $a$, from $b$, where it passed through the screen. Its speed will be at all times $\bar{E}M$, where M is a constant related to the pressure of the gas and electron mobility in it, and where the quantity $\bar{E}$ represents the vector intensity of the electric field. The instantaneous rate of liberation of energy, $r$, into the circuit coupled to electrode 27 will be $$r = \bar{E} \cdot \bar{v}e$$

where $\bar{v}$ is the vector of the electron's velocity, and $e$ is the absolute value of the electronic charge. As can be seen from the crowding of the lines of force 335, as they approach $a$, the intensity of the electric field acting on the electron at 336 will increase rapidly in the vicinity of $a$. This concentration $\bar{E}$, is expressed by $$\bar{E} = \frac{r_0^2 E_{r_0}}{r^2}$$

where $r_0$ is the radius of the spherical ball 340 terminating electrode 27, $E_{r_0}$ is the magnitude of the vector of electric field intensity at the surface of region $a$, and $r$ is the distance from the center of the spherical ball 340 at which the electric field is observed.

Lines of force, within the counter, terminating in the vicinity of the region $a$ on element 340, are distinguished from lines of force 334, not terminating in the vicinity of $a$ or the open portion of the screen 77. Lines of force extending between screen 77, and electrodes below it, not shown in Figure 35, are identified by 338.

The region of intense electric field, as above described, is strongest on the ball 340, but becomes less for regions to the left or right, and at the top, where the ball passes into the stem of electrode 27.

For proportional gain the region of high field intensity is the region in the vicinity of $a$, where gain occurs in a device such as is shown in Figure 35. An electron will cause more additional electrons when it comes in along a long line of electric force where the last part of the electric field is very strong, than it will if it comes in on a line extending through a weaker electric field. The electric field is, as has been noted, strongest in the vicinity of region $a$, and is relatively constant to the left and right of center. The shape of the upper part of the detector illustrated in Figure 35 is chosen, in a preferred form of detector, deeper from top to bottom than the diameter of the screen 77. This choice is made for the purpose of making certain that electrons passing through the screen will produce an equivalent effect on electrode 27 and will undergo exactly the same proportional multiplication. The proportions of the drawing of Figure 35 may be taken as illustrative. To minimize the distance $d$, but still accomplish the purpose of the device of Figure 35, a conical form like that of Figure 10 will serve better. For the purposes set forth in connection with Figure 35, a mask 333 of sheet metal in the form of a ring is used. The mask prevents electrons from entering the corner formed by housing 337, and disc-shaped wire screen 77. Such electrons, if they entered, would not be promptly collected because of the weak field in this corner. The positive ion at 339 will not have any influence, because it moves generally hundreds of times slower than the electrons and because the wire screen 77 shields the electrode 27 electrostatically from it.

Exclusion of the effect of gamma rays in a device of the type shown throughout this specification will generally be accomplished by inserting a suitably adjusted threshold device like that shown in Figure 18 in the output of the first flat radio frequency amplifier coupled to the electrode 27. The arrangement of Figure 35 aids in removing this spurious influence of gamma rays by causing sharp time resolution of pulses due to them. Resolved in time, such pulses as are due to gamma rays, may readily be removed by a threshold device because they are smaller. Were they not resolved in time by a suitable choice of electric field intensity and distribution, these small pulses could pile up on a random basis and make spurious impulses like those due to neutrons. Such a difficulty could not be solved in the circuit connected to the output electrode 27.

The advantages of the arrangement, of which Figure 35 is an illustration, become more clearly apparent from a consideration of its use in connection with a complete detector, such as is shown in Figure 10. The complete detector may be thought of as a combination of a point proportional counter with other elements, in a manner which avoids the faults of the point proportional counter, and secures a sensitive volume as great as that provided by a wire counter. The complete detector, furthermore, avoids faults which are characteristic of wire counters and secures advantages not available in either wire counters or point counters. These advantages are very great in connection with their use with gases at super-atmospheric pressures.

Considerations which guide an operator in securing the outstanding advantages of the detector of Figure 10 include the size of the ball which is illustrated as terminating the electrode 27 at its lower end. The size of this ball is critical. Generally, the radius of curvature of this ball will be taken equal to or less than ten times the average mean free path of the molecules composing the gaseous atmosphere of the detector. In superatmospheric pressure operation, it will not be feasible to design the electrode with a ball. In this case, an example of a preferred shape for the electrode 27 will be that of a steel Victrola needle. Such an electrode in a device of the type shown in Figure 35, will enable it to function as a point proportional counter in gas at superatmospheric pressures. The device of Figure 35 can be employed separately as a point proportional counter, if the screen 77 is entirely masked. It would not exhibit the same proportionality for electrons liberated in different parts of its interior. The region under the point, and near the center of screen 77 will correspond with maximum gain. On the other hand, the region to the sides and the top will give smaller electron pulses for ionizing events occurring in these places. The sensitivity will not vary greatly in the reasonably close vicinity of the maximum at the center of the screen 77. The mask 333 is set at a radius which cuts off the reception of electrons outside the zone of relatively uniform sensitivity. The above use of the mask is in addition to its use for avoiding slow collection, which has been explained.

The point proportional counter, familiar in the art, and the straight field ionization chamber, also well known, have been combined to produce the apparatus shown in Figure 10. The combination is accomplished by the provision of the screen 77, which takes the place of a collector electrode in the straight field chamber, and takes the place of part of the wall of the proportional counter. By placing the open part of the screen at a region of maximum and constant sensitivity, and designing it as an electrostatic shield, the combined detector becomes a proportional electron impulse ionization chamber as well as a proportional counter. Because of the larger volume of the straight field space below screen 77 for collection, much greater sensitivity is secured than is available in point counters. Also, as has been pointed out, the arrangement of Figure 10 enables the faithful electrical representation of successive portions of an electron track caused by a particle path, and in the order in which the successive portions collected were initially nearest to the screen 77. Other uses and advantages of the device shown in Figure 10 will, with the above teaching, occur to those skilled in the art.

There has been described above a method and apparatus for identifying, locating, and quantitatively establishing the relative amounts of specific chemical elements, or valuable substances through their chemical elements, by measuring the influence of their nuclear parameters upon a flux of fast neutrons. The different systems of apparatus described above provide means whereby the method of this invention can be practiced in several different ways, choice being determined by the type of nuclear data required for the identification, location, or quantitative establishment of the amount of the specific chemical element under investigation.

A system has been described for making a log of a drill hole which represents the intensity of a specific energy class of processes produced by fast neutrons versus depth. Alpha-beryllium sources have been disclosed which are adapted for use as fast neutron emitters. Additionally novel electrically dissipative sources have been described which produce energetic neutron radiation which, in most cases, will be substantially monoenergetic. These sources find particular application in those systems which depend for optimum operation on a monoenergetic source. Gamma-ray sources which produce gamma radiation of approximately 17 million electron volts that are adapted for use as a source of primary radiation in a well surveying system have also been described. The use of shields about the source, detector, or both, for the purpose of selecting particular energies of fast neutrons and eliminating spurious effects has been taught. There has also been taught the use of a penetrable material disposed between the fast neutron source and fast neutron detector. The penetrable material is so selected that its special characteristics of partial absorption of fast neutrons facilitate the attainment of accuracy in the detection and measurement of specific elements. A system has been disclosed for identifying specific chemical elements by subtracting non-identifying nuclear effects from effects representing the specific nuclear influences of the desired elements. As an adjunct to the application of the above principles means are provided whereby nuclear data on specific chemical elements can be obtained for the adjustment of the measuring apparatus. Filters are also described that are adapted for use with a detector for identifying particular elements. The materials from which these filters are made are so chosen that the filters will have similar selective fast neutron absorbing properties to the absorbing properties of the element to be identified. A novel electrical impulse detector which employs ring electrodes to shape a portion of the electric field within it is also described. The description also sets forth a system of analyzing the recoils caused by neutrons to determine the energies of the neutrons that caused them as an indication of the presence of specific elements. This last described system is also disclosed as applied to a well logging operation. Alternative systems for those enumerated above are also described. A group of detectors responsive to specific elements as defined directions from the wall of the bore hole are disclosed, some being responsive to hydrogen only, and others being responsive to any desired chemical element. Selected detectors of this group are capable of being used for deep and accurate investigation of very thin strata. The presence of specific elements in the formations can be determined by a system described above which enables the ascertainment of the kind of particle which produced ionization in a detector of fast neutrons, the length of ionizing path and the energy expended in producing the path.

It is to be understood that this invention finds specific application to well logging in that it affords means and apparatus whereby petroleum and other valuable substances can positively be located in situ. It has general application to the measurement of the influence of the nuclear parameters of various chemical elements upon a flux of fast neutrons.

We claim:

1. A method of surveying the formations penetrated by a well for the presence of a specific element that comprises irradiating the formations with fast neutrons, detecting fast neutrons which have returned to the well after having been diffused by the formations by producing related electrical pulses, selecting those pulses having energies lying within a plurality of selected energy bands; producing from the pulses representative of all of the plurality of bands a direct current corresponding with a combination of the several time-rates of occurrence of the pulses occurring in each of the several bands; and recording the said direct current versus depth as an indication of the presence of the said specific element.

2. A method of identifying petroleum, that exists in certain of the underground formations penetrated by a well, that comprises irradiating the formations penetrated by the well with a neutron flux consisting of fast neutrons having substantially continuously distributed energies, measuring a relative difference of the intensity of returning neutrons of a specific energy, the said relative difference being a characteristic of petroleum only.

3. A method of neutron well logging that comprises the steps of irradiating the formations penetrated by the well with fast neutrons, detecting neutrons which have returned to the well after having been diffused by the formations by producing electrical pulses proportionally related to the energies of the detected neutrons, selecting from the pulses those having magnitudes which fall within a predetermined range, amplifying the selected pulses, shaping and scaling the amplified pulses, transmitting the resulting pulses to the surface of the earth, producing a varying direct current proportionally related to the time-rate of occurrence of the transmitted pulses, and recording the direct current in correlation with the depth at which the detection occurred.

4. A method of identifying petroleum that exists in certain of the underground formations penetrated by a well that comprises irradiating the formations with a substantially monoenergetic flux of fast neutrons, detecting the flux of neutrons returning to the well which have been diffused by the formations, and measuring a relative difference of intensity of a particular energy class of the returning diffused neutrons, said energy class being characteristic of oxygen, and recording said measurement versus depth.

5. A method of well logging which comprises the steps of irradiating the formations penetrated by a well with a flux of substantially monoenergetic fast neutrons, detecting neutrons having specific energies that have returned to the drill hole after having been diffused by the formations, recording signals corresponding to the detected neutrons in correlation with the depth at which the detection occurred as a measure of the hydrogen, oxygen and carbon content of the formations.

6. A method of well logging which comprises the steps of irradiating the formations penetrated by a well with a flux of substantially monoenergetic neutrons, detecting neutrons having specific energies that have returned to the drill hole after having been diffused by the formations, recording signals corresponding to the detected neutrons in correlation with the depth at which the detection occurred as a measure of specific substances contained in the formations.

7. A method of well logging that comprises the steps of irradiating the formations penetrated by the well with fast neutrons, detecting neutrons which are returned by the well after having been diffused by the formations by producing in the detector a nuclear reaction which generates two electrically charged heavy particles which form paths therein by the liberation of electrons, collecting the electrons so liberated, producing electrical pulses characteristic of the above recited class of nuclear reaction and characteristic of other nuclear reactions also occurring, amplifying the pulses, separating and suppressing pulses other than those produced by the first above recited reaction, amplifying the unsuppressed pulses, dividing the amplified pulses into two portions, selecting from one portion pulses having energies falling within a particular energy range, the said energy range corresponding with a relative difference of neutron energies returning from the formation, as determined by a specific element present therein, selecting from the other portion pulses having energies falling within a nearby energy range, producing a direct current that is proportionally related to the time-rate of occurrence of the selected pulses falling within the first energy range, producing a direct current proportionally related to the time-rate of occurrence of the pulses falling within the second selected energy range, combining the two produced direct currents, transmitting the resultant direct current to a recording system where it is recorded in correlation with the depth at which detection occurred, as an indication of the concentration of the said specific element in the formations.

8. A method of surveying a well for a specific chemical element that comprises the steps of irradiating the formations penetrated by the well with fast neutrons, detecting fast neutrons which have returned to the well after having been diffused by the formations by producing proportionally related electrical pulses, selecting from the pulses those produced by neutrons belonging to a specific energy group, amplifying the selected pulses, producing a varying direct current that is proportionally related to the time-rate of occurrence of the amplified pulses, and recording the varying direct current in correlation with the depth at which detection occurred as a measurement of the specific chemical element present in the formations.

References Cited in the file of this patent

UNITED STATES PATENTS

| 2,469,460 | Fearon | May 10, 1949 |
| 2,483,139 | Herzog | Sept. 27, 1949 |
| 2,508,772 | Pontecorvo | May 23, 1950 |

OTHER REFERENCES

Electronic Classifying Cataloguing and Counting Systems—Parsons Proc. of the I. R. E., vol. 37, No. 5, May 1949, pp. 564–568.

Pulse Height Analyzer—"Higinbotham MDDC"—1173, July 27, 1944, pp 1–9.